United States Patent
Chae

(10) Patent No.: US 11,367,169 B2
(45) Date of Patent: Jun. 21, 2022

(54) METHOD FOR PROCESSING PICTURE OF AUTOMATIC DRIVING VEHICLE

(71) Applicant: LG ELECTRONICS INC., Seoul (KR)

(72) Inventor: Jonghoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 348 days.

(21) Appl. No.: 16/494,724

(22) PCT Filed: Apr. 26, 2019

(86) PCT No.: PCT/KR2019/005094
§ 371 (c)(1),
(2) Date: Sep. 16, 2019

(87) PCT Pub. No.: WO2020/218655
PCT Pub. Date: Oct. 29, 2020

(65) Prior Publication Data
US 2021/0366088 A1 Nov. 25, 2021

(51) Int. Cl.
| | |
|---|---|
| *G06T 5/50* | (2006.01) |
| *G06T 7/70* | (2017.01) |
| *B60W 60/00* | (2020.01) |
| *B60W 50/00* | (2006.01) |
| *B60W 50/02* | (2012.01) |

(Continued)

(52) U.S. Cl.
CPC .......... *G06T 5/50* (2013.01); *B60W 50/0097* (2013.01); *B60W 50/0225* (2013.01);
(Continued)

(58) Field of Classification Search
CPC .... G06T 5/50; G06T 7/20; G06T 7/70; G06T 2207/20081; G06T 2207/20208;
(Continued)

(56) References Cited

U.S. PATENT DOCUMENTS

| | | | |
|---|---|---|---|
| 10,498,963 B1* | 12/2019 | Sorgi | G06T 5/003 |
| 10,694,126 B2* | 6/2020 | Lee | H04N 5/144 |

(Continued)

FOREIGN PATENT DOCUMENTS

| | | |
|---|---|---|
| JP | H09142207 | 6/1997 |
| JP | 2007026400 | 2/2007 |

(Continued)

OTHER PUBLICATIONS

PCT International Application No. PCT/KR2019/005094, International Search Report dated Jan. 28, 2020, 9 pages.

*Primary Examiner* — Xuemei G Chen
(74) *Attorney, Agent, or Firm* — Lee Hong Degerman Kang & Waimey

(57) ABSTRACT

Disclosed herein is a method for processing a picture of an automatic driving vehicle. The method for processing a picture of an automatic driving vehicle according to an embodiment of the present disclosure includes obtaining a first image from a camera while a vehicle on which the camera is driving, generating a prediction signal for predicting a sign of occurrence of White-Out from the first image, when a quantity of light which is a threshold brightness or higher from the first image, storing the first image during a first period when the prediction signal is generated, and predicting and correcting a second image based on the first image stored during the first period and a correction model, when the second image in which the White-Out occurs in the first image is detected on a specific time during the first period, and the correction model is a result of learning the second image by processing high dynamic range (HDR) image. At least one of the automatic driving vehicle according to the present disclosure, a user terminal and a server may be linked with artificial intelligence, robot, Augmented Reality (AR), virtual reality (VR), and the like.

3 Claims, 40 Drawing Sheets

(51) Int. Cl.
*G06T 7/20* (2017.01)
*G06N 3/04* (2006.01)

(52) U.S. Cl.
CPC ............ *B60W 60/001* (2020.02); *G06T 7/20* (2013.01); *G06T 7/70* (2017.01); *B60W 2420/42* (2013.01); *G06N 3/04* (2013.01); *G06T 2207/20081* (2013.01); *G06T 2207/20208* (2013.01); *G06T 2207/30168* (2013.01); *G06T 2207/30252* (2013.01)

(58) Field of Classification Search
CPC . G06T 2207/30168; G06T 2207/30252; G06T 2207/10016; G06T 2207/20084; G06T 5/007; B60W 50/0097; B60W 50/0225; B60W 60/001; B60W 2420/42; B60W 40/02; G06N 3/04
See application file for complete search history.

(56) References Cited

U.S. PATENT DOCUMENTS

| | | | | |
|---|---|---|---|---|
| 2009/0066819 | A1* | 3/2009 | Ando | H04N 1/4074 348/254 |
| 2010/0149361 | A1* | 6/2010 | Takeuchi | H04N 5/772 348/222.1 |
| 2011/0222793 | A1* | 9/2011 | Ueda | H04N 5/2355 382/284 |
| 2014/0079333 | A1* | 3/2014 | Hirai | G06T 5/007 382/255 |
| 2014/0204246 | A1* | 7/2014 | Nishi | H04N 9/77 348/239 |
| 2015/0271383 | A1* | 9/2015 | Bienvenu | H04N 5/2356 382/167 |
| 2016/0110606 | A1 | 4/2016 | Lee | |
| 2016/0182798 | A1* | 6/2016 | Thorn | H04N 5/23232 348/208.1 |
| 2018/0060675 | A1* | 3/2018 | Ji | H04N 5/2355 |
| 2018/0302544 | A1* | 10/2018 | Dhiman | G06T 7/246 |
| 2019/0102656 | A1* | 4/2019 | Kwant | G06N 3/08 |
| 2020/0118280 | A1* | 4/2020 | Inata | G08G 1/09623 |
| 2020/0169671 | A1* | 5/2020 | Choi | H04N 5/247 |
| 2021/0029290 | A1* | 1/2021 | Okuike | G06K 9/4652 |
| 2021/0217134 | A1* | 7/2021 | Okamura | G06T 5/20 |

FOREIGN PATENT DOCUMENTS

| | | |
|---|---|---|
| KR | 1020170064880 | 6/2017 |
| KR | 1020180025591 | 3/2018 |

* cited by examiner

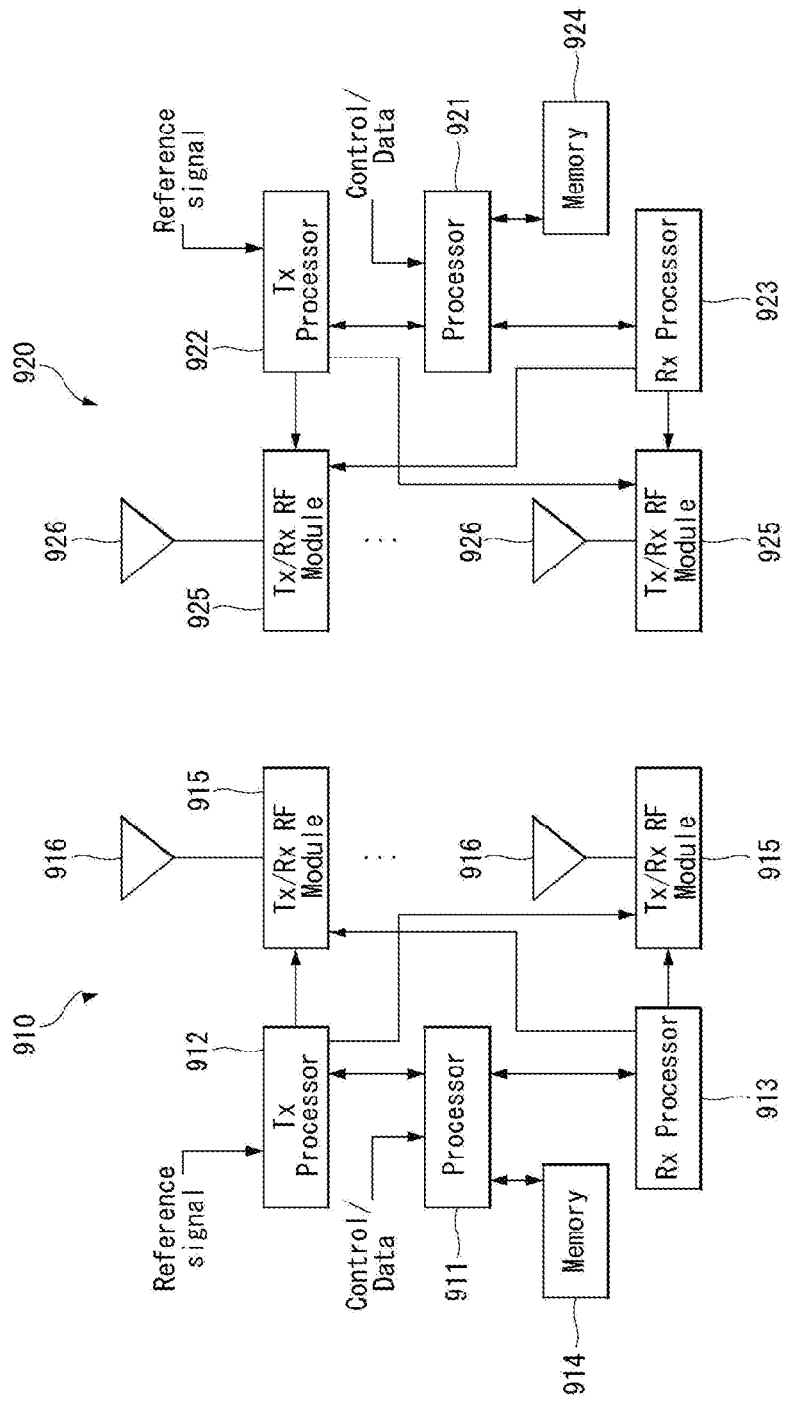
[FIG. 1]

[FIG. 2]
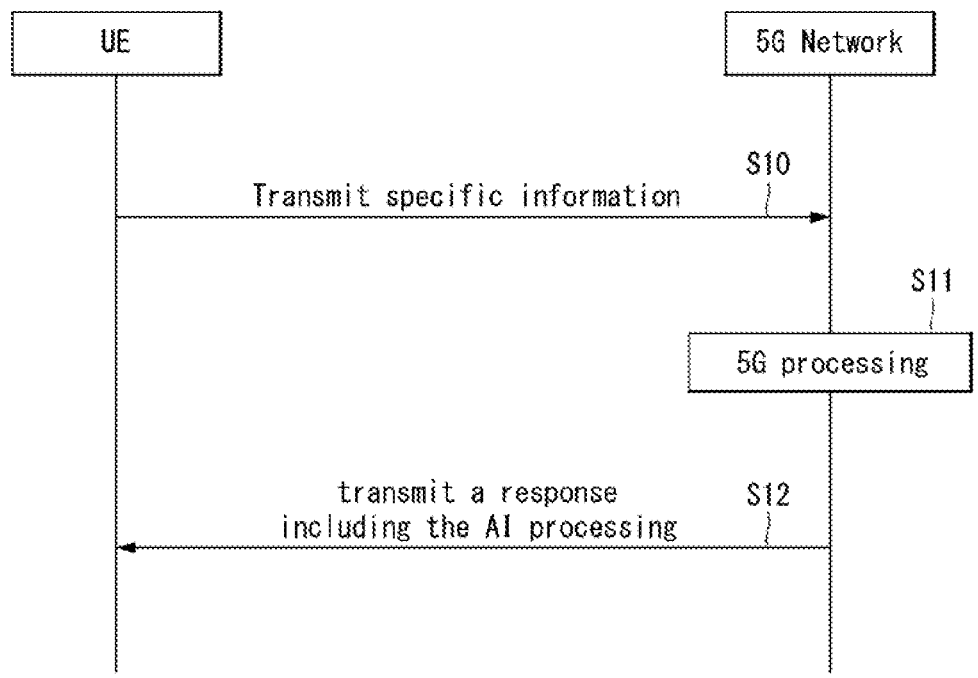

[FIG. 3]
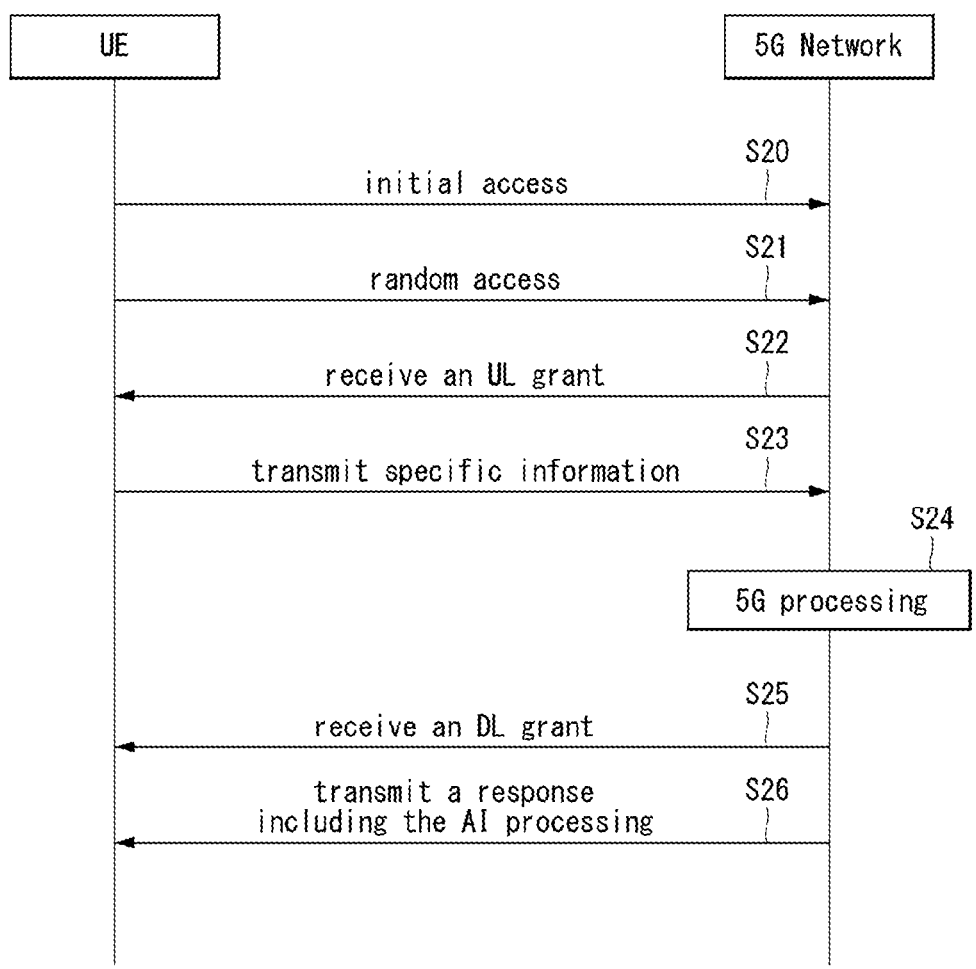

[FIG. 4]
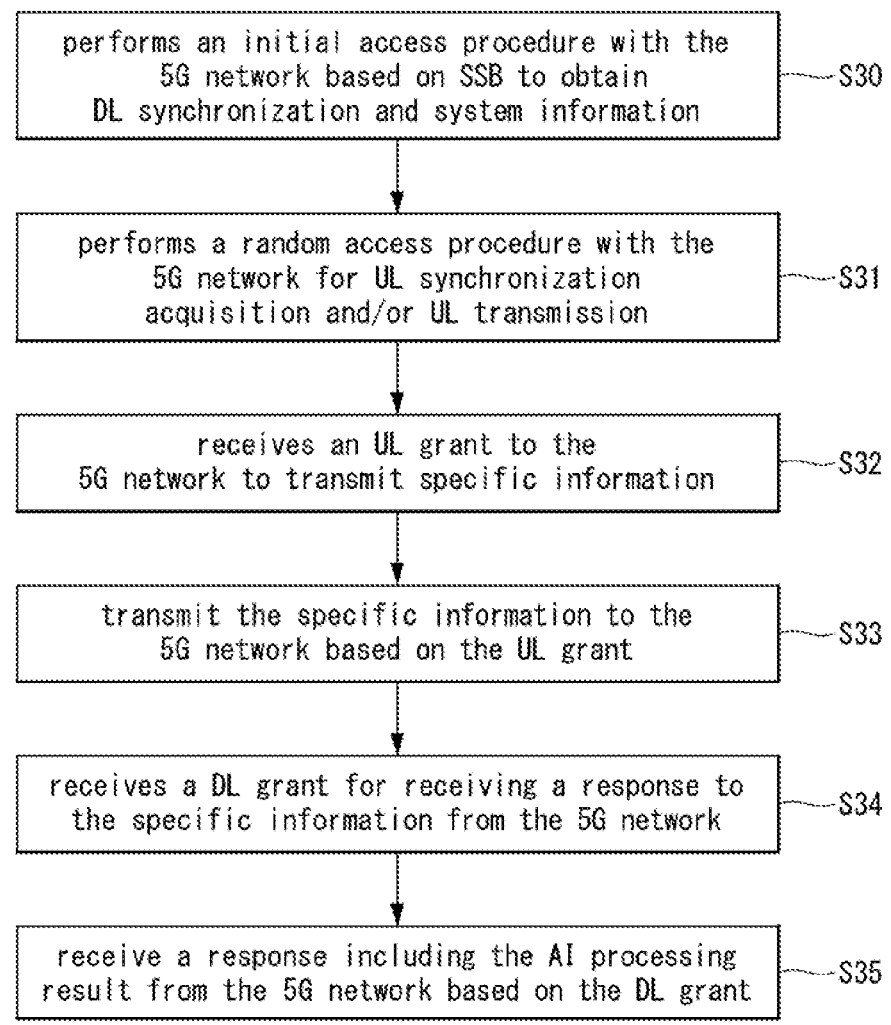

[FIG. 5]
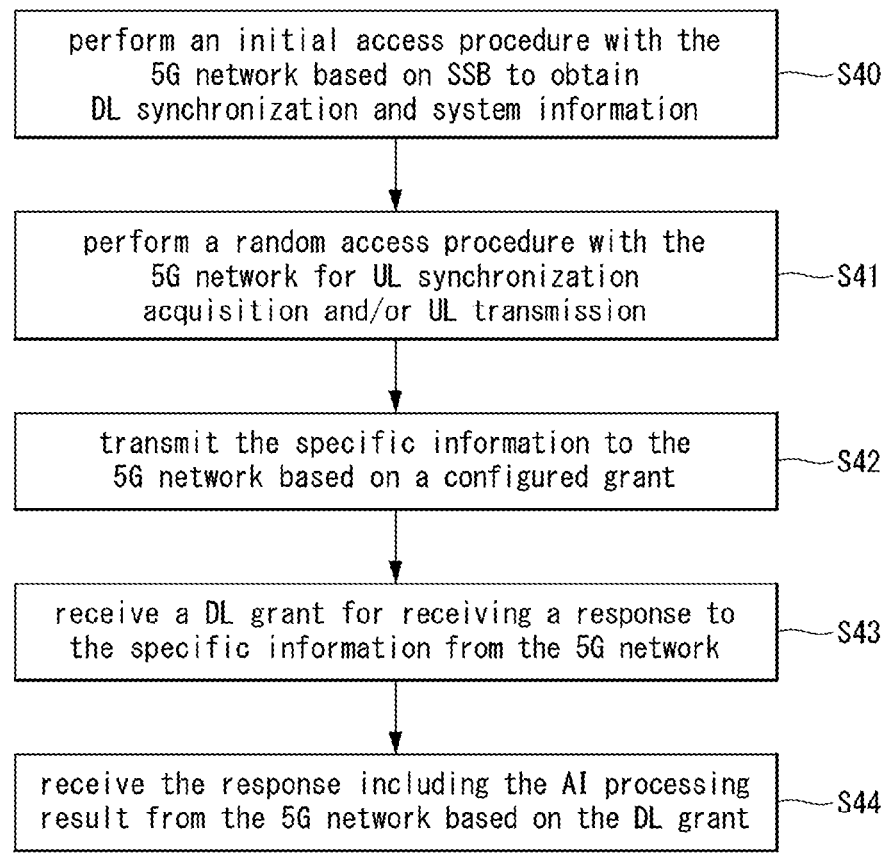

[FIG. 6]
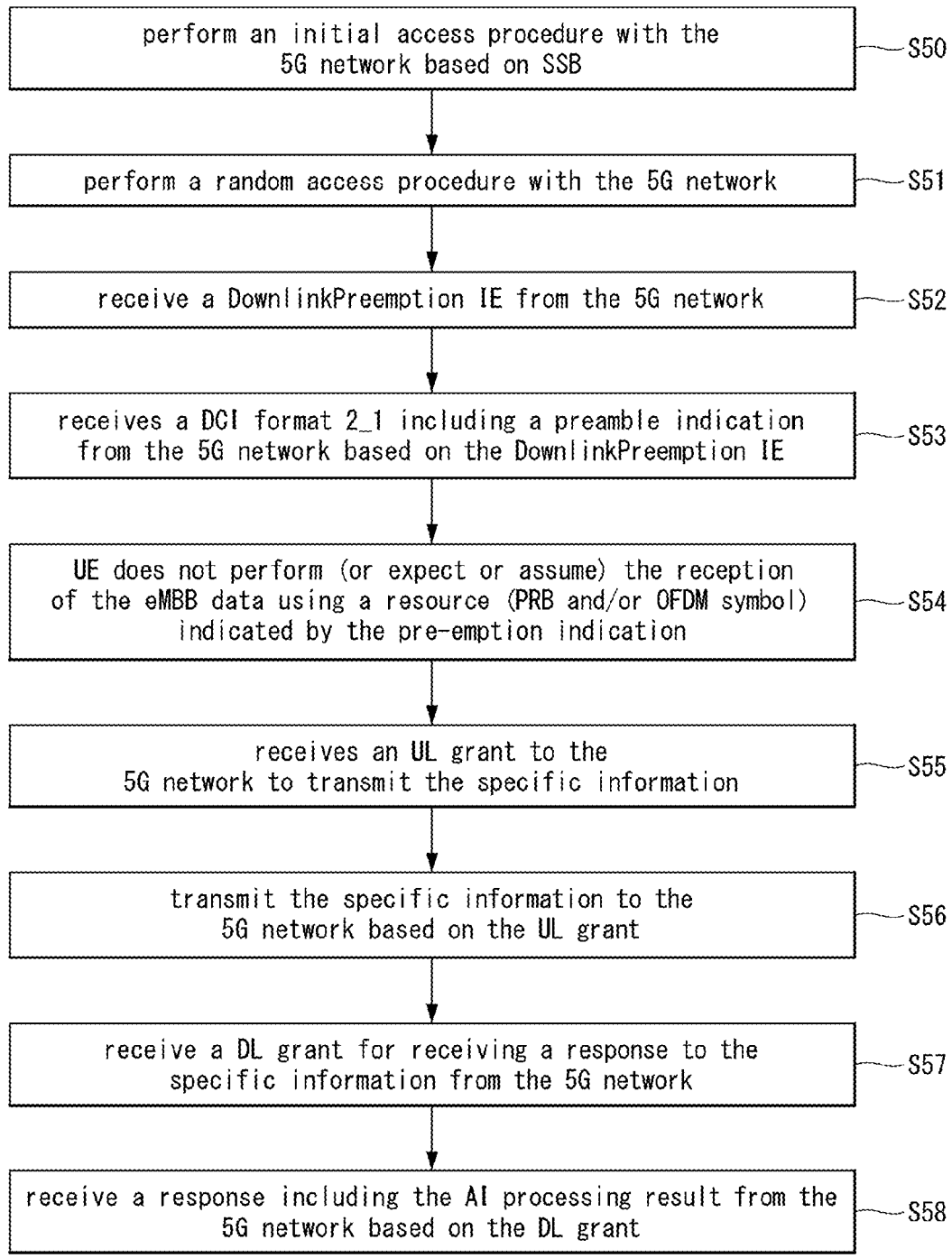

[FIG. 7]
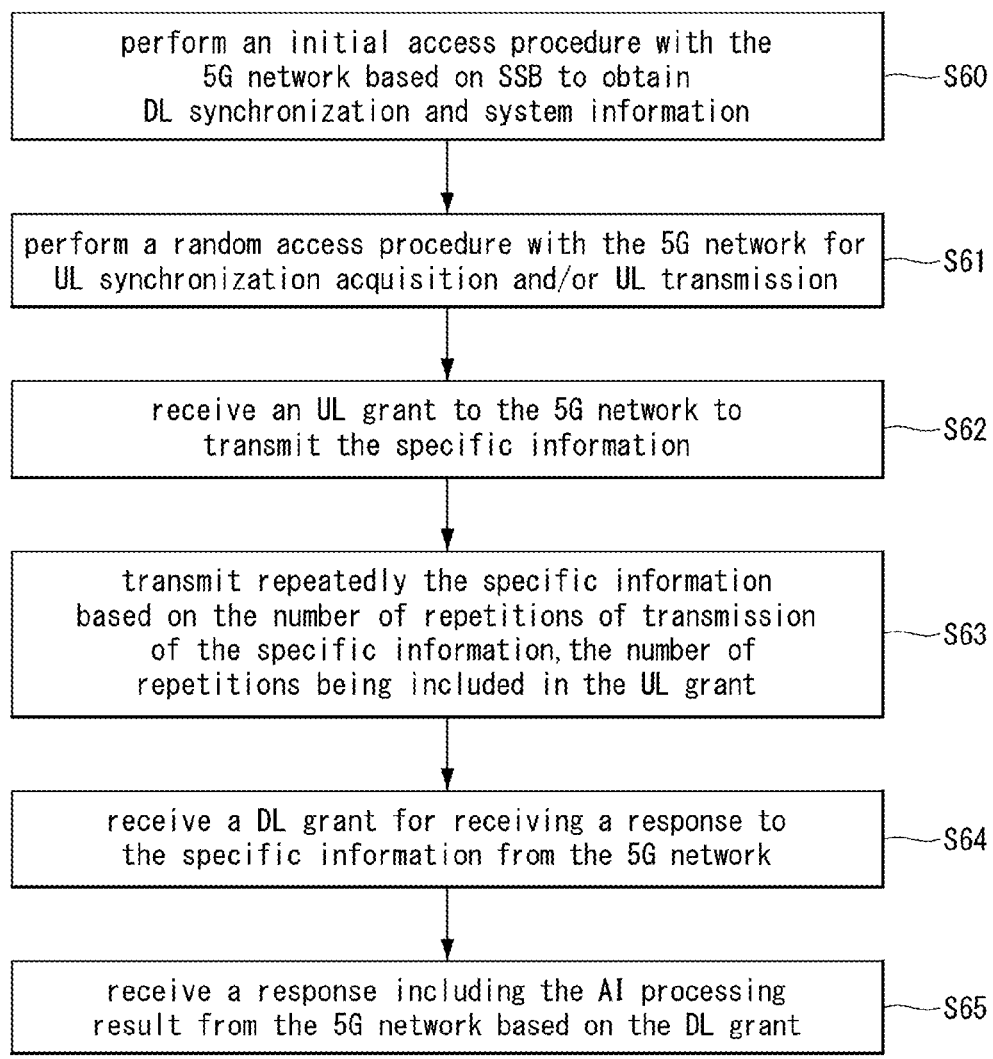

[FIG. 8]
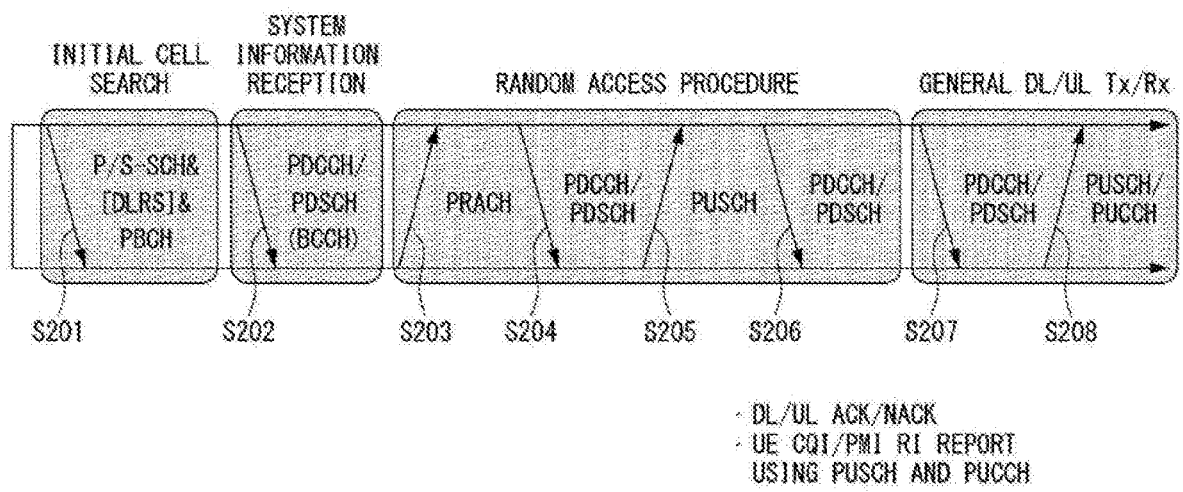

[FIG. 9]
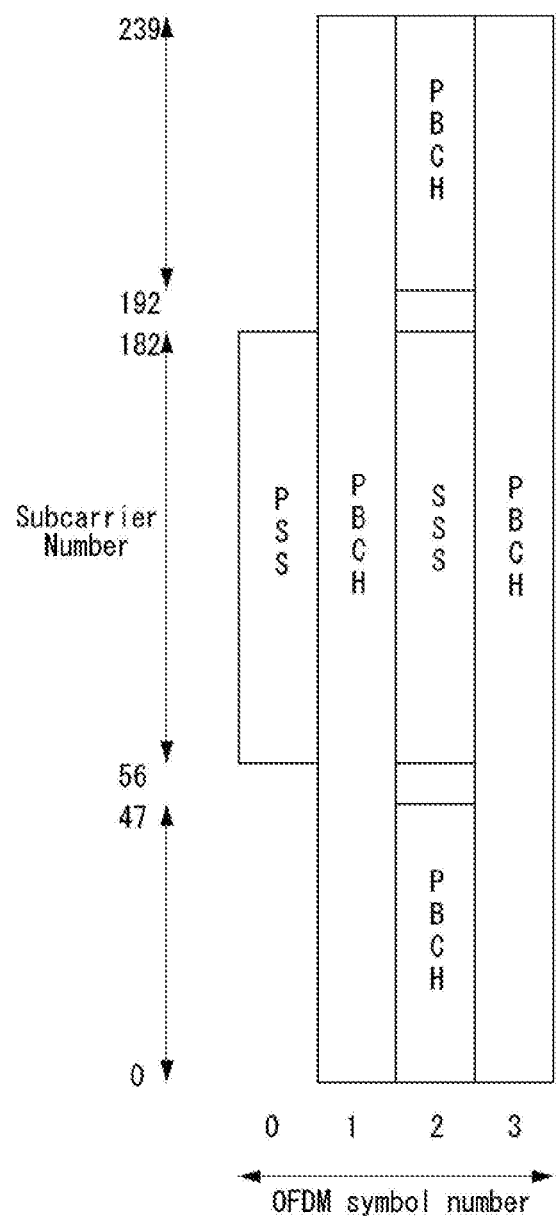

[FIG. 10]
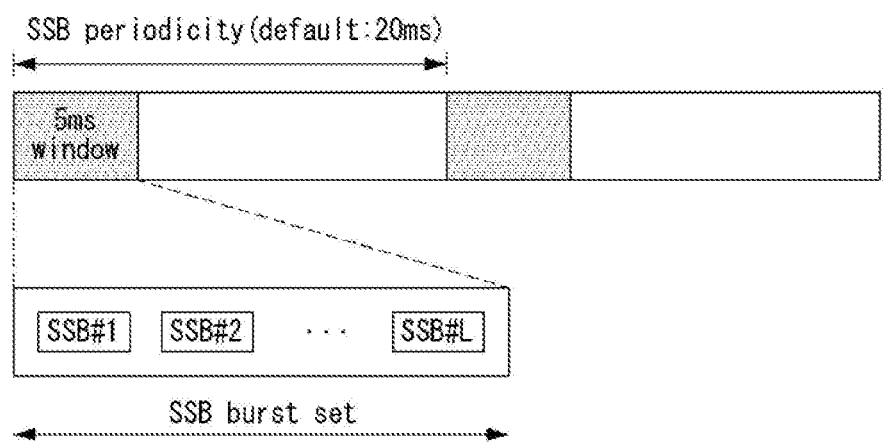

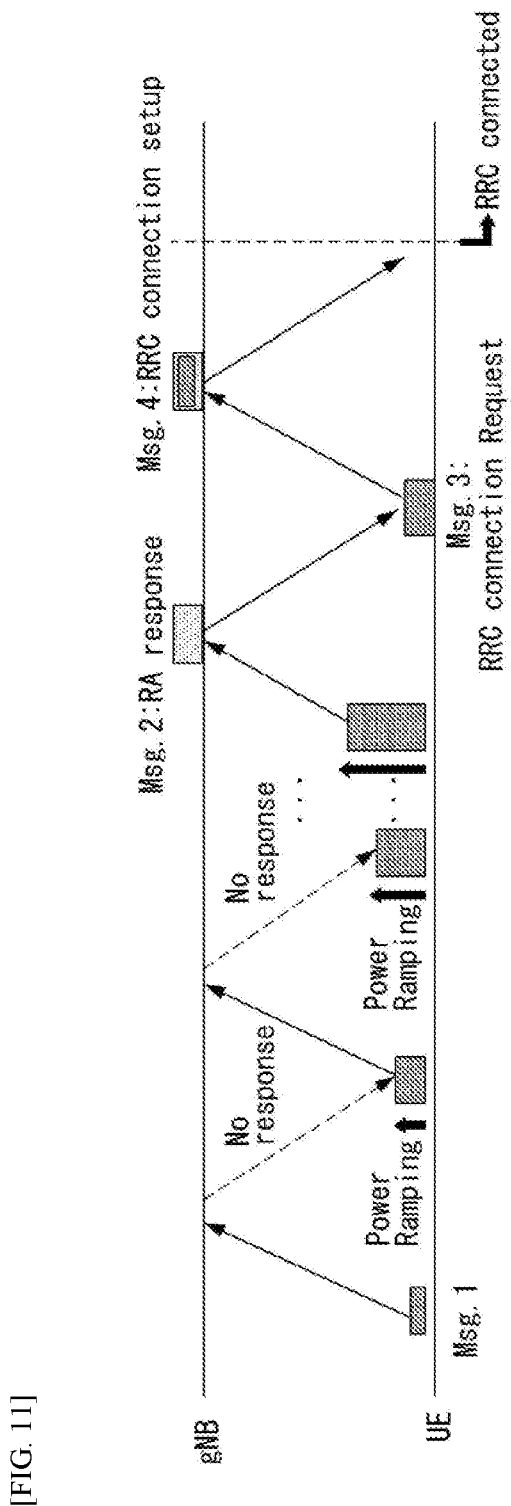
[FIG. 11]

[FIG. 12]
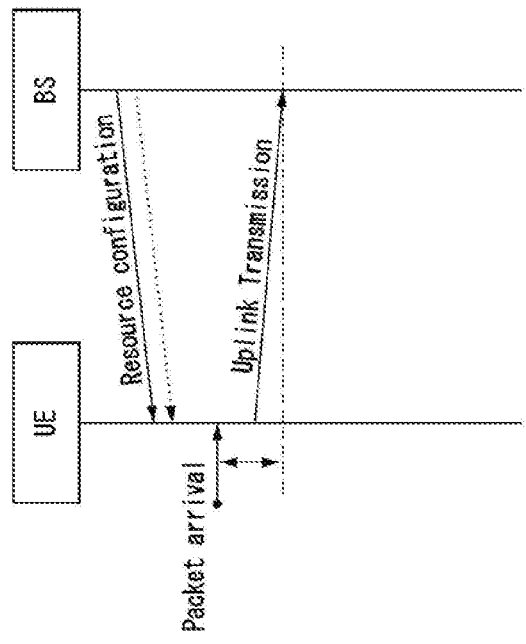
Fig. Uplink TX procedure without grant
(b)
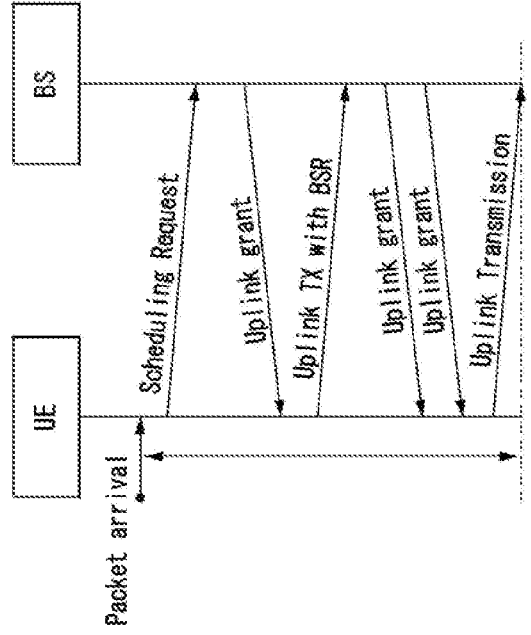
Fig. Uplink TX procedure with grant
(a)

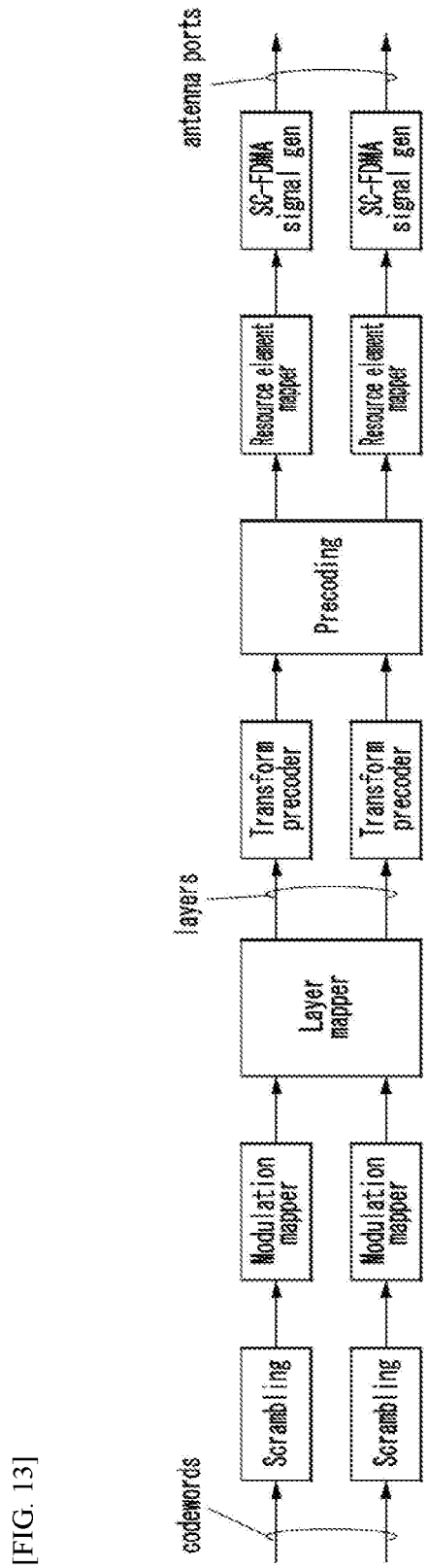
[FIG. 13]

[FIG. 14]
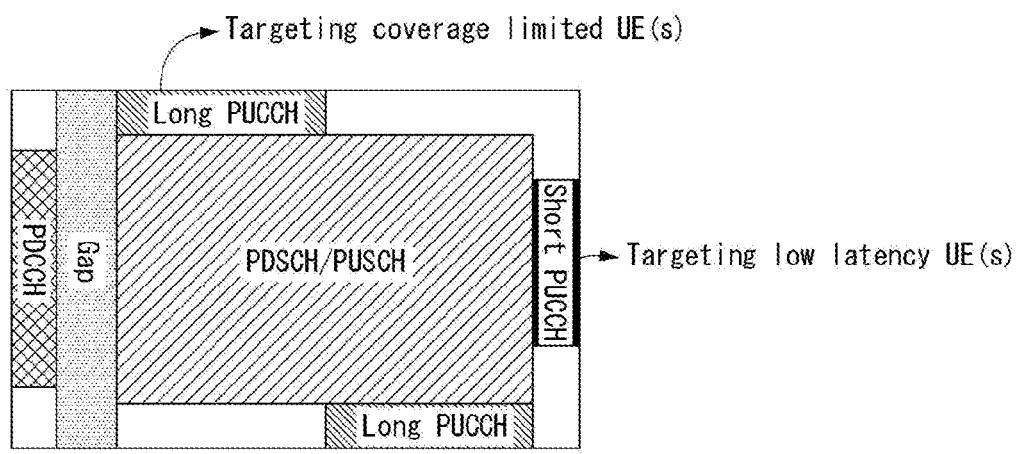

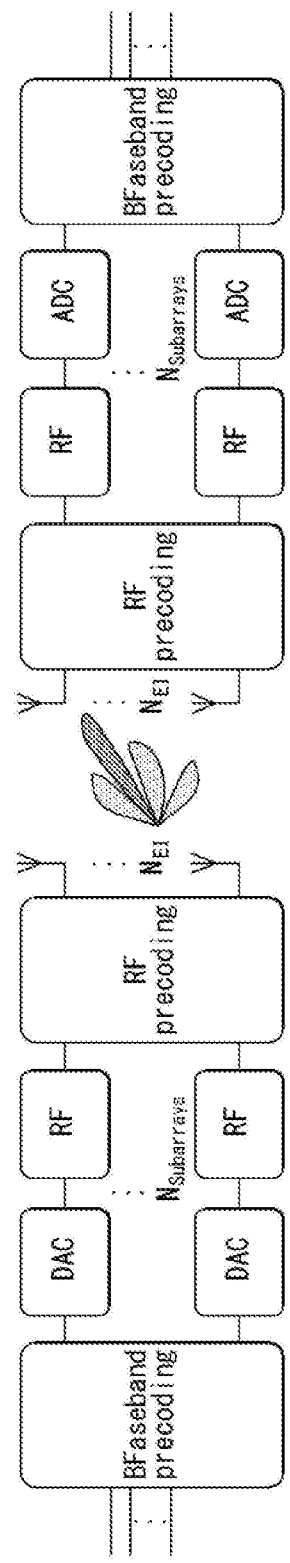
[FIG. 15]

[FIG. 16]
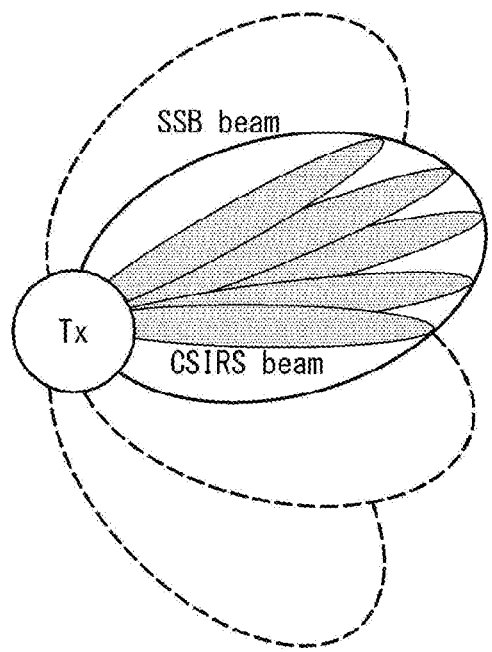
[FIG. 17]
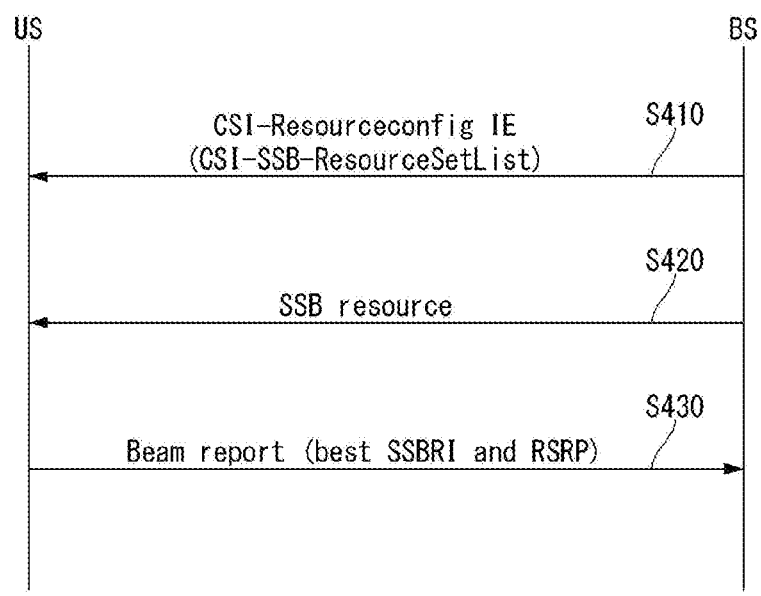

[FIG. 18]
(a)
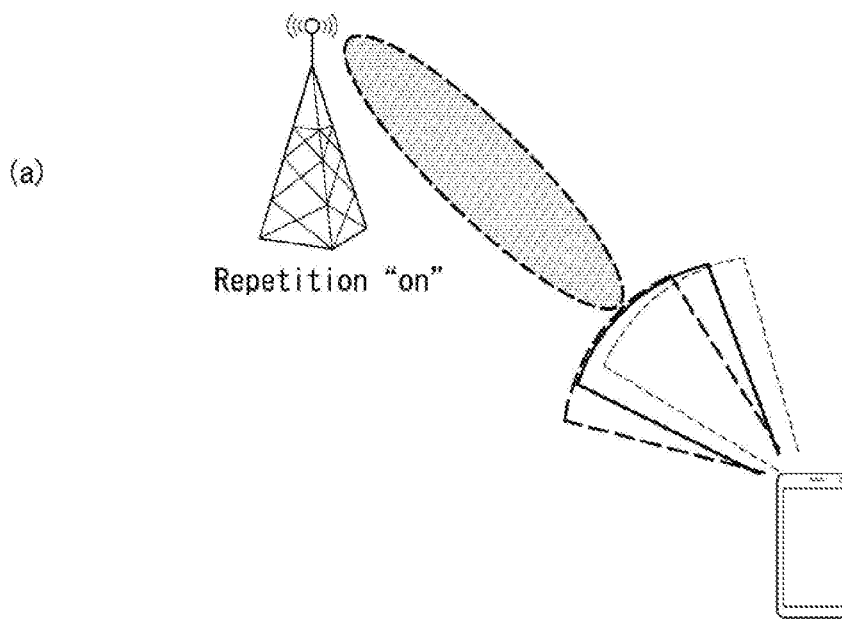
(b)
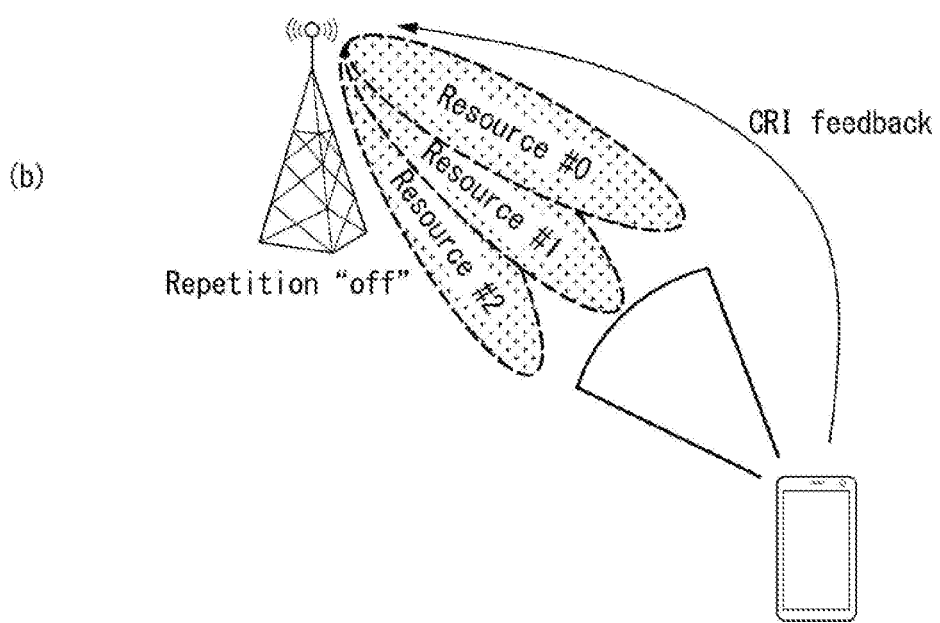

[FIG. 19]
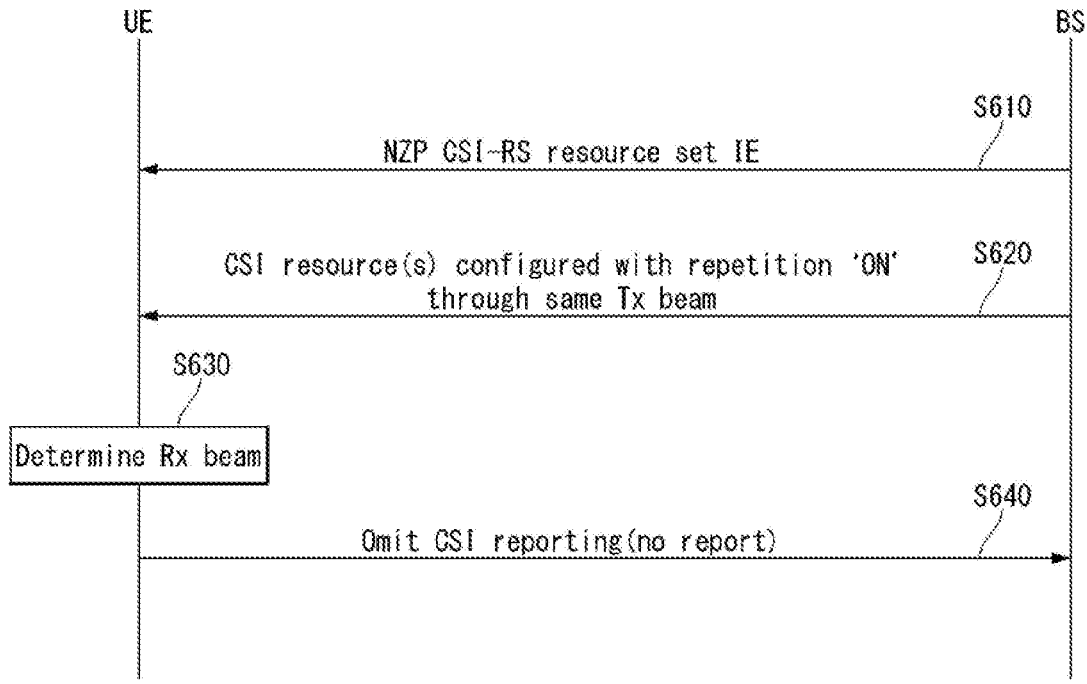
[FIG. 20]
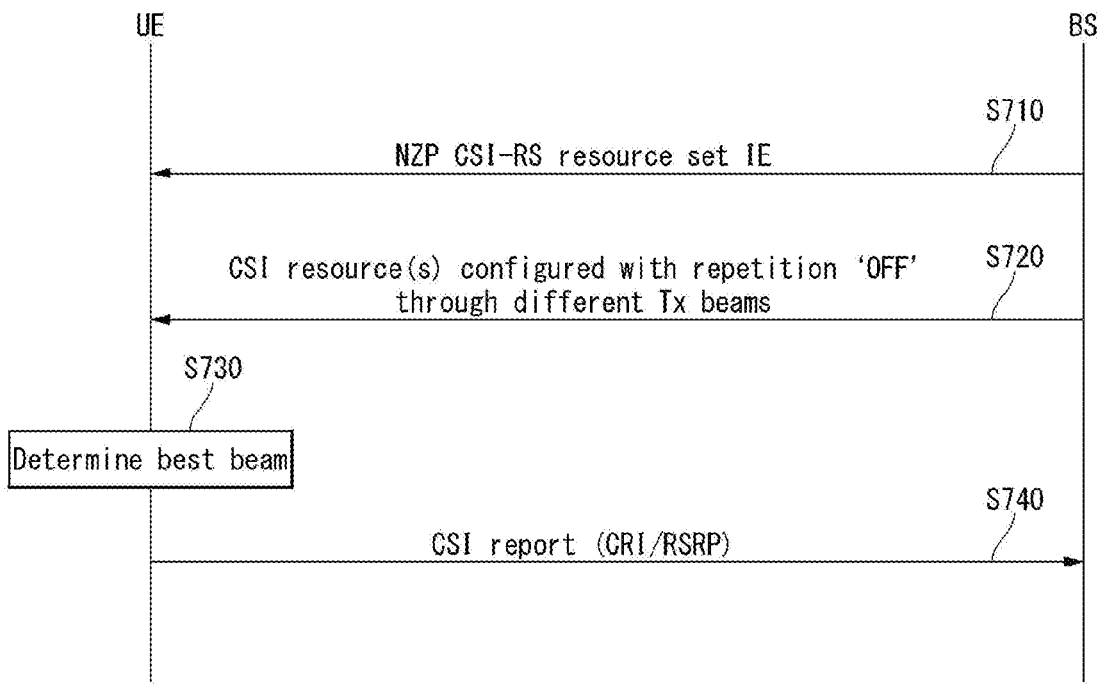

[FIG. 21]
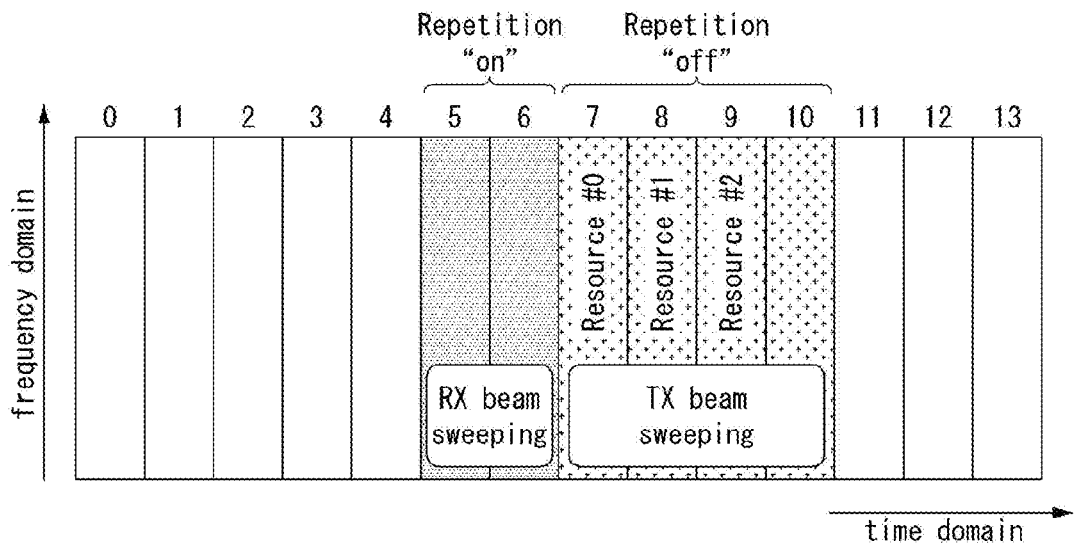
[FIG. 22]
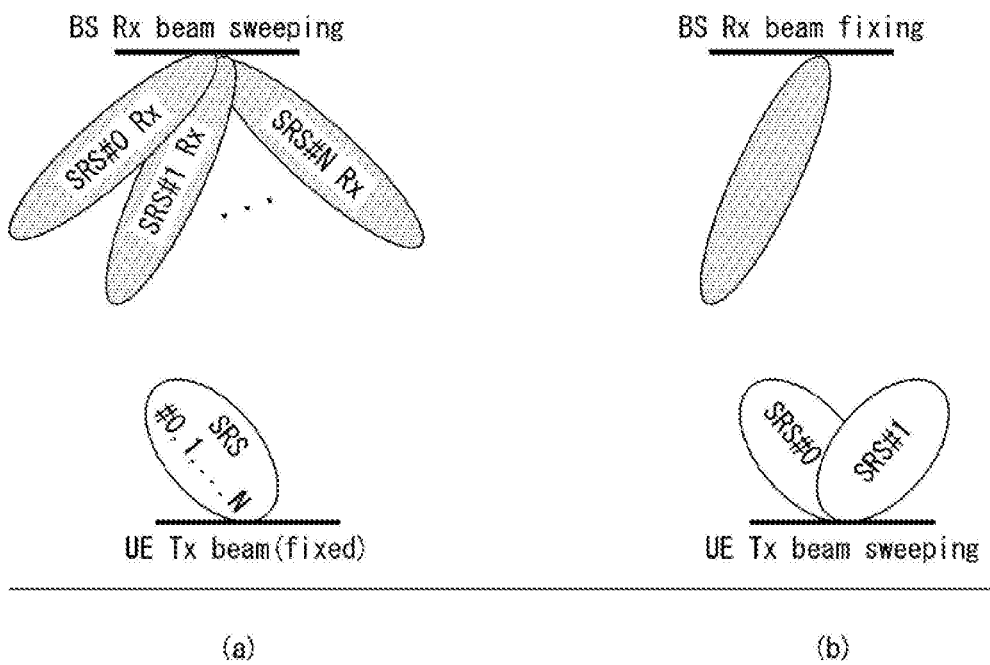
(a)                    (b)

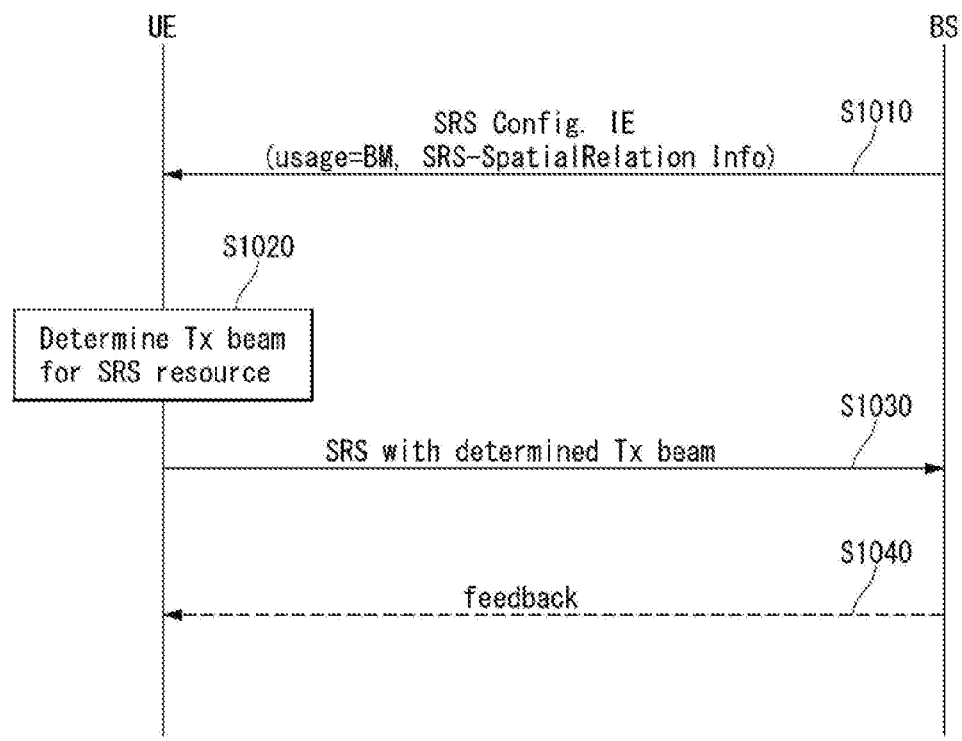
[FIG. 23]

[FIG. 24]
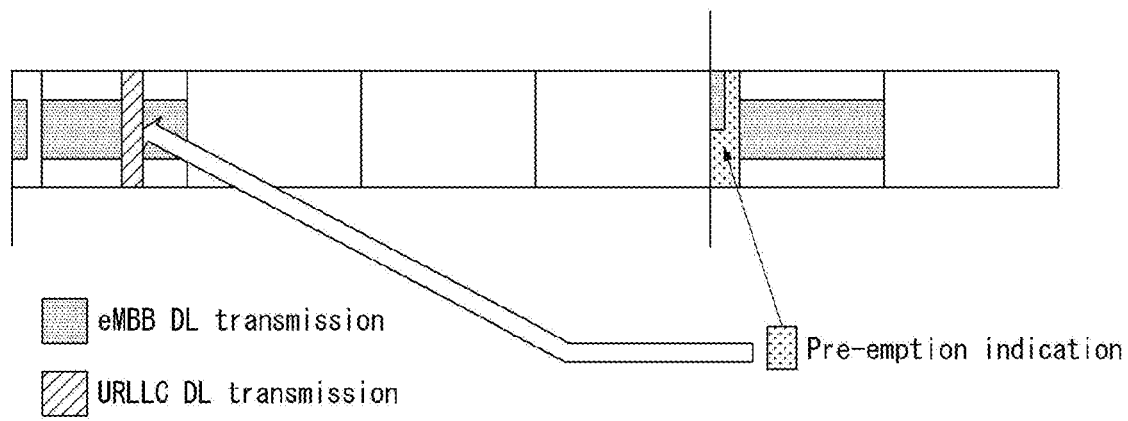
(a)
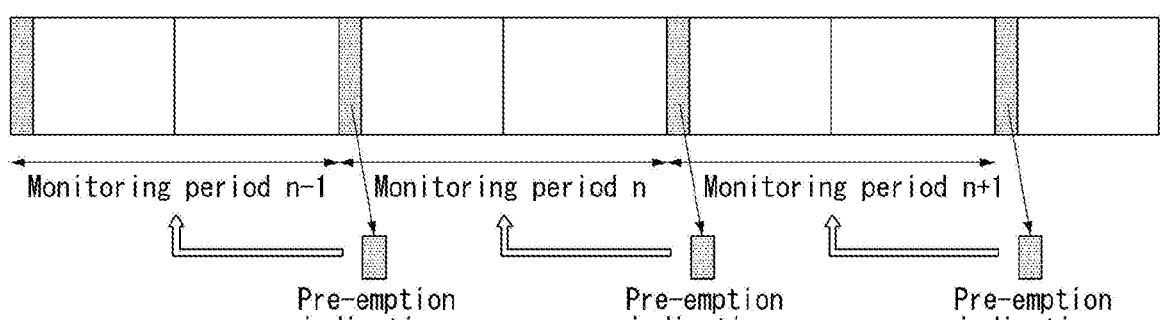
(b)

[FIG. 25]
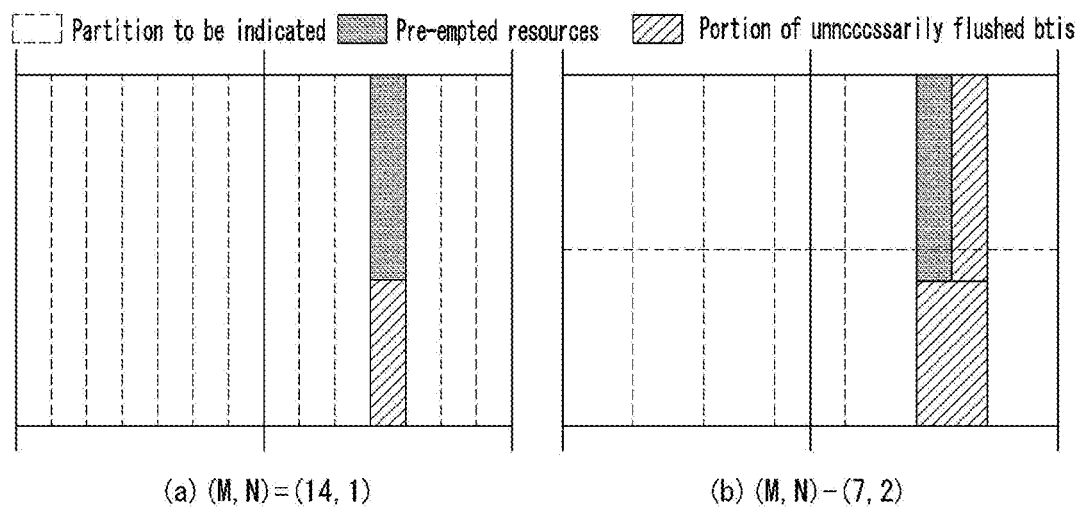

[FIG. 26]
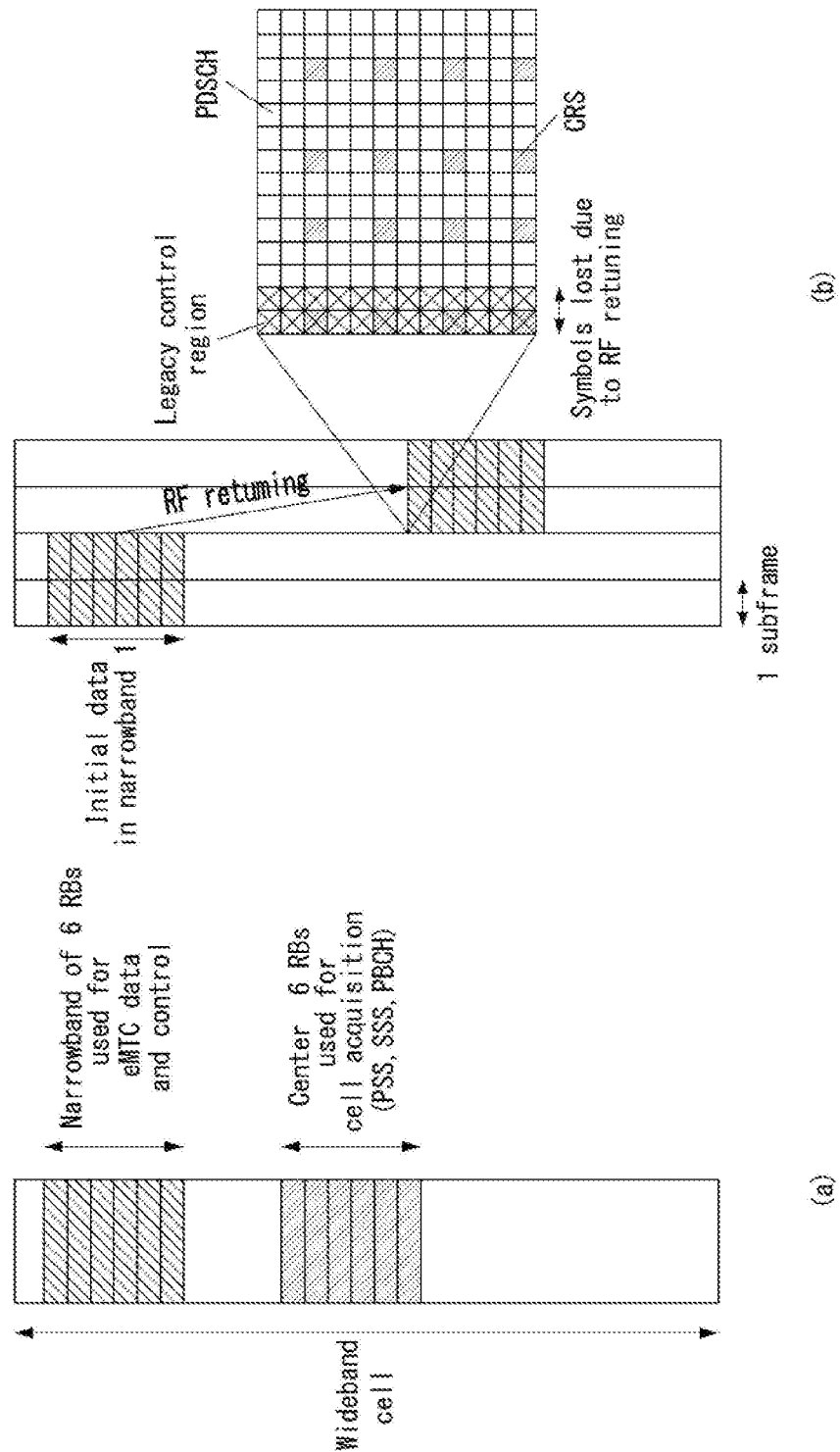

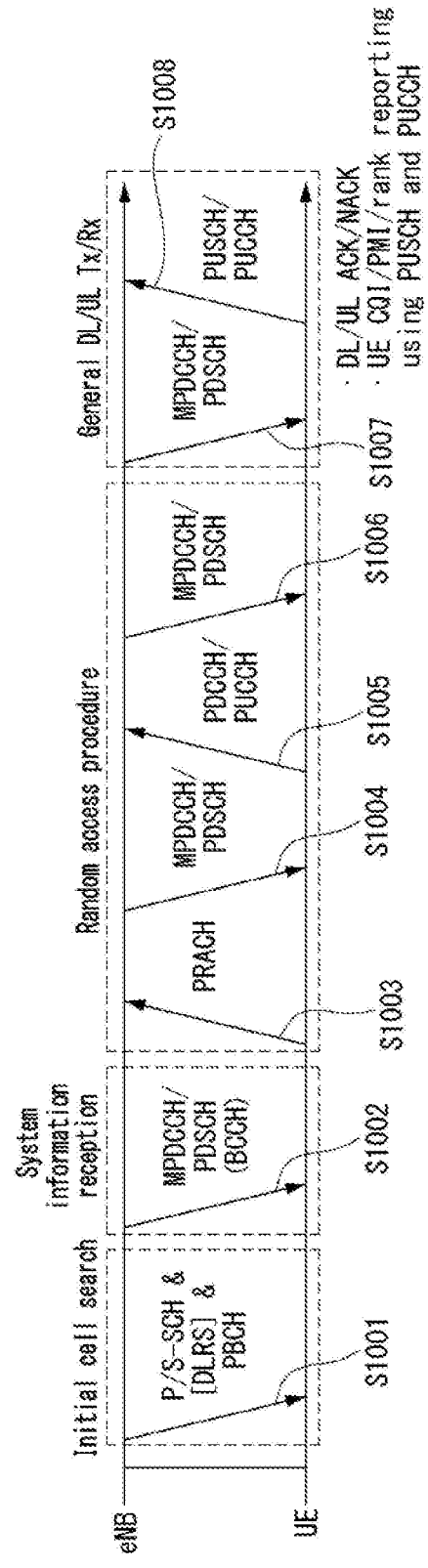
[FIG. 27]

[FIG. 28]
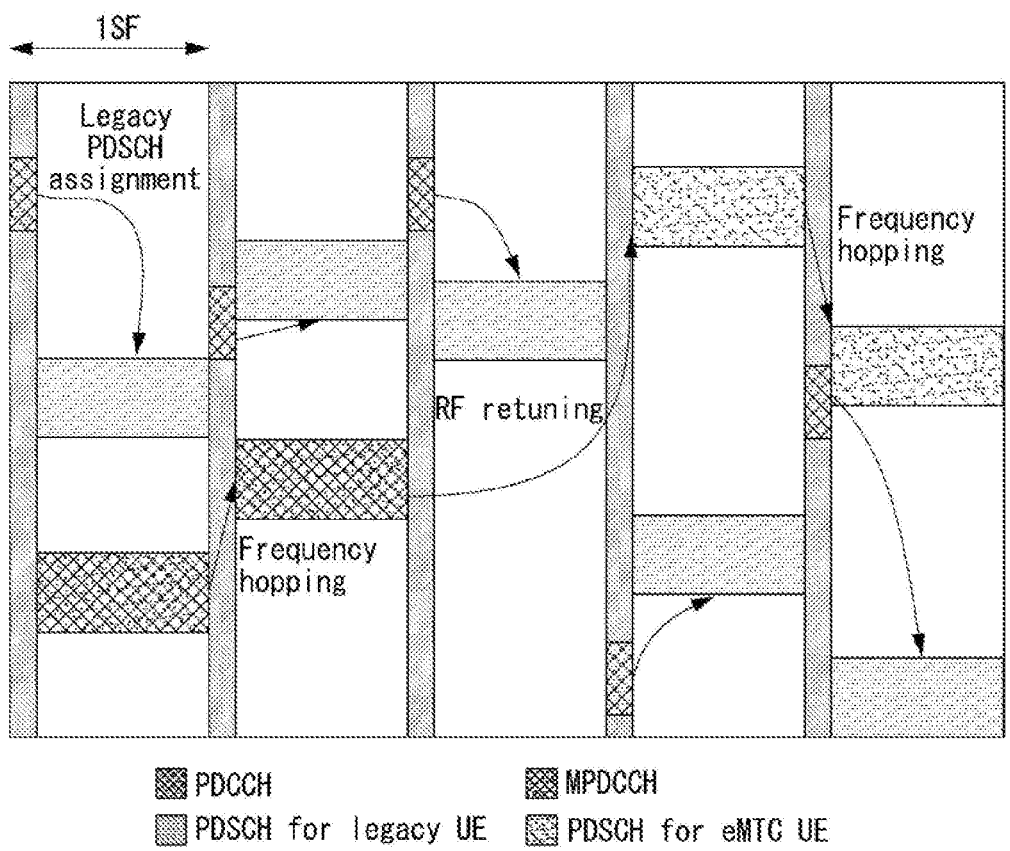

【FIG. 29】
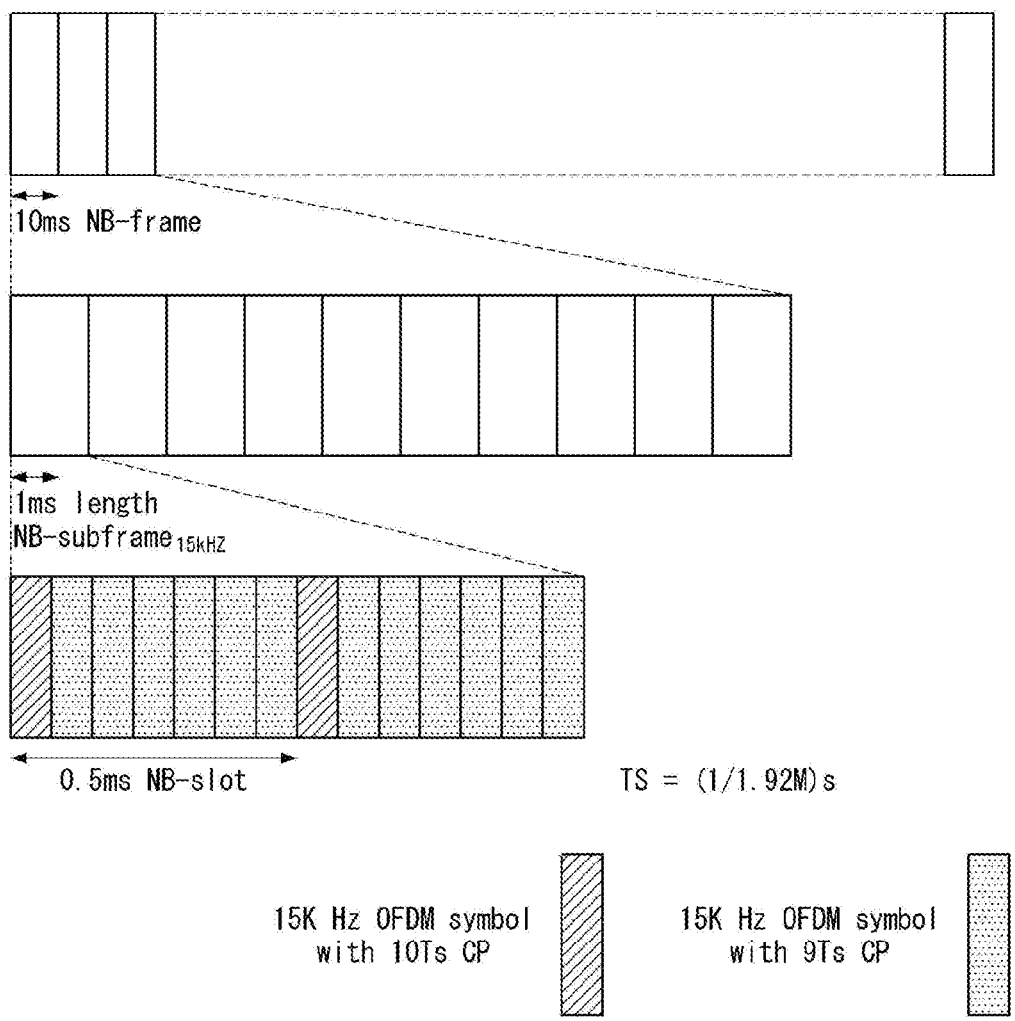

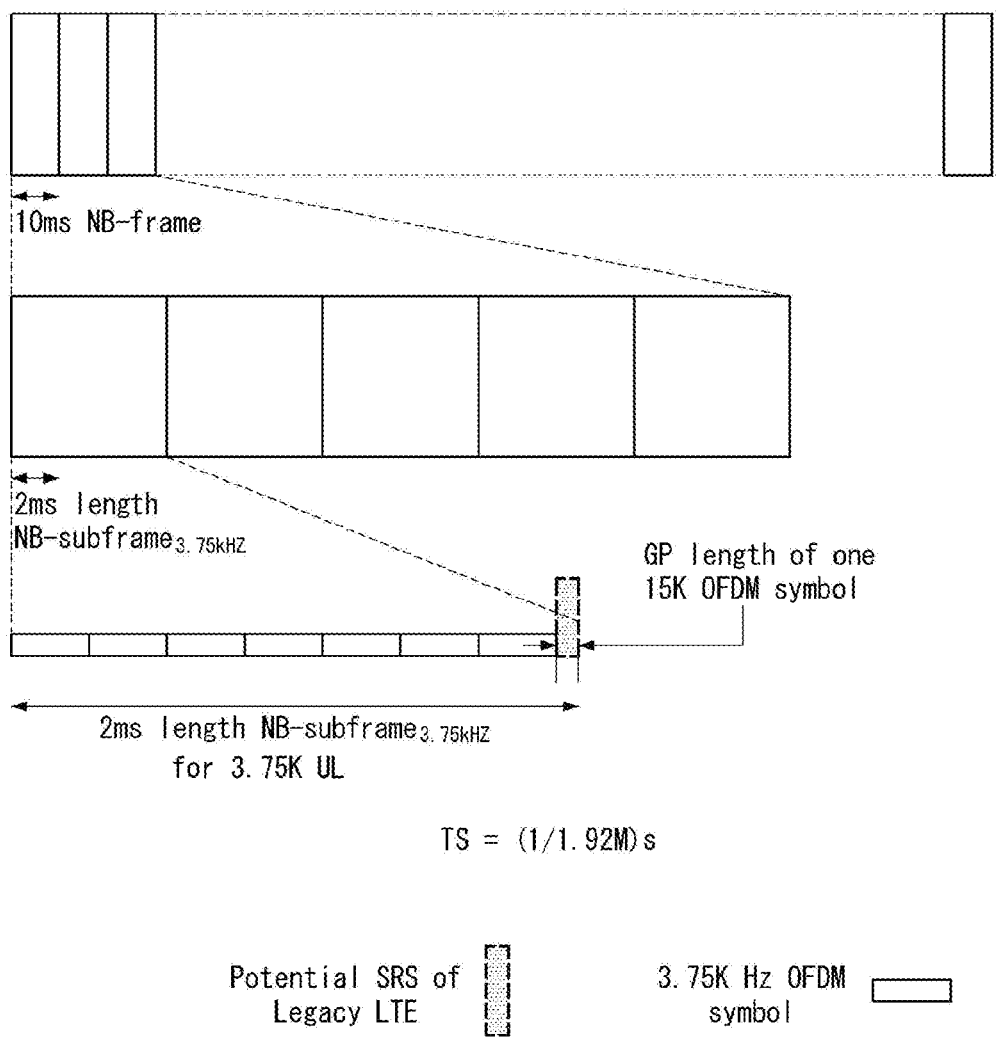
[FIG. 30]

[FIG. 31]
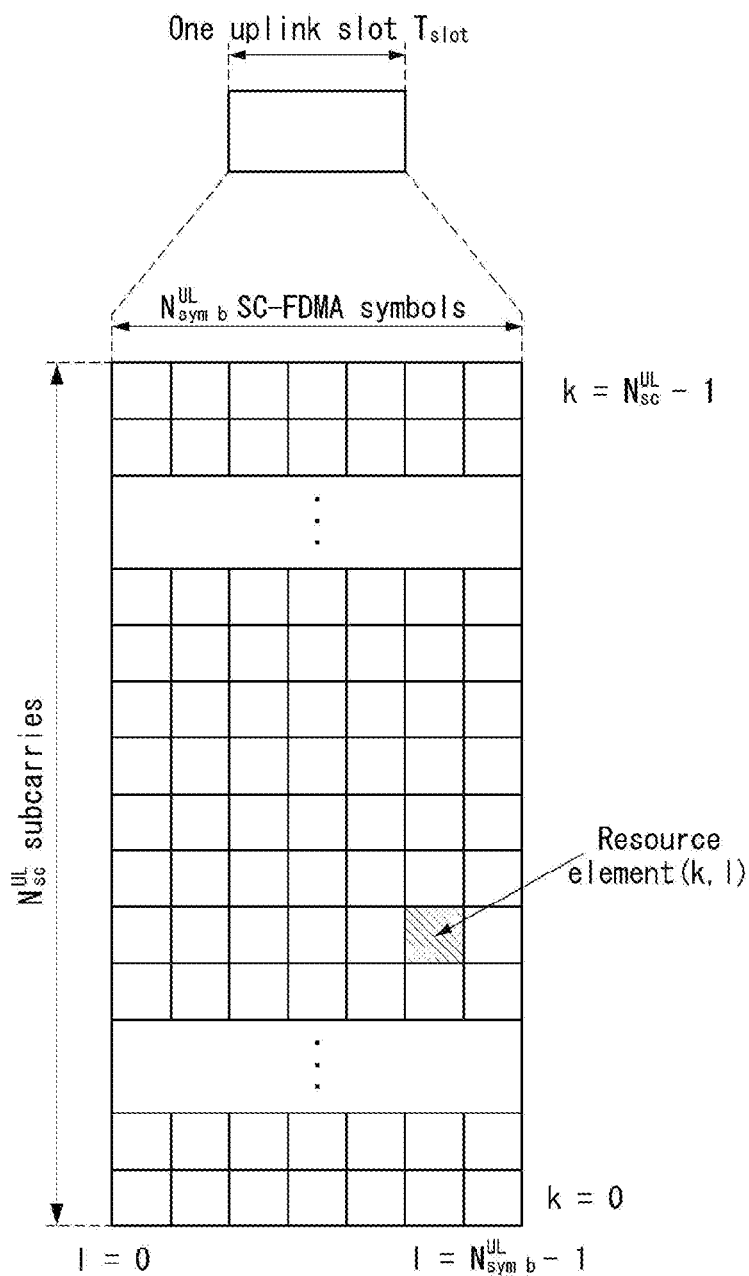

[FIG. 32]
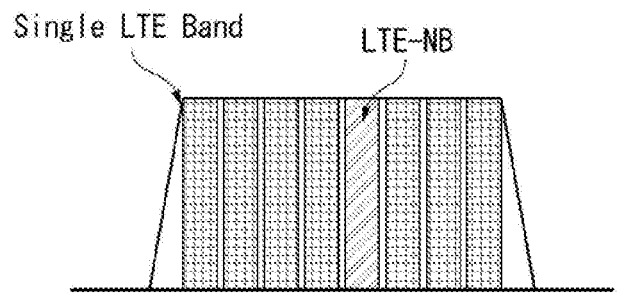
(a) In-band system
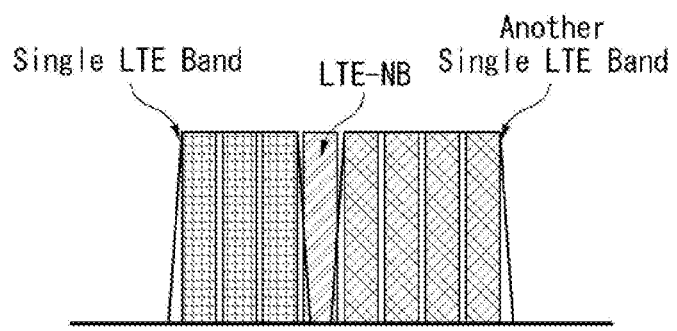
(b) Guard-band system
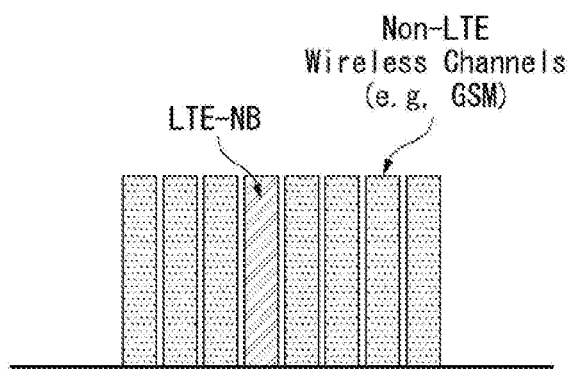
(c) Stand-alone system

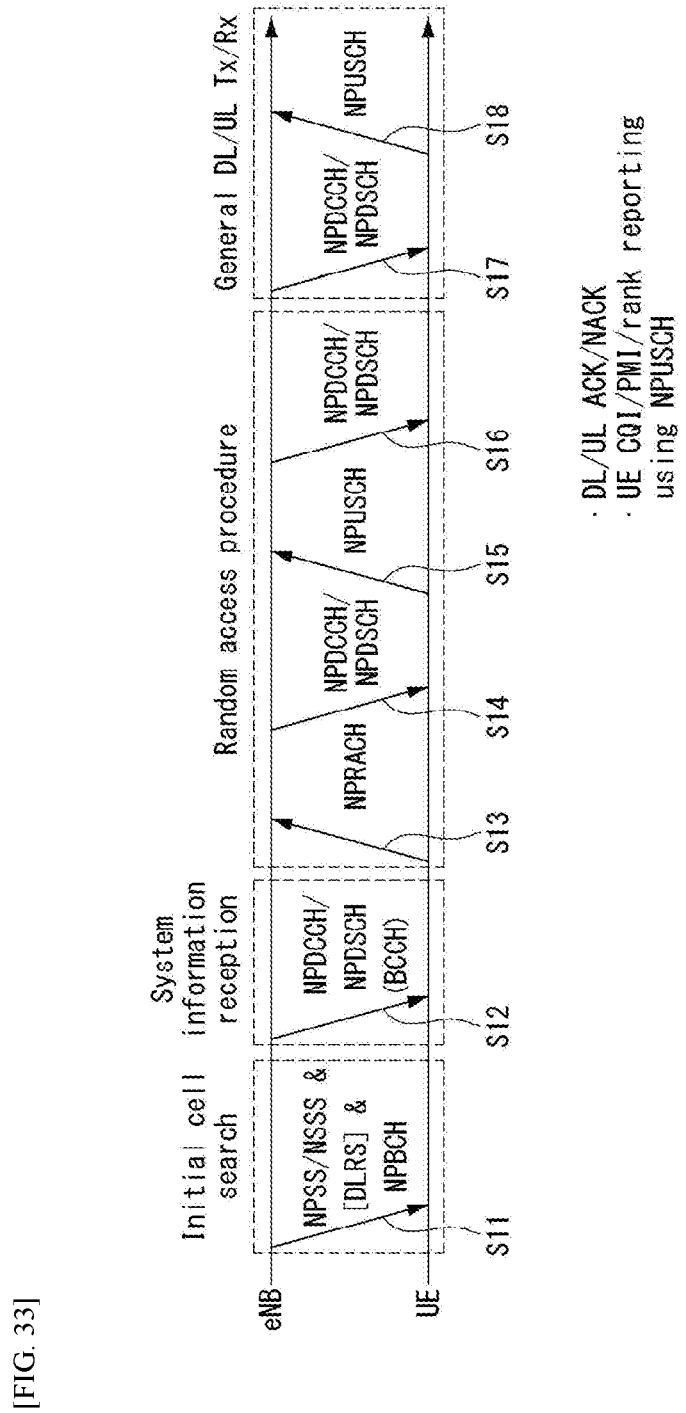

[FIG. 34]
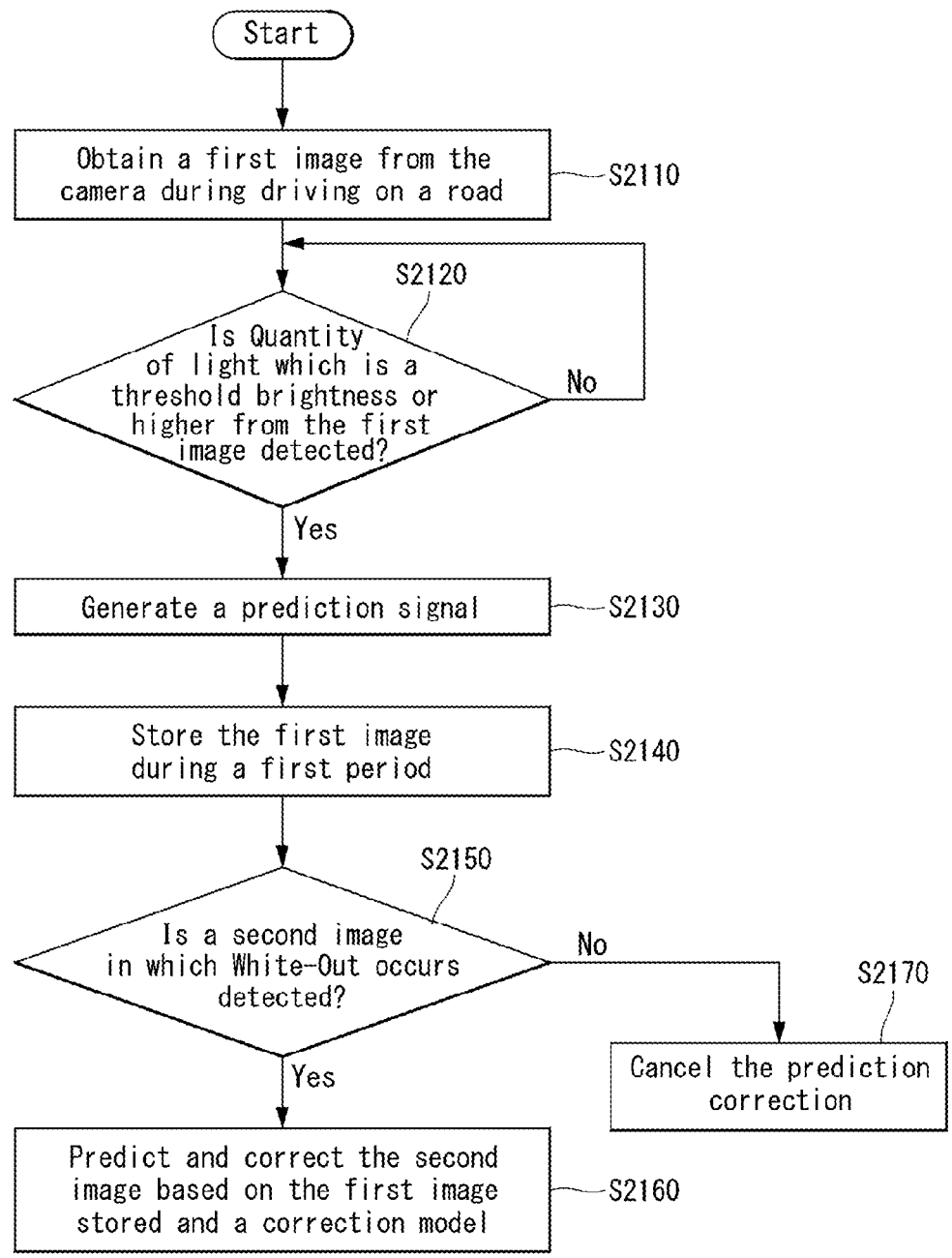

[FIG. 35]
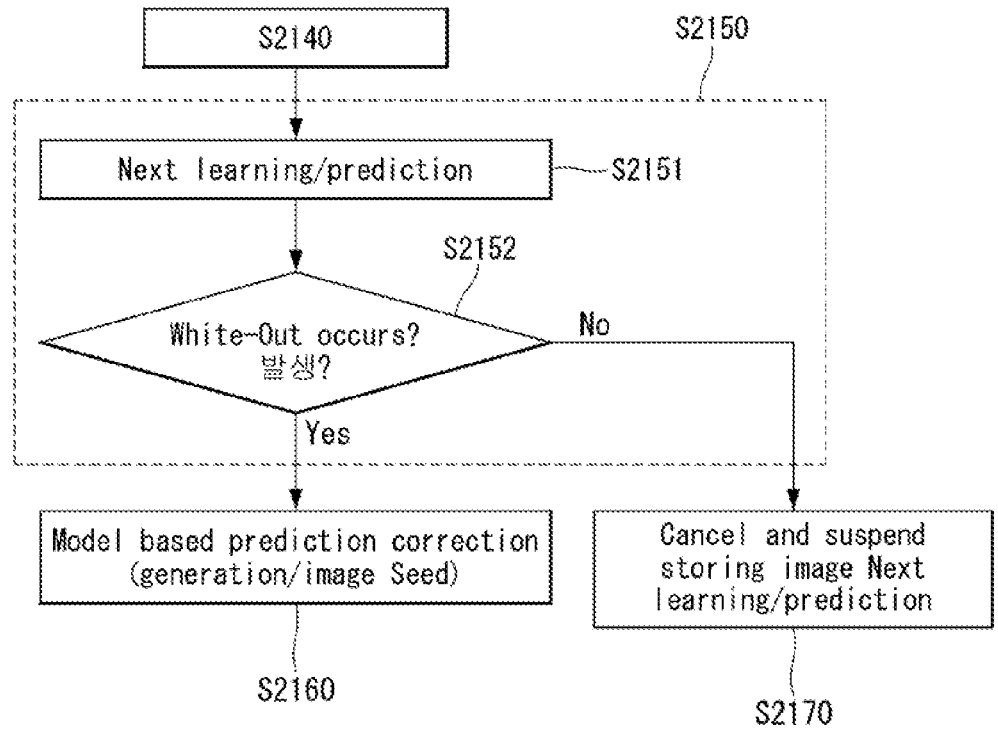
[FIG. 36]
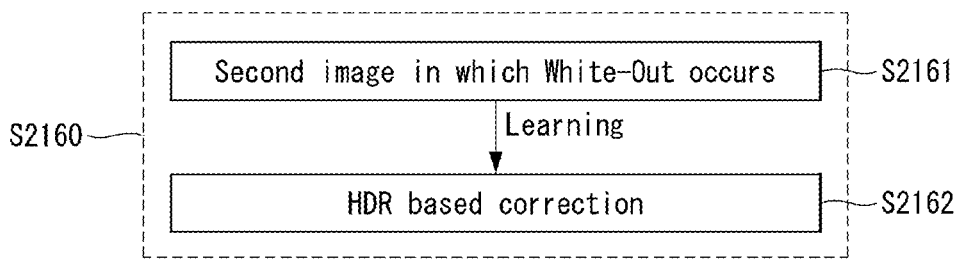
[FIG. 37]
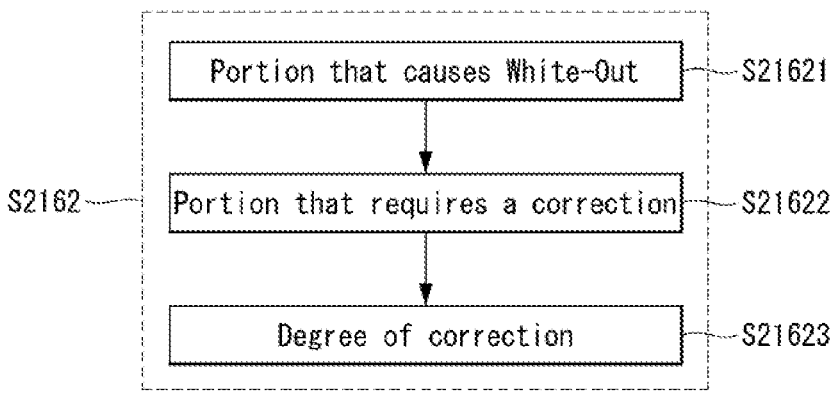

[FIG. 38]
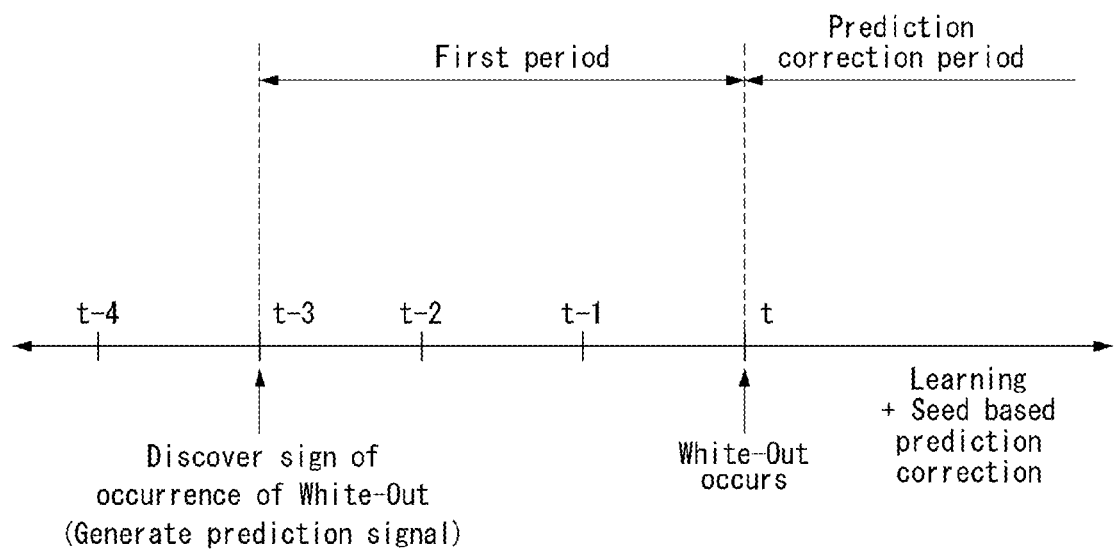
[FIG. 39]
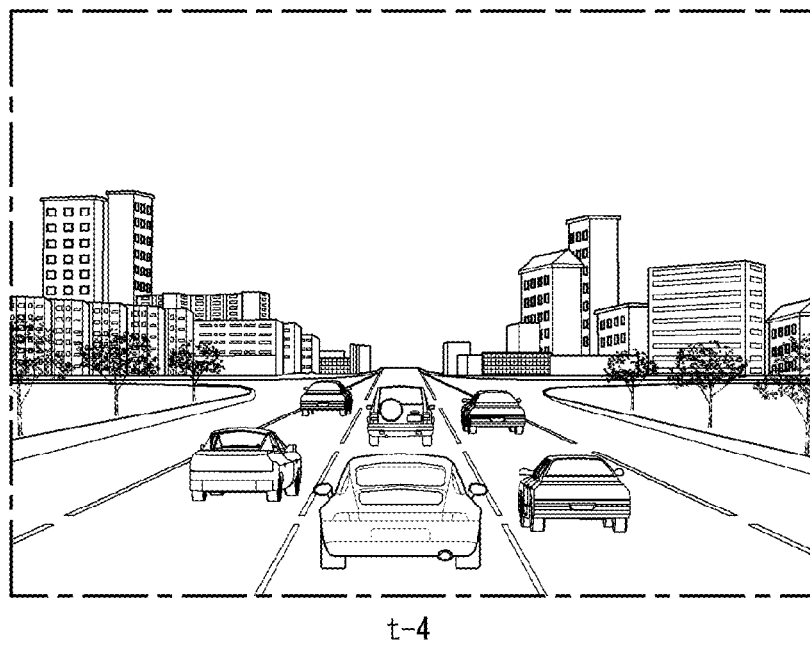

【FIG. 40】
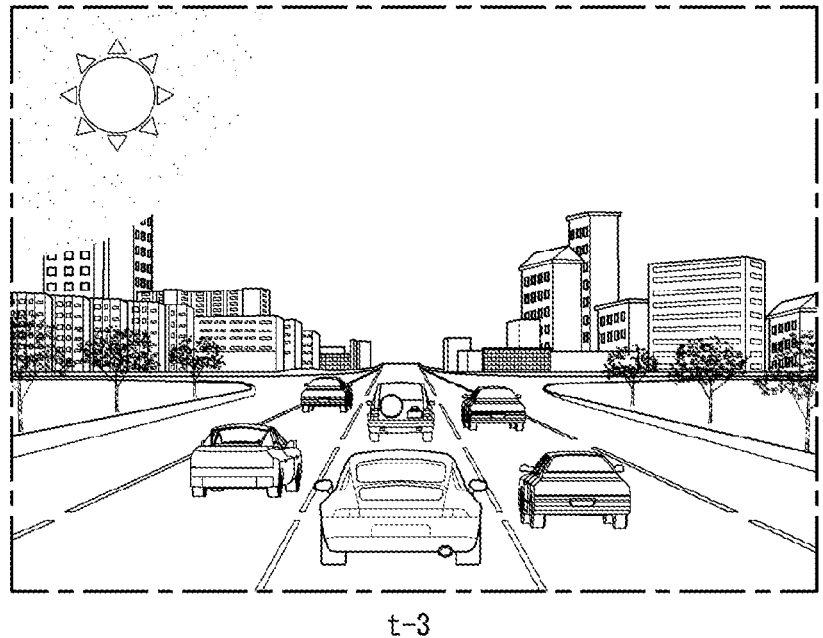
t-3
【FIG. 41】
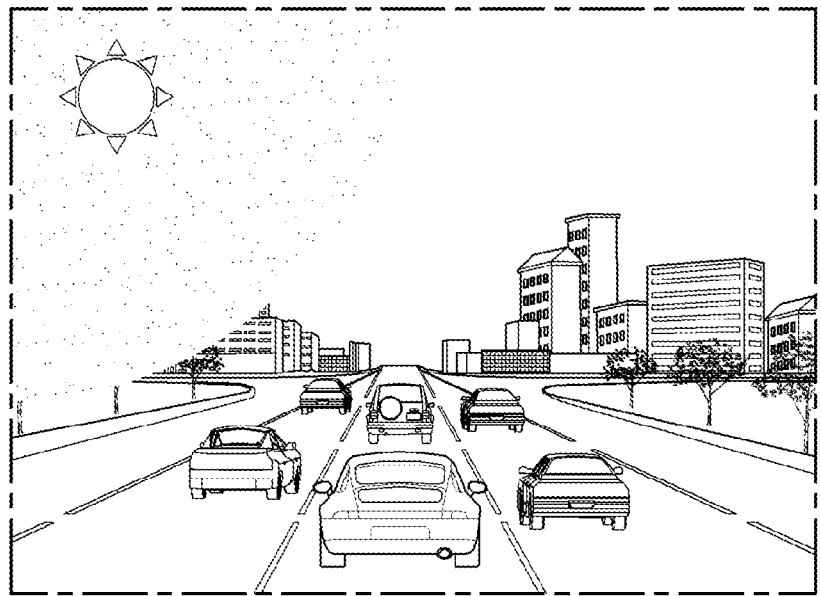
t-2

【FIG. 42】
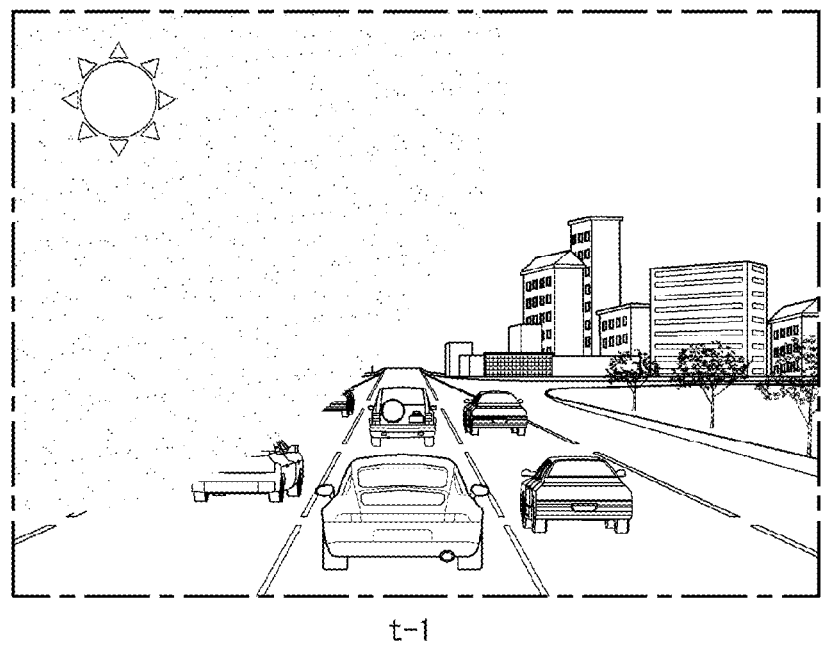
t-1
【FIG. 43】
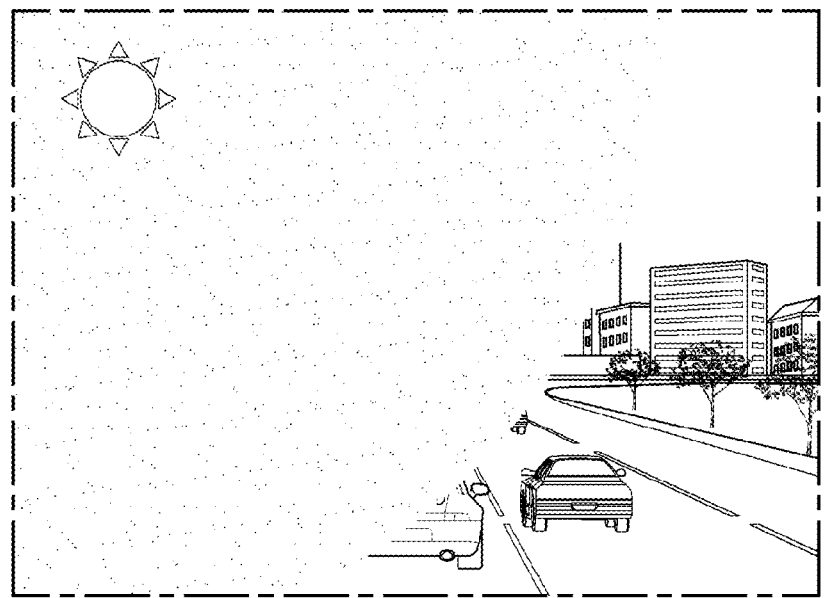
t

[FIG. 44]
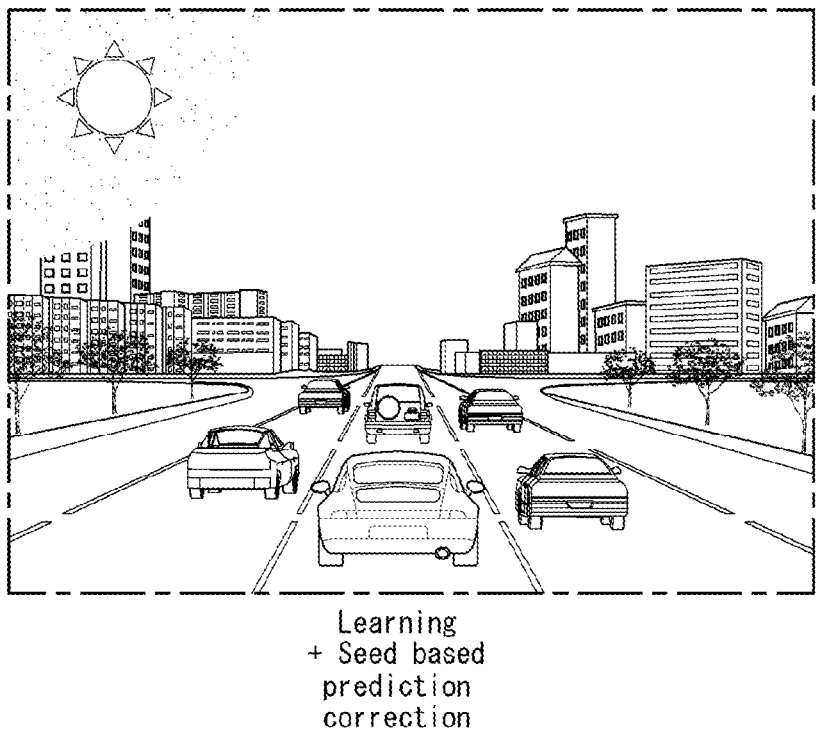
Learning
+ Seed based
prediction
correction
[FIG. 45]
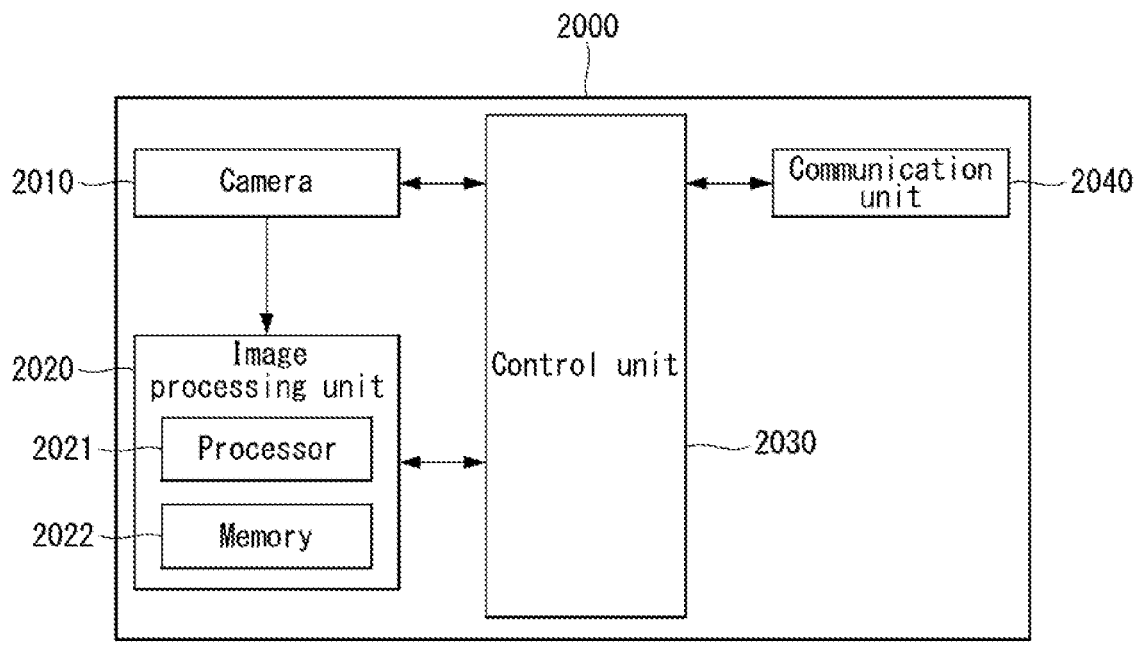

【FIG. 46】
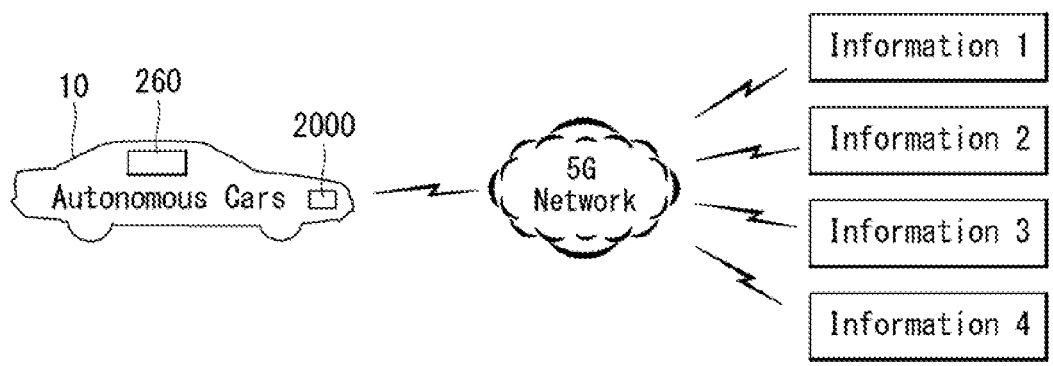
【FIG. 47】
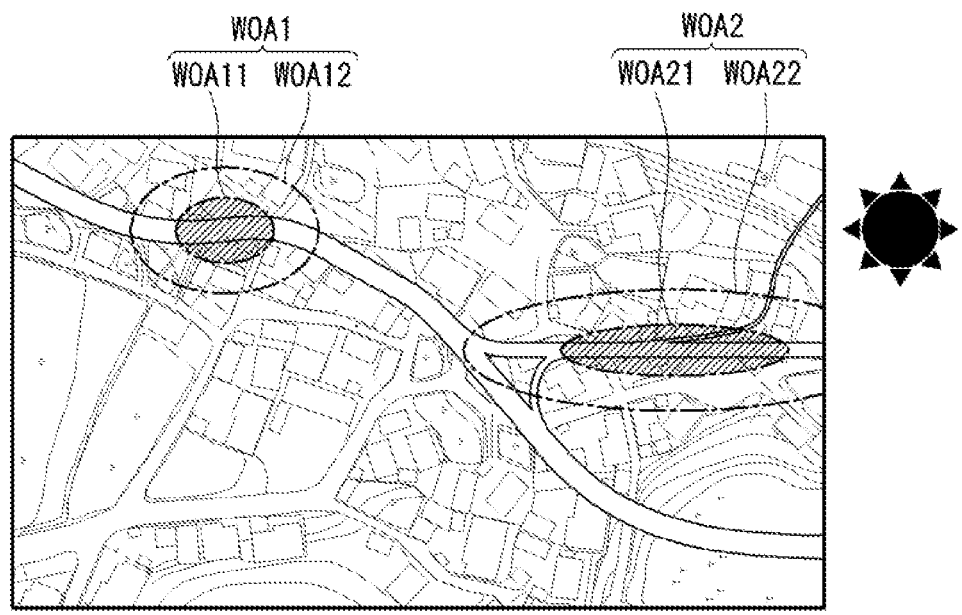

【FIG. 48】
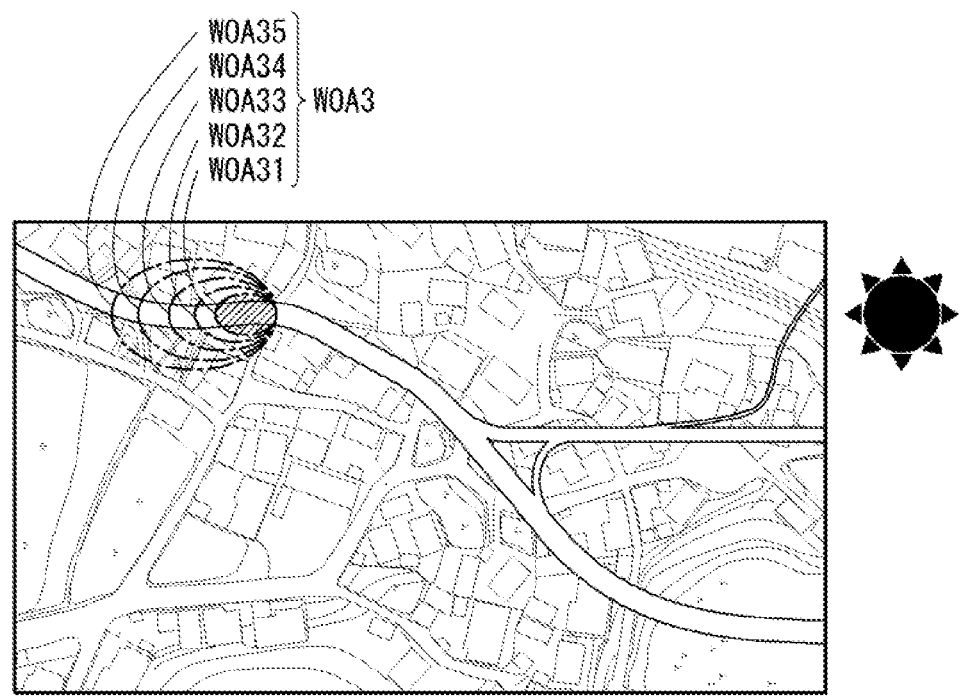
【FIG. 49】
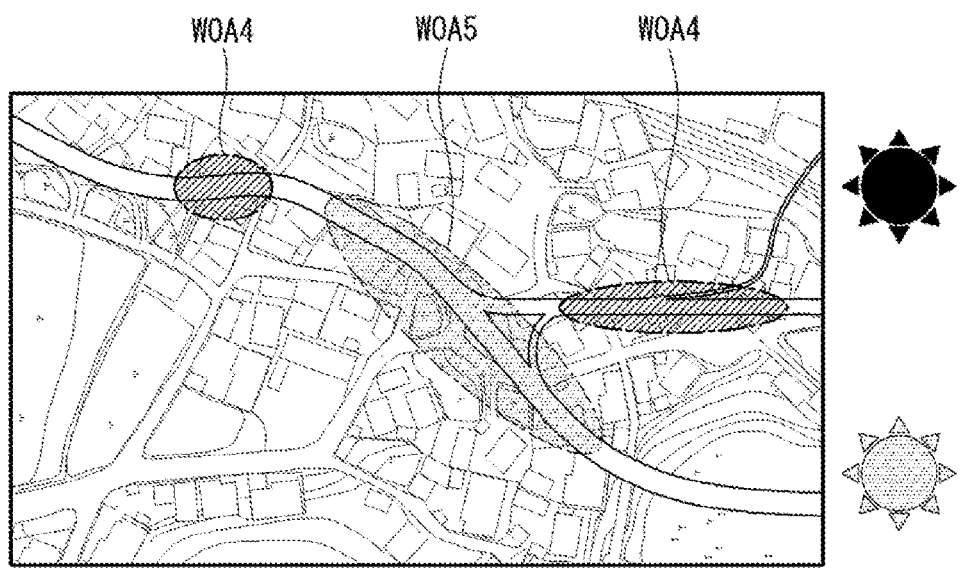

[FIG. 50]
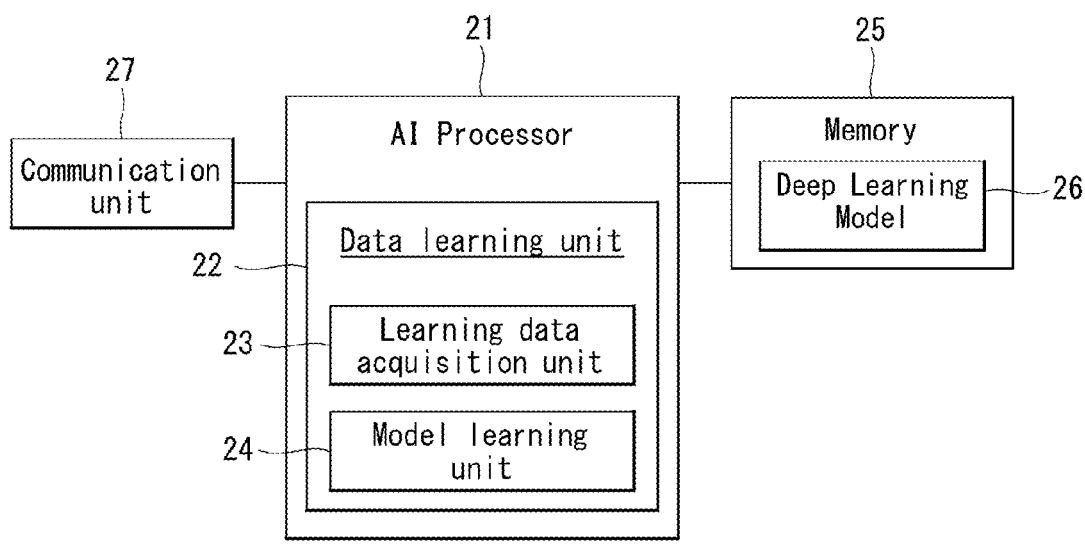

[FIG. 51]
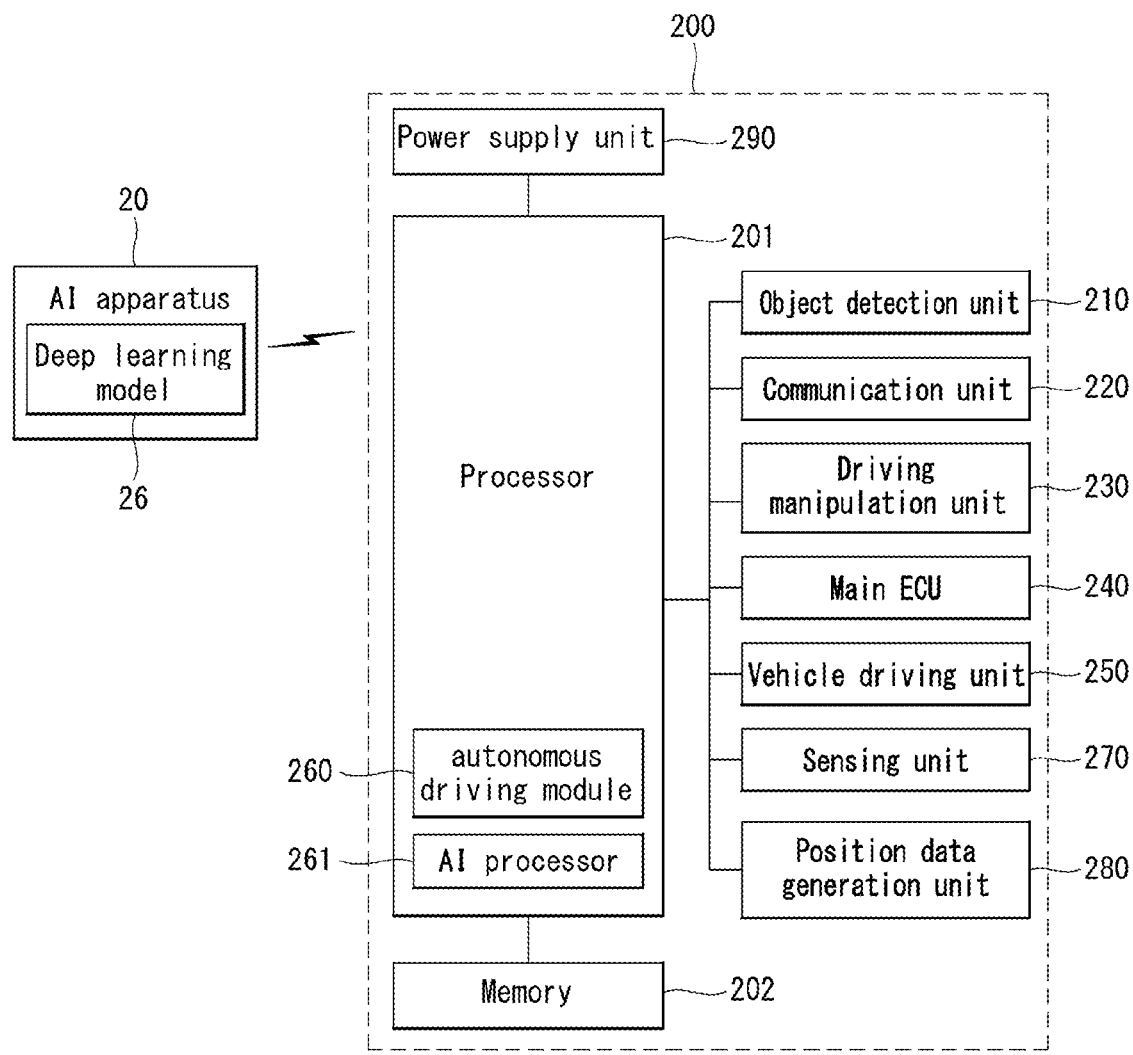

METHOD FOR PROCESSING PICTURE OF AUTOMATIC DRIVING VEHICLE

CROSS-REFERENCE TO RELATED APPLICATIONS

This application is the National Stage filing under 35 U.S.C. 371 of International Application No. PCT/KR2019/005094, filed on Apr. 26, 2019, the contents of which are hereby incorporated by reference herein in its entirety.

TECHNICAL FIELD

The present disclosure relates to a method for processing a picture of an automatic driving vehicle, and more particularly, to a method for processing a picture of an automatic driving which may improve a performance of identifying a picture of an automatic driving vehicle.

BACKGROUND ART

In autonomous driving, various driving operations required while driving a vehicle are automatically performed. For example, an autonomous driving vehicle may travel on a road without a driver manipulating a brake. For automatic driving of a vehicle, various technologies may be used such as maintaining distance between vehicles automatically, alarming deviation of a lane and informing lane-marking, alarming an obstacle of rear or side direction, and the like. Various technologies for automatic driving may be performed through neighboring image information recognized by a vehicle.

An automatic driving vehicle may keep a distance from a front vehicle or control a vehicle breakaway or keeping a lane based on a picture captured in front of the vehicle which is driving. In the case that White-Out phenomenon occurs in the captured image, the automatic driving vehicle is unable to identify a front image accurately owing to White-Out phenomenon, and there is a problem that probability of an occurrence of traffic accident increases significantly.

DISCLOSURE

Technical Problem

An object of the present disclosure is to solve the requirements and/or problem described above.

Furthermore, an object of the present disclosure is to implement a method for processing a picture of an automatic driving vehicle which may improve a performance of identifying the image of an automatic driving vehicle.

Technical Solution

According to an aspect of an embodiment of the present disclosure, a method for processing a picture of an automatic driving vehicle includes obtaining a first image from a camera while a vehicle on which the camera is driving, generating a prediction signal for predicting a sign of occurrence of White-Out from the first image, when a quantity of light which is a threshold brightness or higher from the first image, storing the first image during a first period when the prediction signal is generated, and predicting and correcting a second image based on the first image stored during the first period and a correction model, when the second image in which the White-Out occurs in the first image is detected on a specific time during the first period, and the correction model is a result of learning the second image by processing high dynamic range (HDR) image.

In addition, an area in which the sign of occurrence of White-Out occurs and a remaining area may be distinguished in the first image, and an image quality of the area in which the sign of occurrence of White-Out occurs may be stored differently from an image quality of the remaining area.

In addition, the image quality of the area in which the sign of occurrence of White-Out occurs may be stored higher than the image quality of the remaining area.

In addition, a moving object is extracted from the first image, a position of the extracted object and a motion of the object are computed or detected, and the image quality of the area in which the sign of occurrence of White-Out occurs may be stored higher than the image quality of the remaining area, when the object is included in the area in which the sign of occurrence of White-Out occurs.

In addition, the step of predicting and correcting the second image may include: extracting a portion that causes White-Out in the first image, when the second image is corrected based on the high dynamic range (HDR), selecting a portion in which correction is required through the portion that causes White-Out, and adjusting a degree of correction according to the selected portion that causes White-Out.

In addition, the step of selecting the portion in which correction is required may be selected by providing a priority according to a range in which a portion to be corrected is configured in the portion that causes White-Out.

In addition, when the object is included in the selected portion that causes White-Out, the second image may be predicted and corrected more minutely than otherwise.

Advantageous Effects

The technical effects are as below, of a method for processing a picture of an automatic driving vehicle according to an embodiment of the present disclosure.

According to a method for processing a picture of an automatic driving vehicle according to an embodiment of the present disclosure, a sign of occurrence of White-Out phenomenon is recognized in a picture captured by an automatic driving vehicle, White-Out phenomenon is corrected when White-Out phenomenon occurs, and accordingly, a picture recognition performance can be improved.

Furthermore, according to the present disclosure, after a sign of occurrence of White-Out phenomenon is recognized, an area in which the sign of occurrence of White-Out phenomenon is recognized is stored in higher quality than those of other areas in the image stored in real time, an image quality of a corrected image can be improved.

Furthermore, according to the present disclosure, after a sign of occurrence of White-Out phenomenon is recognized, images are stored in different image qualities in real time, and a large amount of image of high quality can be processed fast.

Furthermore, according to the present disclosure, an occurrence of White-Out phenomenon displayed on a windshield glass is predicted and corrected properly, and accordingly, eye strain can be relieved.

DESCRIPTION OF DRAWINGS

FIG. 1 is a block diagram of a wireless communication system to which the methods proposed herein may be applied.

FIG. 2 shows an example of a basic operation of an user equipment and a 5G network in a 5G communication system.

FIG. 3 illustrates an example of application operation of an user equipment and a 5G network in a 5G communication system.

FIGS. 4 to 7 show an example of an operation of an user equipment using 5G communication.

FIG. 8 is a diagram illustrating an example of a 3GPP signal transmission/reception method.

FIG. 9 illustrates an SSB structure and FIG. 10 illustrates SSB transmission.

FIG. 11 illustrates an example of a random access procedure.

FIG. 12 shows an example of an uplink grant.

FIG. 13 shows an example of a conceptual diagram of uplink physical channel processing.

FIG. 14 shows an example of an NR slot in which a PUCCH is transmitted.

FIG. 15 is a block diagram of a transmitter and a receiver for hybrid beamforming FIG. 16 shows an example of beamforming using an SSB and a CSI-RS.

FIG. 17 is a flowchart illustrating an example of a DL BM process using an SSB.

FIG. 18 shows another example of DL BM process using a CSI-RS.

FIG. 19 is a flowchart illustrating an example of a process of determining a reception beam of a UE.

FIG. 20 is a flowchart illustrating an example of a transmission beam determining process of a BS.

FIG. 21 shows an example of resource allocation in time and frequency domains related to an operation of FIG. 21.

FIG. 22 shows an example of a UL BM process using an SRS.

FIG. 23 is a flowchart illustrating an example of a UL BM process using an SRS.

FIG. 24 is a diagram showing an example of a method of indicating a pre-emption.

FIG. 25 shows an example of a time/frequency set of pre-emption indication.

FIG. 26 shows an example of a narrowband operation and frequency diversity.

FIG. 27 is a diagram illustrating physical channels that may be used for MTC and a general signal transmission method using the same.

FIG. 28 is a diagram illustrating an example of scheduling for each of MTC and legacy LTE.

FIG. 29 shows an example of a frame structure when a subcarrier spacing is 15 kHz.

FIG. 30 shows an example of a frame structure when a subscriber spacing is 3.75 kHz.

FIG. 31 shows an example of a resource grid for NB-IoT uplink.

FIG. 32 shows an example of an NB-IoT operation mode.

FIG. 33 is a diagram illustrating an example of physical channels that may be used for NB-IoT and a general signal transmission method using the same.

FIG. 34 is a diagram illustrating a method for processing a picture of automatic driving vehicle according to an embodiment of the present disclosure.

FIGS. 35 to 37 are diagrams for describing an order of correction in detail in the method for processing a picture of automatic driving vehicle according to an embodiment of the present disclosure.

FIGS. 38 to 44 are diagrams illustrating a correction of a picture displayed on a wind-shield glass of an automatic driving vehicle according to an embodiment of the present disclosure.

FIG. 45 is a diagram illustrating an image processing apparatus of an automatic driving vehicle according to an embodiment of the present disclosure.

FIG. 46 is a diagram for describing an automatic driving vehicle to perform 5G communication according to an embodiment of the present disclosure.

FIGS. 47 to 49 are diagrams for describing a prediction area in which White-Out may occur according to an embodiment of the present disclosure.

FIG. 50 is a block diagram of an AI apparatus according to an embodiment of the present disclosure.

FIG. 51 is a diagram for describing a system in which an automatic driving vehicle and an AI apparatus are linked according to an embodiment of the present disclosure.

MODE FOR DISCLOSURE

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Autonomous Vehicle and 5G Network

FIG. 1 is a block diagram of a wireless communication system to which methods proposed in the disclosure are applicable.

Referring to FIG. 1, a device including an autonomous driving module is defined as a first communication device (910 of FIG. 1 and see paragraph N for detailed description), and a processor 911 may perform detailed autonomous driving operations.

Another vehicle or a 5G network communicating with the autonomous driving device is defined as a second communication device (920 of FIG. 1, and see paragraph N for details), and a processor 921 may perform detailed autonomous driving operations.

Details of a wireless communication system, which is defined as including a first communication device, which is an autonomous vehicle, and a second communication device, which is a 5G network, may refer to paragraph N.

B. AI Operation Using 5G Communication

FIG. 2 shows an example of a basic operation of a user equipment and a 5G network in a 5G communication system.

The UE transmits the specific information transmission to the 5G network (S1).

Then, the 5G network performs 5G processing on the specific information (S2).

In this connection, the 5G processing may include AI processing.

Then, the 5G network transmits a response including the AI processing result to the UE (S3).

FIG. 3 shows an example of application operation of a user terminal and a 5G network in a 5G communication system.

The UE performs an initial access procedure with the 5G network (S20). The initial connection procedure will be described in more detail in paragraph F.

Then, the UE performs a random access procedure with the 5G network (S21). The random access procedure will be described in more detail in paragraph G.

The 5G network transmits an UL grant for scheduling transmission of specific information to the UE (S22). The process of the UE receiving the UL grant will be described in more detail in the UL transmission/reception operation in paragraph H.

Then, the UE transmits specific information to the 5G network based on the UL grant (S23).

Then, the 5G network performs 5G processing on the specific information (S24).

In this connection, the 5G processing may include AI processing.

Then, the 5G network transmits a DL grant for scheduling transmission of the 5G processing result of the specific information to the UE (S25).

Then, the 5G network transmits a response including the AI processing result to the UE based on the DL grant (S26).

In FIG. 3, an example in which the AI operation and the initial connection process, or the random access process and the DL grant reception process are combined with each other has been exemplarily described using the S20 to S26. However, the present invention is not limited thereto.

For example, the initial connection process and/or the random access process may be performed using the process of S20, S22, S23, S24, and S24. In addition, the initial connection process and/or the random access process may be performed using, for example, the process of S21, S22, S23, S24, and S26. Further, the AI operation and the downlink grant reception procedure may be combined with each other using the process of S23, S24, S25, and S26.

C. UE Operation Using 5G Communication

FIG. 4 to FIG. 7 show an example of the operation of the UE using 5G communication.

Referring first to FIG. 4, the UE performs an initial access procedure with the 5G network based on SSB to obtain DL synchronization and system information (S30).

Then, the UE performs a random access procedure with the 5G network for UL synchronization acquisition and/or UL transmission (S31).

Then, the UE receives an UL grant to the 5G network to transmit specific information (S32).

Then, the UE transmits the specific information to the 5G network based on the UL grant (S33).

Then, the UE receives a DL grant for receiving a response to the specific information from the 5G network (S34).

Then, the UE receives a response including the AI processing result from the 5G network based on the DL grant (S35).

A beam management (BM) process may be added to S30. A beam failure recovery process may be added to S31. A quasi-co location relationship may be added to S32 to S35. A more detailed description thereof will be described in more detail in paragraph I.

Next, referring to FIG. 5, the UE performs an initial access procedure with the 5G network based on SSB to obtain DL synchronization and system information (S40).

Then, the UE performs a random access procedure with the 5G network for UL synchronization acquisition and/or UL transmission (S41).

Then, the UE transmits the specific information to the 5G network based on a configured grant (S42). A procedure for configuring the grant in place of receiving the UL grant from the 5G network will be described in more detail in paragraph H.

Then, the UE receives a DL grant for receiving a response to the specific information from the 5G network (S43).

Then, the UE receives the response including the AI processing result from the 5G network based on the DL grant (S44).

Next, referring to FIG. 6, the UE performs an initial access procedure with the 5G network based on the SSB to obtain DL synchronization and system information (S50).

Then, the UE performs a random access procedure with the 5G network for UL synchronization acquisition and/or UL transmission (S51).

Then, the UE receives a DownlinkPreemption IE from the 5G network (S52).

The UE receives a DCI format 2_1 including a preamble indication from the 5G network based on the DownlinkPreemption IE (S53).

Then, the UE does not perform (or expect or assume) the reception of the eMBB data using a resource (PRB and/or OFDM symbol) indicated by the pre-emption indication (S54).

The operation related to the preemption indication is described in more detail in paragraph J.

Then, the UE receives an UL grant to the 5G network to transmit the specific information (S55).

Then, the UE transmits the specific information to the 5G network based on the UL grant (S56).

Then, the UE receives a DL grant for receiving a response to the specific information from the 5G network (S57).

Then, the UE receives a response including the AI processing result from the 5G network based on the DL grant (S58).

Next, referring to FIG. 7, the UE performs an initial access procedure with the 5G network based on SSB to obtain DL synchronization and system information (S60).

Then, the UE performs a random access procedure with the 5G network for UL synchronization acquisition and/or UL transmission (S61).

Then, the UE receives an UL grant to the 5G network to transmit the specific information (S62).

The UL grant includes information on the number of repetitions of transmission of the specific information. The specific information is repeatedly transmitted based on the information on the repetition number (S63).

The UE transmits the specific information to the 5G network based on the UL grant.

Then, the iterative transmission of the specific information is performed using the frequency hopping. The first transmission of the specific information may be done using a first frequency resource, and the second transmission of the specific information may be done using a second frequency resource.

The specific information may be transmitted over a narrow band of 6RB (Resource Block) or 1RB (Resource Block).

Then, the UE receives a DL grant for receiving a response to the specific information from the 5G network (S64).

Then, the UE receives a response including the AI processing result from the 5G network based on the DL grant (S65).

The mMTC described in FIG. 7 will be described in more detail in the paragraph K.

D. Introduction

Hereinafter, downlink (DL) refers to communication from a base station (BS) to user equipment (UE), and uplink (UL) refers to communication from a UE to a BS. In the downlink, a transmitter may be part of the BS and a receiver may be part of the UE. In the uplink, a transmitter may be part of the UE and a receiver may be part of the BS. Herein, the UE may be represented as a first communication device and the BS may be represented as a second communication device. The BS may be replaced with a term such as a fixed station, a Node B, an evolved NodeB (eNB), a next generation nodeB (gNB), a base transceiver system (BTS), an access point (AP), a network or a 5G (5th generation), artificial intelligence (AI) system, a road side unit (RSU), robot, and the like. Also, the UE may be replaced with a terminal, a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, and the like.

Techniques described herein may be used in a variety of wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3rd Generation Partnership Project (3GPP) Long Term Evolution (LTE) is a part of Evolved UMTS (E-UMTS) using E-UTRA. LTE-Advanced (LTE-A)/LTE-A pro is an evolution of 3GPP LTE. 3GPP NR NR(New Radio or New Radio Access Technology) is an evolution of 3GPP LTE/LTE-A/LTE-A pro.

For clarity, the following description focuses on a 3GPP communication system (e.g., LTE-A, NR), but technical features of the present invention is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP 5G (5th generation) technology refers to technology after TS 36.xxx Release 15 and technology after TS 38.XXX Release 15. The technology after TS 38.xxx Release 15 may be referred to as 3GPP NR, and technology after TS 36.xxx Release 15 may be referred to as enhanced LTE. "xxx" refers to a standard document detail number. LTE/NR may be collectively referred to as a 3GPP system.

In this disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a power level lower than a power level of a BS. At least one antenna is installed per node. The antenna may refer to a physical antenna or refer to an antenna port, a virtual antenna, or an antenna group. A node may be referred to as a point.

In this specification, a cell refers to a prescribed geographical area to which one or more nodes provide a communication service. A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times.

In this specification, communicating with a specific cell may refer to communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a BS or node which provides a communication service to the specific cell and a UE.

Meanwhile, a "cell" associated with radio resource may be defined as a combination of DL resources and UL resources, that is, a combination of a DL component carrier (CC) and a UL CC. A cell may be configured to be a DL resource alone or a combination of DL resources and UL resources. If carrier aggregation is supported, a linkage between a carrier frequency of a DL resource (or DL CC) and a carrier frequency of a UL resource (or UL CC) may be indicated by system information transmitted through a corresponding cell. Here, the carrier frequency may be the same as or different from a center frequency of each cell or CC. Hereinafter, a cell operating at a primary frequency will be referred to as a primary cell (Pcell) or a PCC, and a cell operating at a secondary frequency will be referred to as a secondary cell (Scell) Or SCC. The Scell may be configured after the UE performs a radio resource control (RRC) connection establishment with the BS to establish an RRC connection therebetween, that is, after the UE is RRC_CONNECTED. Here, RRC connection may refer to a channel through which an RRC of the UE and an RRC of the BS may exchange RRC messages with each other. The Scell may be configured to provide additional radio resources to the UE. Depending on the capabilities of the UE, the Scell may form a set of serving cells for the UE together with the Pcell. In the case of a UE which is in the RRC_CONNECTED state but is not configured in carrier aggregation or does not support carrier aggregation, there is only one serving cell that is only configured as the Pcell.

Cells support unique wireless access technologies. For example, transmission/reception according to LTE radio access technology (RAT) is performed on an LTE cell, and transmission/reception according to 5G RAT is performed on a 5G cell.

A carrier aggregation (CA) system refers to a system for supporting a wide bandwidth by aggregating a plurality of carriers each having a narrower bandwidth than a target bandwidth. A CA system is different from OFDMA technology in that DL or UL communication is performed using a plurality of carrier frequencies each of which forms a system bandwidth (or a channel bandwidth), whereas the OFDM system carries a base frequency band divided into a plurality of orthogonal subcarriers on a single carrier frequency to perform DL or UL communication. For example, in the case of OFDMA or orthogonal frequency division multiplexing (OFDM), one frequency band having a constant system bandwidth is divided into a plurality of subcarriers having a certain subscriber spacing, and information/data is mapped in the plurality of subcarriers, and the frequency band to which the information/data is mapped is unconverted and transmitted as a carrier frequency of the frequency band. In the case of wireless carrier aggregation, frequency bands having their own system bandwidth and carrier frequency may be simultaneously used for communication, and each frequency band used for carrier aggregation may be divided into a plurality of subcarriers having a predetermined subcarrier spacing.

The 3GPP-based communication standard defines DL physical channels corresponding to resource elements carrying information derived from a higher layer of a physical layer (e.g., a medium access control (MAC) layer, a radio link control (RLC) layer, a packet data convergence protocol (PDCP) layer, a radio resource control (RRC) layer, a service data adaptation protocol (SDAP), and a non-access stratum (NAS) layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS, a positioning RS (PRS), channel state information RS (CSI-RS), and a demodulation reference signal (DMRS) may be defined as DL RSs. Meanwhile, the 3GPP-based communication standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signals.

In this specification, a physical downlink control channel (PDCCH) and a physical downlink shared channel (PDSCH) may refer to a set of a time-frequency resources or a set of resource elements carrying downlink control information (DCI) and downlink data, respectively. In addition, a physical uplink control channel, a physical uplink shared channel (PUSCH), and a physical random access channel refer to a set of a time-frequency resources or a set of resource elements carrying uplink control information (UCI), uplink data and random access signals, respectively. Hereinafter, UE's transmitting an uplink physical channel (e.g., PUCCH, PUSCH, or PRACH) means transmitting UCI, uplink data, or a random access signal on the corresponding uplink physical channel or through then uplink physical channel. BS's receiving an uplink physical channel may refer to receiving DCI, uplink data, or random access signal on or through the uplink physical channel. BS's transmitting a downlink physical channel (e.g., PDCCH and PDSCH) has the same meaning as transmitting DCI or downlink data on or through the corresponding downlink physical channel. UE's receiving a downlink physical channel may refer to receiving DCI or downlink data on or through the corresponding downlink physical channel.

In this specification, a transport block is a payload for a physical layer. For example, data given to a physical layer from an upper layer or a medium access control (MAC) layer is basically referred to as a transport block.

In this specification, HARQ (Hybrid Automatic Repeat and reQuest) is a kind of error control method. HARQ-acknowledgement (HARQ-ACK) transmitted through the downlink is used for error control on uplink data, and HARQ-ACK transmitted on the uplink is used for error control on downlink data. A transmitter that performs the HARQ operation transmits data (e.g., a transport block, a codeword) and waits for an acknowledgment (ACK). A receiver that performs the HARQ operation sends an acknowledgment (ACK) only when data is properly received, and sends a negative acknowledgment (NACK) if an error occurs in the received data. The transmitter may transmit (new) data if ACK is received, and retransmit data if NACK is received. After the BS transmits scheduling information and data according to the scheduling information, a time delay occurs until the ACK/NACK is received from the UE and retransmission data is transmitted. This time delay occurs due to channel propagation delay and a time taken for data decoding/encoding. Therefore, when new data is sent after the current HARQ process is finished, a blank space occurs in the data transmission due to the time delay. Therefore, a plurality of independent HARQ processes are used to prevent generation of the blank space in data transmission during the time delay period. For example, if there are seven transmission occasions between an initial transmission and retransmission, the communication device may operate seven independent HARQ processes to perform data transmission without a blank space. Utilizing the plurality of parallel HARQ processes, UL/DL transmissions may be performed continuously while waiting for HARQ feedback for a previous UL/DL transmission.

In this specification, channel state information (CSI) refers to information indicating quality of a radio channel (or a link) formed between a UE and an antenna port. The CSI may include at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

In this specification, frequency division multiplexing (FDM) may refer to transmission/reception of signals/channels/users at different frequency resources, and time division multiplexing (TDM) may refer to transmission/reception of signals/channels/users at different time resources.

In the present invention, a frequency division duplex (FDD) refers to a communication scheme in which uplink communication is performed on an uplink carrier and downlink communication is performed on a downlink carrier wave linked to the uplink carrier, and time division duplex (TDD) refers to a communication scheme in which uplink and downlink communications are performed by dividing time on the same carrier.

For background information, terms, abbreviations, etc. used in the present specification, may refer to those described in standard documents published before the present invention. For example, the following document may be referred:

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (ULE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (5GCN) via non-3GPP access networks
3GPP TS 24.526: User Equipment (UE) policies for 5G System (5GS); Stage 3

E. 3GPP Signal Transmission/Reception Method

FIG. 8 is a diagram illustrating an example of a 3GPP signal transmission/reception method.

Referring to FIG. 8, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). The initial cell search procedure is described in detail in paragraph F. below.

After initial cell search, the UE can acquire broadcast information in the cell by receiving a physical broadcast channel (PBCH) from the BS. Further, the UE can receive a downlink reference signal (DL RS) in the initial cell search step to check a downlink channel state.

After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed. The random access procedure is described in detail in paragraph G. below.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH.

The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

F. Initial Access (IA) Process

Synchronization Signal Block (SSB) Transmission and Related Operation

FIG. 9 illustrates an SSB structure. The UE can perform cell search, system information acquisition, beam alignment for initial access, and DL measurement on the basis of an SSB. The SSB is interchangeably used with a synchronization signal/physical broadcast channel (SS/PBCH) bloc.

Referring to FIG. 9, the SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers. The PBCH is encoded/decoded on the basis of a polar code and modulated/demodulated according to quadrature phase shift keying (QPSK). The PBCH in the OFDM symbol includes data resource elements (REs) to which a complex modulation value of a PBCH is mapped and DMRS REs to which a demodulation reference signal (DMRS) for the PBCH is mapped. There are three DMRS REs per resource block of the OFDM symbol, and there are three data REs between the DMRS REs.

Cell Search

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

The cell search procedure of the UE may be summarized as shown in Table 1 below.

TABLE 1

| | Type of Signals | Operations |
|---|---|---|
| 1st step | PSS | SS/PBCH block (SSB) symbol timing acquisition Cell ID detection within a cell ID group(3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration |

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

FIG. 10 illustrates SSB transmission.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS). An SSB burst set is configured at a start portion of the SSB period. The SSB burst set includes a 5 ms time window (i.e., half-frame), and the SSB may be transmitted up to N times within the SS burst set. The maximum transmission number L of the SSB may be given as follows according to a frequency band of a carrier wave. One slot includes a maximum of two SSBs.

For frequency range up to 3 GHz, L=4
For frequency range from 3 GHz to 6 GHz, L=8
For frequency range from 6 GHz to 52.6 GHz, L=64

A time position of an SSB candidate in the SS burst set may be defined according to a subscriber spacing. The SSB candidate time position is indexed from 0 to L−1 (SSB index) in time order within the SSB burst set (i.e., half-frame).

A plurality of SSBs may be transmitted within a frequency span of a carrier wave. Physical layer cell identifiers of these SSBs need not be unique, and other SSBs may have different physical layer cell identifiers.

The UE may acquire the DL synchronization by detecting the SSB. The UE may identify a structure of the SSB burst set on the basis of the detected SSB (time) index and thus detect a symbol/slot/half-frame boundary. The number of the frame/half-frame to which the detected SSB belongs may be identified using system frame number (SFN) information and half-frame indication information.

Specifically, the UE may acquire a 10-bit SFN for a frame to which the PBCH belongs from the PBCH. Next, the UE may acquire 1-bit half-frame indication information. For example, if the UE detects a PBCH with a half-frame indication bit set to 0, it may determine that the SSB, to which the PBCH belongs, belongs to a first half-frame in the frame, and if the UE detects a PBCH with a half-frame indication bit set to 1, it may determine that the SSB, to which the PBCH belongs, belongs to a second half-frame in the frame. Finally, the UE may acquire an SSB index of the SSB to which the PBCH belongs on the basis of a DMRS sequence and PBCH payload carried by the PBCH.

Acquisition of system information (SI)

SI is divided into a master information block (MIB) and a plurality of system information blocks (SIBs). The SI other than the MIB may be referred to as remaining minimum system information (RMSI). Details thereof may be referred to the following:

The MIB includes information/parameters for monitoring the PDCCH scheduling PDSCH carrying system information block1 (SIB1) and is transmitted by the BS through the PBCH of the SSB. For example, the UE may check whether a control resource set (CORESET) exists for the Type 0-PDCCH common search space on the basis of the MIB. The Type 0-PDCCH common search space is a kind of PDCCH search space and is used to transmit a PDCCH for scheduling an SI message. If the Type 0-PDCCH common search space is present, the UE may determine (i) a plurality of contiguous resource blocks and one or more consecutive resource blocks constituting a CORESET on the basis of information in the MIB (e.g., pdcch-ConfigSIB1) and (ii) a PDCCH occasion (e.g., time domain position for PDCCH reception). If no Type 0-PDCCH common search space exists, pdcch-ConfigSIB1 provides information on a frequency location where SSB/SIB1 exists and information on a frequency range where SSB/SIB1 does not exist.

SIB1 includes information related to availability and scheduling (e.g., transmission periodicity and SI-window size) of the remaining SIBs (hereinafter, SIBx, x is an integer equal to or greater than 2). For example, SIB1 may indicate whether the SIBx is periodically broadcast or provided according to a request from the UE on an on-demand basis. If SIBx is provided on the on-demand basis, SIB1 may include information necessary for the UE to perform the SI request. The SIB1 is transmitted through the PDSCH, the PDCCH for scheduling the SIB1 is transmitted through the Type 0-PDCCH common search space, and the SIB1 is transmitted through the PDSCH indicated by the PDCCH.

The SIBx is included in the SI message and transmitted via the PDSCH. Each SI message is transmitted within a time window (i.e., SI-window) that occurs periodically.

G. Random Access Procedure

The random access procedure of the UE may be summarized as shown in Table 2 and FIG. 11.

TABLE 2

| | Signal type | Acquired operation/information |
|---|---|---|
| First step | PRACH preamble in UL | Acquire initial beam Random selection of random access preamble ID |
| Second step | Random access response on PDSCH | Timing advance information Random access preamble ID Initial UL grant, temporary C-RNTI |
| Third step | UL transmission on PUSCH | RRC connection request UE identifier |
| Fourth step | Contention resolution on DL | Temporary C-RNTI on PDCCH for initial access C-RNTI on PDCCH for RRC_CONNECTED UE |

The random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure.

FIG. 11 illustrates an example of a random access procedure. In particular, FIG. 11 illustrates a contention-based random access procedure.

First, a UE can transmit a random access preamble through a PRACH as Msg1 of a random access procedure in UL.

Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

Multiple preamble formats are defined by one or more RACH OFDM symbols and different cyclic prefixes (and/or guard time). RACH configuration for a cell is included in the system information of the cell and is provided to the UE. The RACH configuration includes information on a subcarrier spacing of the PRACH, available preambles, preamble format, and the like. The RACH configuration includes association information between SSBs and RACH (time-frequency) resources. The UE transmits a random access preamble in the RACH time-frequency resource associated with the detected or selected SSB.

A threshold value of the SSB for the RACH resource association may be set by the network, and RACH preamble is transmitted or retransmitted on the basis of the SSB in which reference signal received power (RSRP) measured on the basis of the SSB satisfies the threshold value. For example, the UE may select one of the SSB (s) satisfying the threshold value and may transmit or retransmit the RACH preamble on the basis of the RACH resource associated with the selected SSB.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

When the random access response information includes timing advance information for UL synchronization and an UL grant, and when a temporary UE receives a random response information regarding the UE itself on the PDSCH, the UE may know timing advance information for UL synchronization, an initial UL grant, and a UE temporary cell RNTI (cell RNTI, C-RNTI). The timing advance information is used to control uplink signal transmission timing. In order to ensure that the PUSCH/PUCCH transmission by the UE is better aligned with the subframe timing at a network end, the network (e.g. BS) may measure a time difference between the PUSCH/PUCCH/SRS reception and subframes and send timing advance information on the basis of the time difference. The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

Meanwhile, the contention-free random access procedure may be performed when the UE performs handover to another cell or BS or when the contention-free random access procedure is requested by a BS command. A basic process of the contention-free random access procedure is similar to the contention-based random access procedure. However, unlike the contention-based random access procedure in which the UE randomly selects a preamble to be used among a plurality of random access preambles, in the case of the contention-free random access procedure, a preamble (hereinafter referred to as a dedicated random access preamble) to be used by the UE is allocated by the BS to the UE. Information on the dedicated random access preamble may be included in an RRC message (e.g., a handover command) or may be provided to the UE via a PDCCH order. When the random access procedure is started, the UE transmits a dedicated random access preamble to the BS. When the UE receives the random access procedure from the BS, the random access procedure is completed.

As mentioned above, the UL grant in the RAR schedules PUSCH transmission to the UE. The PUSCH carrying initial UL transmission based on the UL grant in the RAR will be referred to as Msg3 PUSCH. The content of the RAR UL grant starts at an MSB and ends at a LSB and is given in Table 3.

TABLE 3

| RAR UL grant field | Number of bits |
| --- | --- |
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The TPC command is used to determine transmission power of the Msg3 PUSCH and is interpreted, for example, according to Table 4.

TABLE 4

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, the CSI request field in the RAR UL grant indicates whether the UE includes an aperiodic CSI report in the corresponding PUSCH transmission. A subcarrier spacing for the Msg3 PUSCH transmission is provided by an RRC parameter. The UE will transmit the PRACH and Msg3 PUSCH on the same uplink carrier of the same service providing cell. A UL BWP for Msg3 PUSCH transmission is indicated by SIB1 (SystemInformationBlock1).

H. DL and UL Transmitting/Receiving Operations

DL Transmitting/Receiving Operation

A downlink grant (also referred to as a downlink assignment) may be divided into (1) dynamic grant and (2) configured grant. The dynamic grant, which is intended to maximize resource utilization, refers to a method of data transmission/reception on the basis of dynamic scheduling by the BS.

The BS schedules downlink transmission through a DCI. The UE receives on the PDCCH the DCI for downlink scheduling (i.e., including scheduling information of the PDSCH) from the BS. DCI format 1_0 or 1_1 may be used for downlink scheduling. The DCI format 1_1 for downlink scheduling may include, for example, the following information: an identifier for DCI format, a bandwidth part indicator, a frequency domain resource assignment, time domain resource assignment, MCS.

The UE may determine a modulation order, a target code rate, and a transport block size for the PDSCH on the basis of the MCS field in the DCI. The UE may receive the PDSCH in time-frequency resource according to frequency domain resource allocation information and time domain resource allocation information.

The DL grant is also referred to as semi-persistent scheduling (SPS). The UE may receive an RRC message including a resource configuration for transmission of DL data from the BS. In the case of the DL SPS, an actual DL configured grant is provided by the PDCCH and is activated or deactivated by the PDCCH. If the DL SPS is configured, at least the following parameters are provided to the UE via RRC signaling from the BS: a configured scheduling RNTI (CS-RNTI) for activation, deactivation and retransmission; and cycle. The actual DL grant of the DL SPS is provided to the UE by the DCI in the PDCCH addressed to the CS-RNTI. The UE activates an SPS associated with the CS-RNTI if specific fields of the DCI in the PDCCH addressed to the CS-RNTI are set to specific values for scheduling activation. The UE may receive downlink data through the PDSCH on the basis of the SPS.

UL Transmitting/Receiving Operation

The BS transmits a DCI including uplink scheduling information to the UE. The UE receives on the PDCCH the DCI for uplink scheduling (i.e., including scheduling information of the PUSCH) from the BS. DCI format 0_0 or 0_1 may be used for uplink scheduling. The DCI format 0_1 for uplink scheduling may include the following information: an identifier for DCI format, a bandwidth part indicator, a frequency domain resource assignment, a time domain resource assignment, MCS.

The UE transmits uplink data on the PUSCH on the basis of the DCI. For example, when the UE detects the PDCCH including the DCI format 0_0 or 0_1, the UE transmits the PUSCH according to an instruction based on the DCI. Two transmission schemes are supported for PUSCH transmission: codebook-based transmission and non-codebook-based transmission.

When an RRC parameter 'txConfig' receives an RRC message set to 'codebook', the UE is configured to a codebook-based transmission. Meanwhile, when an RRC message in which the RRC parameter 'txConfig' is set to 'nonCodebook' is received, the UE is configured to a non-codebook-based transmission. The PUSCH may be semi-statically scheduled by the DCI format 0_0, by the DCI format 0_1, or by RRC signaling.

The uplink grant may be divided into (1) a dynamic grant and (2) a configured grant.

FIG. 12 shows an example of an uplink grant. FIG. 12(a) illustrates an UL transmission process based on the dynamic grant, and FIG. 12(b) illustrates an UL transmission process based on the configured grant.

A dynamic grant, which is to maximize utilization of resources, refers to a data transmission/reception method based on dynamic scheduling by a BS. This means that when the UE has data to be transmitted, the UE requests uplink resource allocation from the BS and transmits the data using only uplink resource allocated by the BS. In order to use the uplink radio resource efficiently, the BS must know how much data each UE transmits on the uplink. Therefore, the UE may directly transmit information on uplink data to be transmitted to the BS, and the BS may allocate uplink resources to the UE on the basis of the information. In this case, the information on the uplink data transmitted from the UE to the BS is referred to as a buffer status report (BSR), and the BSR relates to the amount of uplink data stored in a buffer of the UE.

Referring to FIG. 12(a), an uplink resource allocation process for actual data when the UE does not have an uplink radio resource available for transmission of the BSR is illustrated. For example, since the UE which does not have a UL grant cannot available for UL data transmission cannot transmit the BSR through a PUSCH, the UE must request resource for uplink data must by starting transmission of a scheduling request via a PUCCH, and in this case, an uplink resource allocation process of five steps is used.

Referring to FIG. 12(a), if there is no PUSCH resource for transmitting a BSR, the UE first transmits a scheduling request (SR) to the BS in order to be allocated a PUSCH resource. The SR is used by the UE to request the BS for PUSCH resources for uplink transmission when a reporting event occurs but there is no PUSCH resource available to the UE. Depending on whether there is a valid PUCCH resource for the SR, the UE transmits the SR via the PUCCH or initiates a random access procedure. When the UE receives the UL grant from the BS, it transmits the BSR to the BS via the PUSCH resource allocated by the UL grant. The BS checks the amount of data to be transmitted by the UE on the uplink on the basis of the BSR and transmits a UL grant to the UE. The UE receiving the UL grant transmits actual uplink data to the BS through the PUSCH on the basis of the UL grant.

Referring to FIG. 12(b), the UE receives an RRC message including a resource configuration for transmission of UL data from the BS. There are two types of UL-configured grants in the NR system: Type 1 and Type 2. In the case of UL-configured grant type 1, an actual UL grant (e.g., time resource, frequency resource) is provided by RRC signaling, and in the case of Type 2, an actual UL grant is provided by the PDCCH and is activated or deactivated by the PDCCH. If the grant type 1 is configured, at least the following parameters are provided to the UE via RRC signaling from the BS: CS-RNTI for retransmission; periodicity of the configured grant type 1; information about a start symbol index S and a symbol length L for an intra-slot PUSCH; time domain offset representing an offset of the resource for SFN=0 in the time domain; MCS index indicating modulation order, target code rate, and transport block size. If the grant type 2 is configured, at least the following parameters are provided to the UE via RRC signaling from the BS: CS-RNTI for activation, deactivation and retransmission; periodicity of configured grant type 2. The actual UL grant of the configured grant type 2 is provided to the UE by the DCI in the PDCCH addressed to the CS-RNTI. If the specific fields of the DCI in the PDCCH addressed to the CS-RNTI are set to a specific value for scheduling activation, the UE activates the configured grant type 2 associated with the CS-RNTI.

The UE may perform uplink transmission via the PUSCH on the basis of the configured grant according to the type 1 or type 2.

Resources for initial transmission by the configured grant may or may not be shared by one or more UEs.

FIG. 13 shows an example of a conceptual diagram of uplink physical channel processing.

Each of the blocks shown in FIG. 13 may be performed in each module in the physical layer block of a transmission device. More specifically, the uplink signal processing in FIG. 13 may be performed in the processor of the UE/BS described in this specification. Referring to FIG. 13, the uplink physical channel processing may be performed through scrambling, modulation mapping, layer mapping, transform precoding, precoding, resource element mapping, and SC-FDMA signal generation (SC-FDMA signal generation). Each of the above processes may be performed separately or together in each module of the transmission device. The transform precoding is spreading UL data in a special way to reduce a peak-to-average power ratio (PAPR) of a waveform, and is a kind of discrete Fourier transform (DFT). OFDM using a CP together with the transform precoding that performs DFT spreading is called DFT-s-OFDM, and OFDM using a CP without DFT spreading is called CP-OFDM. Transform precoding may optionally be applied if it is enabled for the UL in an NR system. That is, the NR system supports two options for UL waveforms, one of which is CP-OFDM and the other is DFT-s-OFDM. Whether the UE must use the CP-OFDM as a UL transmit waveform or the DFT-s-OFDM as a UL transmit waveform is provided from the BS to the UE via RRC parameters. FIG. 13 is a conceptual diagram of uplink physical channel processing for DFT-s-OFDM. In the case of CP-OFDM, the transform precoding among the processes of FIG. 13 is omitted.

More specifically, the transmission device scrambles coded bits in a codeword by a scrambling module, and then transmits the coded bits through a physical channel. Here, the codeword is acquired by encoding a transport block. The scrambled bits are modulated by a modulation mapping module into complex-valued modulation symbols. The modulation mapping module may modulate the scrambled bits according to a predetermined modulation scheme and arrange the modulated bits as complex-valued modulation symbols representing a position on a signal constellation. pi/2-BPSK (pi/2-Binary Phase Shift Keying), m-PSK (m-Phase Shift Keying) or m-QAM (m-Quadrature Amplitude Modulation) may be used for modulating the coded data. The complex-valued modulation symbols may be mapped to one or more transport layers by a layer mapping module. The complex-valued modulation symbols on each layer may be precoded by a precoding module for transmission on an antenna port. If the transform precoding is enabled, the precoding module may perform precoding after performing transform precoding on the complex-valued modulation symbols as shown in FIG. 13. The precoding module may process the complex-valued modulation symbols in a MIMO manner according to multiple transmission antennas to output antenna-specific symbols, and distribute the antenna-specific symbols to a corresponding resource element mapping module. An output z of the precoding module may be acquired by multiplying an output y of the layer mapping module by a precoding matrix W of N×M. Here, N is the number of antenna ports and M is the number of layers. The resource element mapping module maps the complex-valued modulation symbols for each antenna port to an appropriate resource element in the resource block allocated for transmission. The resource element mapping module may map the complex-valued modulation symbols to appropriate subcarriers and multiplex the same according to users. The SC-FDMA signal generation module (CP-OFDM signal generation module if the transform precoding is disabled) modulates the complex-valued modulation symbol according to a specific modulation scheme, for example, an OFDM scheme, to generate a complex-valued time domain OFDM (Orthogonal Frequency Division Multiplexing) symbol signal. The signal generation module may perform Inverse Fast Fourier Transform (IFFT) on the antenna specific symbol, and a CP may be inserted into the time domain symbol on which the IFFT has been performed. The OFDM symbol undergoes digital-to-analog conversion, upconverting, and the like, and transmitted to a reception device through each transmission antenna. The signal generation module may include an IFFT module and a CP inserter, a digital-to-analog converter (DAC), and a frequency uplink converter.

A signal processing procedure of a reception device may be the reverse of the signal processing procedure of the transmission device. Details thereof may be referred to the above contents and FIG. 13.

Next, the PUCCH will be described.

The PUCCH supports a plurality of formats, and the PUCCH formats may be classified according to symbol duration, payload size, multiplexing, and the like. Table 5 below illustrates PUCCH formats.

TABLE 5

| Format | PUCCH length in OFDM symbols | Number of bits | Usage | Etc. |
| --- | --- | --- | --- | --- |
| 0 | 1-2 | ≤2 | 1 | Sequence selection |
| 1 | 4-14 | ≤2 | 2 | Sequence modulation |
| 2 | 1-2 | >2 | 4 | CP-OFDM |
| 3 | 4-14 | >2 | 8 | DFT-s-OFDM(no UE multiplexing) |
| 4 | 4-14 | >2 | 16 | DFT-s-OFDM(Pre DFT orthogonal cover code(OCC)) |

The PUCCH formats shown in Table 5 may be divided into (1) a short PUCCH and (2) a long PUCCH. PUCCH formats 0 and 2 may be included in the short PUCCH, and PUCCH formats 1, 3 and 4 may be included in the long PUCCH.

FIG. 14 shows an example of an NR slot in which a PUCCH is transmitted.

The UE transmits one or two PUCCHs through serving cells in different symbols in one slot. When the UE transmits two PUCCHs in one slot, at least one of the two PUCCHs has a structure of the short PUCCH.

I. eMBB (Enhanced Mobile Broadband Communication)

In the case of the NR system, a massive multiple input multiple output (MIMO) environment in which the transmit/receive antennas are significantly increased may be considered. That is, as the large MIMO environment is considered, the number of transmit/receive antennas may increase to several tens or hundreds or more. Meanwhile, the NR system supports communication in above 6 GHz band, that is, the millimeter frequency band. However, the millimeter frequency band has a frequency characteristic in which signal attenuation according to a distance is very sharp due to the use of a frequency band which is too high. Therefore, an NR system using the band of 6 GHz or higher uses a beamforming technique in which energy is collected and transmitted in a specific direction, not in all directions, in order to compensate for sudden propagation attenuation characteristics. In the massive MIMO environment, a hybrid type beamforming technique combining an analog beamforming technique and a digital beamforming technique is required depending on a position to which a beamforming weight vector/precoding vector is applied, to reduce complexity of hardware implementation, increase performance using multiple antennas, obtain flexibility of resource allocation, and facilitate beam control for each frequency.

Hybrid Beamforming

FIG. 15 illustrates an example of a block diagram of a transmitter and a receiver for hybrid beamforming.

As a method for forming a narrow beam in a millimeter frequency band, a beam forming scheme in which energy is increased only in a specific direction by transmitting the same signal using a phase difference suitable for a large number of antennas in a BS or a UE is mainly considered. Such beamforming scheme includes digital beamforming to create a phase difference in a digital baseband signal, analog beamforming to create a phase difference in a modulated analog signal using time delay (i.e., cyclic shift), and hybrid beamforming using both digital beamforming and analog beamforming, or the like. If each antenna element has an RF unit (or transceiver unit (TXRU)) to adjust transmission power and phase, independent beamforming is possible for each frequency resource. However, it is not effective in terms of price to install an RF unit in all 100 antenna elements. That is, since the millimeter frequency band requires a large number of antennas to compensate for the sudden attenuation characteristics and digital beamforming requires an RF component (e.g., a digital-to-analog converter (DAC), a mixer, a power amplifier, a linear amplifier, and the like), implementation of digital beamforming in the millimeter frequency band causes the price of the communication device to increase. Therefore, when a large number of antennas are required such as in the millimeter frequency band, the use of analog beamforming or hybrid beamforming is considered. In the analog beamforming scheme, a plurality of antenna elements are mapped to one TXRU and a direction of a beam is adjusted by an analog phase shifter. Such an analog beamforming scheme may generate only one beam direction in the entire band, and thus, it cannot perform frequency selective beamforming (BF). Hybrid BF is an intermediate form of digital BF and analog BF and has B RF units fewer than Q antenna elements. In the case of the hybrid BF, directions of beams that may be transmitted at the same time is limited to B or less, although there is a difference depending on a method of connecting the B RF units and Q antenna elements.

Beam Management (BM)

The BM process includes processes for acquiring and maintaining a set of BS (or a transmission and reception point (TRP)) and/or UE beams that may be used for downlink (DL) and uplink (UL) transmission/reception and may include the following processes and terms.

beam measurement: operation for BS or UE to measure characteristic of received beamforming signal.
    beam determination: operation for BS or UE to select its own Tx beam/Rx beam.

beam sweeping: an operation to cover spatial domain using transmission and/or reception beam during a predetermined time interval in a predetermined manner.

beam report: an operation for UE to report information of beamformed signal on the basis of beam measurement.

The BM process may be classified into (1) DL BM process using SSB or CSI-RS and (2) UL BM process using SRS (sounding reference signal). Also, each BM process may include Tx beam sweeping to determine Tx beam and Rx beam sweeping to determine Rx beam.

DL BM Process

The DL BM process may include (1) transmission of beamformed DL RSs (e.g., CSI-RS or SSB) by the BS, and (2) beam reporting by the UE.

Here, the beam report may include a preferred DL RS ID(s) and a corresponding reference signal received power (RSRP). The DL RS ID may be an SSBRI (SSB Resource Indicator) or a CRI (CSI-RS Resource Indicator).

FIG. 16 shows an example of beamforming using SSB and CSI-RS.

As shown in FIG. 16, the SSB beam and the CSI-RS beam may be used for beam measurement. The measurement metric is an RSRP per resource/block. The SSB may be used for coarse beam measurement, and the CSI-RS may be used for fine beam measurement. SSB may be used for both Tx beam sweeping and Rx beam sweeping. Rx beam sweeping using the SSB may be performed by attempting to receive the SSB while the UE changes the Rx beam for the same SSBRI across multiple SSB bursts. Here, one SS burst may include one or more SSBs, and one SS burst set includes one or more SSB bursts.

1. DL BM Using SSB

FIG. 17 is a flowchart illustrating an example of a DL BM process using SSB.

A configuration for beam report using the SSB is performed at the time of channel state information (CSI)/beam configuration in RRC_CONNECTED.

The UE receives from the BS a CSI-ResourceConfig IE including a CSI-SSB-ResourceSetList for the SSB resources used for the BM (S410). The RRC parameter csi-SSB-ResourceSetList represents a list of SSB resources used for beam management and reporting in one resource set. Here, the SSB resource set may be configured to {SSB×1, SSB×2, SSB×3, SSB×4}. The SSB index may be defined from 0 to 63.

The UE receives signals on the SSB resources from the BS on the basis of the CSI-SSB-ResourceSetList (S420).

If the CSI-RS reportConfig associated with reporting on the SSBRI and reference signal received power (RSRP) is configured, the UE reports the best SSBRI and its corresponding RSRP to the BS S430). For example, if the reportQuantity of the CSI-RS reportConfig IE is set to 'ssb-Index-RSRP', the UE reports the best SSBRI and a corresponding RSRP to the BS.

When the CSI-RS resource is configured in the same OFDM symbol (s) as the SSB and 'QCL-Type D' is applicable, the UE may assume that the CSI-RS and the SSB are quasi co-located (QCL-ed) in terms of 'QCL-TypeD'. Here, QCL-TypeD may refer to QCL-ed between antenna ports in terms of spatial Rx parameter. The same receive beam may be applied when the UE receives signals of a plurality of DL antenna ports in the QCL-TypeD relationship. Details of QCL may refer to a section 4. QCL below.

2. DL BM Using CSI-RS

Referring to the use of CSI-RS, i) if a repetition parameter is set for a specific CSI-RS resource set and TRS_info is not configured, CSI-RS is used for beam management. ii) If the repetition parameter is not set and TRS_info is set, the CSI-RS is used for a tracking reference signal (TRS). Iii) If the repetition parameter is not set and TRS_info is not set, the CSI-RS is used for CSI acquisition.

(RRC Parameter) If the repetition is set to 'ON', it relates to a Rx beam sweeping process of the UE. If the repetition is set to 'ON', the UE may assume that if NZP-CSI-RS-ResourceSet is configured, signals of at least one CSI-RS resource in the NZP-CSI-RS-ResourceSet are transmitted in the same downlink space domain filter. That is, at least one CSI-RS resource in the NZP-CSI-RS-ResourceSet is transmitted through the same Tx beam. Here, signals of at least one CSI-RS resource in the NZP-CSI-RS-ResourceSet may be transmitted in different OFDM symbols.

Meanwhile, if the repetition is set to 'OFF', it relates to a Tx beam sweeping process of the BS. If the repetition is set to 'OFF', the UE does not assume that signals of at least one CSI-RS resource in the NZP-CSI-RS-ResourceSet are transmitted in the same downlink spatial domain transmission filter. That is, the signals of at least one CSI-RS resource in the NZP-CSI-RS-ResourceSet are transmitted through different Tx beams. FIG. 18 shows another example of the DL BM process using CSI-RS.

FIG. 18(a) shows a process of Rx beam determination (or refinement) of the UE, and FIG. 18(b) shows a Tx beam sweeping process of the BS. FIG. 18 (a) shows a case where the repetition parameter is set to 'ON', and FIG. 18(b) shows a case where the repetition parameter is set to 'OFF'.

A process of determining the Rx beam of the UE will be described with reference to FIGS. 18(a) and 19.

FIG. 19 is a flowchart illustrating an example of a process of determining a reception beam of a UE.

The UE receives an NZP CSI-RS resource set IE including the RRC parameter regarding 'repetition' from the BS through RRC signaling (S610). Here, the RRC parameter 'repetition' is set to 'ON'.

The UE repeatedly receives signals on the resource(s) in the CSI-RS resource in which the RRC parameter 'repetition' is set to 'ON' in different OFDM (s) through the same Tx beam (or DL space domain transmission filter) of the BS (S620).

The UE determines its own Rx beam (S630).

The UE omits the CSI reporting (S640). That is, the UE may omit CSI reporting when the uplink RRC parameter 'repetition' is set to 'ON'.

A Tx beam determining process of the BS will be described with reference to FIGS. 18(b) and 20.

FIG. 20 is a flowchart illustrating an example of a transmission beam determining process of the BS.

The UE receives an NZP CSI-RS resource set IE including an RRC parameter regarding 'repetition' from the BS through RRC signaling (S710). Here, the RRC parameter 'repetition' is set to 'OFF' and is related to the Tx beam sweeping process of the BS.

The UE receives signals on the resources in the CSI-RS resource in which the RRC parameter 'repetition' is set to 'OFF' through different Tx beams (DL spatial domain transmission filters) of the BS (S720).

The UE selects (or determines) the best beam (S730)

The UE reports an ID (e.g., CRI) for the selected beam and related quality information (e.g., RSRP) to the BS (S740). That is, the UE reports the CRI and the RSRP to the BS when the CSI-RS is transmitted for the BM.

FIG. 21 shows an example of resource allocation in time and frequency domains related to the operation of FIG. 18.

When repetition 'ON' is set in the CSI-RS resource set, a plurality of CSI-RS resources are repeatedly used by applying the same transmission beam, and when repetition 'OFF' is set in the CSI-RS resource set, different CSI-RS resources may be transmitted in different transmission beams.

3. DL BM-Related Beam Indication

The UE may receive a list of up to M candidate transmission configuration indication (TCI) states for at least a quasi co-location (QCL) indication via RRC signaling. Here, M depends on UE capability and may be 64.

Each TCI state may be configured with one reference signal (RS) set. Table 6 shows an example of a TCI-State IE. The TCI-State IE is associated with a quasi co-location (QCL) type corresponding to one or two DL reference signals (RSs).

TABLE 6

```
-- ASN1START
-- TAG-TCI-STATE-START
TCI-State ::=          SEQUENCE {
    tci-StateId            TCI-StateId,
    qcl-Type1              QCL-Info,
    qcl-Type2              QCL-Info
                           OPTIONAL, -- Need R
    ...
}
QCL-Info ::=           SEQUENCE {
    cell
    ServCellIndex
                           OPTIONAL, -- Need R
    bwp-Id                 BWP-Id
                           OPTIONAL, -- Cond CSI-RS-Indicated
    referenceSignal        CHOICE {
        csi-rs
    NZP-CSI-RS-ResourceId,
        ssb
    SSB-Index
    },
    qcl-Type
    ENUMERATED {typeA, typeB, typeC, typeD},
    ...
}
-- TAG-TCI-STATE-STOP
-- ASN1STOP
```

In Table 6, 'bwp-Id' denotes a DL BWP where RS is located, 'cell' denotes a carrier where RS is located, 'referencesignal' denotes a reference antenna port(s) which is a QCL-ed source for target antenna port(s) or a reference signal including the same. The target antenna port(s) may be CSI-RS, PDCCH DMRS, or PDSCH DMRS.

4. QCL (Quasi-Co Location)

The UE may receive a list including up to M TCI-state configurations to decode the PDSCH according to the detected PDCCH having an intended DCI for the UE and a given cell. Here, M depends on the UE capability.

As illustrated in Table 6, each TCI-State includes a parameter for establishing a QCL relationship between one or two DL RSs and the DM-RS port of the PDSCH. The QCL relationship is configured with a RRC parameter qcl-Type1 for the first DL RS and a qcl-Type2 (if set) for the second DL RS.

The QCL type corresponding to each DL RS is given by the parameter 'qcl-Type' in QCL-Info and may have one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, when a target antenna port is a specific NZP CSI-RS, corresponding NZP CSI-RS antenna ports may be instructed/configured to be QCL-ed with a specific TRS in terms of QCL-Type A and QCL-ed with a specific SSB in terms of QCL-Type D. The thusly instructed/configured UE may receive the corresponding NZP CSI-RS using a Doppler and delay value measured by the QCL-TypeA TRS and apply a reception beam used for receiving the QCL-TypeD SSB to the corresponding NZP CSI-RS reception.

UL BM Process

In the UL BM, a Tx beam-Rx beam reciprocity (or beam correspondence) may be or may not be established depending on UE implementation. If the Tx beam-Rx beam reciprocity is established in both the BS and the UE, a UL beam pair may be matched through a DL beam pair. However, if the Tx beam-Rx beam reciprocity is not established in either the BS or the UE, a UL beam pair determining process is required, apart from DL beam pair determination.

In addition, even when the BS and the UE maintain beam correspondence, the BS may use the UL BM process for DL Tx beam determination without requesting the UE to report a preferred beam.

The UL BM may be performed through beamformed UL SRS transmission and whether to apply the UL BM of the SRS resource set is configured by the RRC parameter in a (RRC parameter) usage. If the usage is configured as 'Beam-Management (BM)', only one SRS resource may be transmitted for each of a plurality of SRS resource sets at a given time instant.

The UE may be configured with one or more sounding reference signal (SRS) resource sets (through RRC signaling, etc.) set by the (RRC parameter) SRS-ResourceSet. For each SRS resource set, $K \geq 1$ SRS resources may be set for the UE. Here, K is a natural number, and a maximum value of K is indicated by SRS_capability.

Like the DL BM, the UL BM process may also be divided into Tx beam sweeping of the UE and Rx beam sweeping of the BS.

FIG. 22 shows an example of a UL BM process using SRS.

FIG. 22(a) shows a process of determining Rx beamforming of a BS, and FIG. 22(b) shows a process of sweeping Tx beam of the UE.

FIG. 23 is a flowchart illustrating an example of a UL BM process using SRS.

The UE receives RRC signaling (e.g., SRS-Config IE) including an (RRC parameter) usage parameter set to 'beam management' from the BS (S1010). An SRS-Config IE is used for configuration of SRS transmission. The SRS-Config IE includes a list of SRS-Resources and a list of SRS-ResourceSets. Each SRS resource set refers to a set of SRS-resources.

The UE determines Tx beamforming for the SRS resource to be transmitted on the basis of SRS-SpatialRelation Info included in the SRS-Config IE (S1020). Here, the SRS-SpatialRelation Info is configured for each SRS resource and indicates whether to apply the same beamforming as that used in SSB, CSI-RS, or SRS for each SRS resource.

If SRS-SpatialRelationInfo is configured in the SRS resource, the same beamforming as that used in SSB, CSI-RS, or SRS is applied and transmitted. However, if SRS-SpatialRelationInfo is not configured in the SRS resource, the UE randomly determines the Tx beamforming and transmits the SRS through the determined Tx beamforming (S1030).

More specifically, regarding P-SRS in which 'SRS-ResourceConfigType' is set to 'periodic':

i) If the SRS-SpatialRelationInfo is set to 'SSB/PBCH', the UE transmits the corresponding SRS by applying the same spatial domain transmission filter (or generated from the corresponding filter) as the spatial domain Rx filter used for receiving SSB/PBCH; or ii) If the SRS-SpatialRelationInfo is set to 'CSI-RS', the UE transmits the SRS by applying the same spatial domain transmission filter used for receiving the CSI-RS; or iii) When SRS-SpatialRelationInfo is set to 'SRS', the UE transmits the corresponding SRS by applying the same spatial domain transmission filter used for transmitting the SRS.

In addition, the UE may receive or may not receive a feedback on the SRS from the BS as in the following three cases (S1040).

i) When Spatial_Relation_Info is set for all SRS resources in the SRS resource set, the UE transmits the SRS to the beam indicated by the BS. For example, if Spatial_Relation_Info indicates SSB, CRI, or SRI in which Spatial_Relation_Info is the same, the UE repeatedly transmits the SRS on the same beam.

ii) Spatial_Relation_Info may not be set for all SRS resources in the SRS resource set. In this case, the UE may freely transmit while changing the SRS beamforming.

iii) Spatial_Relation_Info may only be set for some SRS resources in the SRS resource set. In this case, the SRS is transmitted on the indicated beam for the set SRS resource, and for an SRS resource in which Spatial_Relation_Info is not set, the UE may transit the SRS resource by randomly applying Tx beamforming.

A Beam Failure Recovery (BFR) Process

In a beamformed system, a radio link failure (RLF) may occur frequently due to rotation, movement, or beamforming blockage of the UE. Therefore, BFR is supported in NR to prevent frequent occurrence of the RLFs. The BFR is similar to the radio link failure recovery process and may be supported if the ULE knows the new candidate beam(s).

For beam failure detection, the BS configures beam failure detection reference signals for the UE, and if the number of times of beam failure indications from the physical layer of the UE reaches a threshold set by the RRC signaling within a period set by the RRC signaling of the BS, the UE declares beam failure.

After the beam failure is detected, the UE triggers a beam failure recovery by initiating a random access procedure on the PCell; and performs beam failure recovery by selecting a suitable beam (If the BS provides dedicated random access resources for certain beams, they are prioritized by the UE). Upon completion of the random access procedure, beam failure recovery is considered to be completed.

J. URLLC (Ultra-Reliable and Low Latency Communication)

The URLLC transmission defined by the NR may refer to transmission for (1) a relatively low traffic size, (2) a relatively low arrival rate, (3) an extremely low latency requirement (e.g., 0.5, 1 ms), (4) relatively short transmission duration (e.g., 2 OFDM symbols), and (5) urgent service/message, etc.

In the case of UL, transmission for a particular type of traffic (e.g., URLLC) needs to be multiplexed with other previously scheduled transmissions (e.g., eMBB) to meet a more stringent latency requirement. In this regard, one method is to give information indicating that a scheduled UE will be preempted for a specific resource, and allow the URLLC UE to use the resource for UL transmission.

Pre-Emption Indication

In the case of NR, dynamic resource sharing between eMBB and URLLC is supported. eMBB and URLLC services may be scheduled on non-overlapping time/frequency resources and URLLC transmission may occur on scheduled resources for ongoing eMBB traffic. The eMBB UE may not know whether PDSCH transmission of the UE is partially punctured and the UE may not be able to decode the PDSCH due to corrupted coded bits. In consideration of this, NR provides a preemption indication.

The preemption indication may also be referred to as an interrupted transmission indication.

With respect to the preamble indication, the UE receives DownlinkPreemption IE through RRC signaling from the BS. Table 7 below shows an example of the DownlinkPreemption IE.

TABLE 7

```
-- ASN1START
-- TAG-DOWNLINKPREEMPTION-START
DownlinkPreemption ::=              SEQUENCE {
    int-RNTI                            RNTI-Value,
    timeFrequencySet                    ENUMERATED {set0, set1},
    dci-PayloadSize                     INTEGER (0..maxINT-DCI-PayloadSize),
    int-ConfigurationPerServingCell     SEQUENCE (SIZE (1..maxNrofServingCells))
OF INT-ConfigurationPerServingCell,
    ...
}
INT-ConfigurationPerServingCell ::= SEQUENCE {
    servingCellId                       ServCellIndex,
    positionInDCI                       INTEGER (0..maxINT-DCI-PayloadSize-1)
}
-- TAG-DOWNLINKPREEMPTION-STOP
-- ASN1STOP
```

If the UE is provided with the DownlinkPreemption IE, the UE is configured with an INT-RNTI provided by a parameter int-RNTI in the DownlinkPreemption IE to monitor a PDCCH conveying the DCI format 2_1. The UE is further configured with a set of serving cells and a corresponding set of locations for fields in the DCI format 2_1 by positionInDCI by an INT-ConfigurationPerServing Cell including a set of serving cell indices provided by a servingCellID, is configured with an information payload size for DCI format 2_1 by dci-PayloadSize, and is configured with granularity of time-frequency resources by timeFrequencySect.

The UE receives the DCI format 2_1 from the BS on the basis of the DownlinkPreemption IE.

If the UE detects the DCI format 2_1 for a serving cell in the set of serving cells, the UE may assume there is no transmission to the UE in PRBs and symbols indicated by the DCI format 2_1 among sets of PRBs and sets of symbols in the last monitoring period before a monitoring period to which the DCI format 2_1 belongs. For example, referring to FIG. 9A, the UE determines that a signal in the time-frequency resource indicated by pre-emption is not a DL transmission scheduled for the UE itself and decodes data on the basis of signals received in the remaining resource area.

FIG. 24 is a diagram showing an example of an preemption indication method.

A combination of {M,N} is set by the RRC parameter timeFrequencySet. {M, N}={14,1}, {7,2}.

FIG. 25 shows an example of a time/frequency set of a preemption indication.

A 14-bit bitmap for a preemption indication indicates one or more frequency parts (N>=1) and/or one or more time domain parts (M>=1). In the case of {M, N}={14,1}, as shown in FIG. 25(a), 14 parts in the time domain correspond one-to-one to 14 bits of the 14-bit bit map, and a part corresponding to a bit set to 1, among the 14 bits, is part including preempted resources. In the case of {M, N}={7, 2}, as shown in FIG. 25(b), the time-frequency resources of the monitoring period is divided into seven parts in the time domain and two parts in the frequency domain, so as to be divided into a total of 14 time-frequency parts. The total of 14 time-frequency parts correspond one-to-one to the 14 bits of the 14-bit bitmap, and the part corresponding to the bit set to 1 among the 14 bits includes the pre-empted resources.

K. MMTC (Massive MTC)

The massive machine type communication (mMTC) is one of the 5G scenarios for supporting a hyper-connection service that simultaneously communicates with a large number of UEs. In this environment, the UE intermittently performs communication with a very low transfer rate and mobility. Therefore, mMTC is aimed at how low cost and for how long the UE can be driven. In this regard, MTC and NB-IoT, which are dealt with in 3GPP will be described.

Hereinafter, a case where a transmission time interval of a physical channel is a subframe will be described as an example. For example, a case where a minimum time interval from a start of transmission of one physical channel (e.g., MPDCCH, PDSCH, PUCCH, PUSCH) to a start of transmission of a next physical channel is one subframe will be described as an example. In the following description, the subframe may be replaced by a slot, a mini-slot, or multiple slots.

MTC (Machine Type Communication)

MTC (Machine Type Communication), which is an application that does not require much throughput applicable to M2M (Machine-to-Machine) or IoT (Internet-of-Things), refers to a communication technology adopted to meet the requirements of the IoT service in 3GPP (3rd Generation Partnership Project).

The MTC may be implemented to meet the criteria of (1) low cost & low complexity, (2) enhanced coverage, and (3) low power consumption.

In 3GPP, MTC has been applied since release 10 (3GPP standard document version 10.x.x.) and features of MTC added for each release of 3GPP will be briefly described.

First, the MTC described in 3GPP Release 10 and Release 11 relates to a load control method. The load control method is to prevent IoT (or M2M) devices from suddenly loading the BS. More specifically, 3GPP Release 10 relates to a method of controlling a load by disconnecting IoT devices when the load occurs, and Release 11 relates to a method of preventing connection of the UE in advance by informing the UE about connection to a cell later through system information of the cell. In Release 12, features for low cost MTC are added, for which UE category 0 is newly defined. The UE category is an indicator indicating how much data the UE may handle at a communication modem. A UE in UE category 0 is a UE with a reduced peak data rate and relaxed radio frequency (RF) requirements, thus reducing baseband and RF complexity. In Release 13, a technology called eMTC (enhanced MTC) was introduced, which allows the UE to operate only at 1.08 MHz, a minimum frequency bandwidth supported by legacy LTE, thereby lowering the price and power consumption of the UE.

The contents described hereinafter is features mainly related to eMTC but may also be equally applicable to the MTC, eMTC, 5G (or NR) unless otherwise mentioned. Hereinafter, for convenience of explanation, MTC will be collectively described.

Therefore, the MTC described below may referred to as the enhanced MTC (eMTC), the LTE-M1/M2, BL (bandwidth reduced low complexity/CE (coverage enhanced), non-BL UE (in enhanced coverage), NR MTC, enhanced BL/CE, and the like. That is, the term MTC may be replaced with terms to be defined in the 3GPP standard in the future.

MTC General Features (1) MTC operates only within a specific system bandwidth (or channel bandwidth).

MTC may use six resource blocks (RBs) in the system band of the legacy LTE as shown in FIG. 26 or use a specific number of RBs in the system band of the NR system. The frequency bandwidth in which the MTC operates may be defined in consideration of a frequency range of NR and subcarrier spacing. Hereinafter, a specific system or frequency bandwidth in which the MTC operates is referred to as an MTC narrowband (NB). In the NR, the MTC may operate in at least one bandwidth part (BWP) or in a specific band of BWP.

MTC follows a narrowband operation to transmit and receive physical channels and signals, and a maximum channel bandwidth in which the MTC UE is operable is reduced to 1.08 MHz or six (LTE) RBs.

The narrowband may be used as a reference unit in resource allocation units of some downlink and uplink channels, and a physical location of each narrowband in the frequency domain may be defined to be different depending on the system bandwidth.

The bandwidth of 1.08 MHz defined in MTC is defined for the MTC UE to follow the same cell search and random access procedure as the legacy UE.

MTC may be supported by cells having a bandwidth (e.g., 10 MHz) much larger than 1.08 MHz but the physical channels and signals transmitted and received by the MTC are always limited to 1.08 MHz. The system with having much larger bandwidth may be legacy LTE, NR systems, 5G systems, and the like.

A narrowband is defined as six non-overlapping consecutive physical resource blocks in the frequency domain.

FIG. 26(a) is a diagram showing an example of a narrowband operation, and FIG. 26(b) is a diagram showing an example of repetition having RF retuning.

Frequency diversity by RF retuning will be described with reference to FIG. 26(b).

Due to narrowband RF, single antenna and limited mobility, the MTC supports limited frequency, space and time diversity. In order to reduce fading and outage, frequency hopping is supported by MTC between different narrow bands by RF retuning.

In MTC, frequency hopping is applied to different uplink and downlink physical channels when repetition is possible. For example, if 32 subframes are used for PDSCH transmission, first 16 subframes may be transmitted on a first narrowband. Here, the RF front end is retuned to another narrow band, and the remaining 16 subframes are transmitted on the second narrow band.

The narrowband of MTC may be set to the UE via system information or DCI (downlink control information) transmitted by the BS.

(2) The MTC operates in a half duplex mode and uses a limited (or reduced) maximum transmit power. The half duplex mode refers to a mode in which a communication device operates only in an uplink or a downlink at one frequency at one time point and operates in a downlink or an uplink at another frequency at another time point. For example, when the communication device operates in the half-duplex mode, the communication device performs communication using the uplink frequency and the downlink frequency, and the communication device may not use the uplink frequency and the downlink frequency at the same time. The communication device divides time to perform uplink transmission through the uplink frequency and the downlink reception by re-tuning to the downlink frequency for another predetermined time.

(3) MTC does not use channels (defined in legacy LTE or NR) that must be distributed over the entire system bandwidth of the legacy LTE or NR. For example, in the MTC, the PDCCH of the legacy LTE is not used because the PDCCH is distributed over the entire system bandwidth. Instead, a new control channel, MPDCCH (MTC PDCCH), is defined in the MTC. The MPDCCH is transmitted/received within a maximum of 6 RBs in the frequency domain.

(4) MTC uses the newly defined DCI format. For example, DCI formats 6-0A, 6-0B, 6-1A, 6-1B, 6-2, etc., may be used as a DCI format for MTC (see 3GPP TS 36.212).

(5) In the case of MTC, a physical broadcast channel (PBCH), a physical random access channel (PRACH), an MTC physical downlink control channel (M-PDCCH), a physical downlink shared channel (PDSCH), a physical uplink control channel (PUCCH), and a physical uplink shared channel (PUSCH) may be repeatedly transmitted. Due to the MTC repeated transmission, an MTC channel may be decoded even when signal quality or power is very poor, such as in an inadequate environment such as a basement, thereby increasing a cell radius and increasing a penetration effect.

(6) In MTC, PDSCH transmission based on PDSCH scheduling (DCI) and PDSCH scheduling may occur in different subframes (cross-subframe scheduling).

(7) In the LTE system, the PDSCH carrying a general SIB1 is scheduled by the PDCCH, whereas all the resource allocation information (e.g., subframe, transport block size, narrowband index) for SIB1 decoding is determined by a parameter of the MIB and no control channel is used for SIB1 decoding of the MTC.

(8) All resource allocation information (subframe, TBS, subband index) for SIB2 decoding is determined by several SIB1 parameters and no control channel for SIB2 decoding of MTC is used.

(9) The MTC supports an extended paging (DRX) cycle. Here, the paging period refers to a period during which the UE must be wake up to check whether there is a paging from a network even when the UE is in a discontinuous reception (DRX) mode in which it does not attempt to receive a downlink signal for power saving.

(10) MTC may use the same PSS (Primary Synchronization Signal)/SSS (Secondary Synchronization Signal)/CRS (Common Reference Signal) used in legacy LTE or NR. In the case of NR, the PSS/SSS is transmitted on an SSB basis, and a tracking RS (TRS) is a cell-specific RS and may be used for frequency/time tracking.

MTC Operation Mode and Level

Next, an MTC operation mode and level will be described. MTC is classified into two operation modes (first mode, second mode) and four different levels for coverage improvement as shown in Table 8 below.

The MTC operation mode is referred to as a CE (Coverage Enhancement) mode. In this case, the first mode may be referred to as a CE mode A, and the second mode may be referred to as a CE mode B.

TABLE 8

| Mode | Level | Description |
| --- | --- | --- |
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition for PRACH |

The first mode is defined for small coverage enhancement to support full mobility and CSI (channel state information, in which there is no repetition or fewer repetition times. The second mode is defined for UEs with extremely poor coverage conditions that support CSI feedback and limited mobility, in which a large number of repetitive transmissions is defined. The second mode provides a coverage improvement of up to 15 dB. Each level of MTC is defined differently in the random access procedure and the paging process.

The MTC operation mode is determined by the BS, and each level is determined by the MTC UE. Specifically, the BS transmits RRC signaling including information on the MTC operation mode to the UE. Here, the RRC signaling may be an RRC connection setup message, an RRC connection reconfiguration message or an RRC connection reestablishment message.

Thereafter, the MTC UE determines a level in each operation mode and transmits the determined level to the BS. Specifically, the MTC UE determines a level in an operation mode on the basis of measured channel quality (e.g., reference signal received power (RSRP), reference signal received quality (RSRQ), or signal to interference plus noise ratio (SINR), and transmits an RACH preamble using a PRACH resource (e.g., frequency, time, preamble resource for PRACH) corresponding to the determined level, thereby informing the BS about the determined level.

MTC Guard Period

As discussed above, MTC operates in narrow band. The location of the narrow band used in the MTC may be different for each particular time unit (e.g., subframe or slot). The MTC UE may tune to different frequencies depending on the time units. A certain amount of time is required for frequency retuning, and certain amount of time is defined as a guard period of MTC. That is, a guard period is required when frequency retuning is performed while transitioning from one time unit to the next time unit, and transmission and reception do not occur during the guard period.

MTC Signal Transmission/Reception Method

FIG. 27 is a diagram illustrating physical channels that may be used for MTC and a general signal transmission method using the same.

In step S1001, the MTC UE, which is powered on again or enters a new cell, performs an initial cell search operation such as synchronizing with the BS. To this end, the MTC UE receives a primary synchronization signal (PSS) and a secondary synchronization signal (SSS) from the BS, adjusts synchronization with the BS, and acquires information such as a cell ID. The PSS/SSS used in the initial cell search operation of the MTC may be a PSS/SSS, a resynchronization signal (RSS), or the like of an legacy LTE.

Thereafter, the MTC UE may receive a physical broadcast channel (PBCH) signal from the BS to acquire broadcast information in a cell.

Meanwhile, the MTC UE may receive a downlink reference signal (DL RS) in an initial cell search step to check a downlink channel state. The broadcast information transmitted through the PBCH is a master information block (MIB), and in the LTE, the MIB is repeated by every 10 ms.

Among the bits of the MIB of the legacy LTE, reserved bits are used in MTC to transmit scheduling for a new SIB1-BR (system information block for bandwidth reduced device) including a time/frequency location and a transport block size. The SIB-BR is transmitted directly on the PDSCH without any control channel (e.g., PDCCH, MPDDCH) associated with the SIB-BR.

Upon completion of the initial cell search, the MTC UE may receive an MPDCCH and a PDSCH according to the MPDCCH information to acquire more specific system information in step S1002. The MPDCCH may be transmitted only once or repeatedly. The maximum number of repetitions of the MPDCCH is set to the UE by RRC signaling from the BS.

Thereafter, the MTC UE may perform a random access procedure such as steps S1003 to S1006 to complete the connection to the BS. A basic configuration related to the RACH process of the MTC UE is transmitted by SIB2. In addition, SIB2 includes parameters related to paging. In the 3GPP system, a paging occasion (PO) refers to a time unit in which the UE may attempt to receive paging. The MTC UE attempts to receive the MPDCCH on the basis of a P-RNTI in the time unit corresponding to its PO on the narrowband (PNB) set for paging. The UE that has successfully decoded the MPDCCH on the basis of the P-RNTI may receive a PDSCH scheduled by the MPDCCH and check a paging message for itself. If there is a paging message for itself, the UE performs a random access procedure to access a network.

For the random access procedure, the MTC UE transmits a preamble through a physical random access channel (PRACH) (S1003), and receives a response message (RAR) for the preamble through the MPDCCH and the corresponding PDSCH. (S1004). In the case of a contention-based random access, the MTC UE may perform a contention resolution procedure such as transmission of an additional PRACH signal (S1005) and reception of the MPDCCH signal and corresponding PDSCH signal (S1006). The signals and/or messages Msg 1, Msg 2, Msg 3, and Msg 4 transmitted in the RACH process in the MTC may be repeatedly transmitted, and the repeat pattern is set to be different according to the CE level. Msg1 denotes a PRACH preamble, Msg2 denotes a random access response (RAR), Msg3 denotes UL transmission on the basis of a UL grant included in the RAR, and Msg4 denotes a DL transmission of the BS to Msg3.

For random access, PRACH resources for the different CE levels are signaled by the BS. This provides the same control of a near-far effect on the PRACH by grouping together UEs experiencing similar path loss. Up to four different PRACH resources may be signaled to the MTC UE.

The MTC UE estimates RSRP using a downlink RS (e.g., CRS, CSI-RS, TRS, and the like), and selects one of different PRACH resources (e.g., frequency, time, and preamble resources for PRACH) for the random access on the basis of the measurement result. The RAR for the PRACH and search spaces for the contention resolution messages for PRACH are also signaled at the BS via system information.

The MTC UE that has performed the above-described process may then receive an MPDCCH signal and/or a PDSCH signal (S1007) and transmit a physical uplink shared channel (PUSCH) signal and/or a physical uplink control channel (PUCCH) (S1108) as a general uplink/downlink signal transmission process. The MTC UE may transmit uplink control information (UCI) to the BS through the PUCCH or PUSCH. The UCI may include HARQ-ACK/NACK, scheduling request (SR), and/or CSI.

When RRC connection to the MTC UE is established, the MTC UE monitors the MPDCCH in a search space set to acquire uplink and downlink data allocation and attempts to receive the MDCCH.

In the case of MTC, the MPDCCH and the PDSCH scheduled by the MDCCH are transmitted/received in different subframes. For example, the MPDCCH having the last repetition in subframe #n schedules the PDSCH starting at subframe #n+2. The DCI transmitted by the MPDCCH provides information on how many times the MPDCCH is repeated so that the MTC UE may know when the PDSCH transmission is started. For example, when the DCI in the MPDCCH started to be transmitted from the subframe #n includes information that the MPDCCH is repeated 10 times, a last subframe in which the MPDCCH is transmitted is the subframe #n+9 and transmission of the PDSCH may start at subframe #n+11.

The PDSCH may be scheduled in the same as or different from a narrow band in which the MPDCCH scheduling the PDSCH is present. If the MPDCCH and the corresponding PDSCH are located in different narrow bands, the MTC UE needs to retune the frequency to the narrow band in which the PDSCH is present before decoding the PDSCH.

For uplink data transmission, scheduling may follow the same timing as legacy LTE. For example, the MPDCCH which is lastly transmitted at subframe #n may schedule PUSCH transmission starting at subframe #n+4.

FIG. 28 shows an example of scheduling for MTC and legacy LTE, respectively.

In the legacy LTE, the PDSCH is scheduled using the PDCCH, which uses the first OFDM symbol(s) in each subframe, and the PDSCH is scheduled in the same subframe as the subframe in which the PDCCH is received.

In contrast, the MTC PDSCH is cross-subframe scheduled, and one subframe between the MPDCCH and the PDSCH is used as a time period for MPDCCH decoding and RF retuning. The MTC control channel and data channel may be repeated over a large number of subframes including up to 256 subframes for the MPDCCH and up to 2048 subframes for the PDSCH so that they may be decoded under extreme coverage conditions.

NB-IoT (Narrowband-Internet of Things)

The NB-IoT may refer to a system for supporting low complexity, low power consumption through a system bandwidth (system BW) corresponding to one resource block (RB) of a wireless communication system.

Here, NB-IoT may be referred to as other terms such as NB-LTE, NB-IoT enhancement, enhanced NB-IoT, further enhanced NB-IoT, NB-NR. That is, NB-IoT may be replaced with a term defined or to be defined in the 3GPP standard, and hereinafter, it will be collectively referred to as 'NB-IoT' for convenience of explanation.

The NB-IoT is a system for supporting a device (or UE) such as machine-type communication (MTC) in a cellular system so as to be used as a communication method for implementing IoT (i.e., Internet of Things). Here, one RB of the existing system band is allocated for the NB-IoT, so that the frequency may be efficiently used. Also, in the case of NB-IoT, each UE recognizes a single RB as a respective carrier, so that RB and carrier referred to in connection with NB-IoT in the present specification may be interpreted to have the same meaning.

Hereinafter, a frame structure, a physical channel, a multi-carrier operation, an operation mode, and general signal transmission/reception related to the NB-IoT in the present specification are described in consideration of the case of the legacy LTE system, but may also be extendedly applied to a next generation system (e.g., an NR system, etc.). In addition, the contents related to NB-IoT in this specification may be extendedly applied to MTC (Machine Type Communication) oriented for similar technical purposes (e.g., low-power, low-cost, coverage enhancement, etc.).

Hereinafter, a case where a transmission time interval of a physical channel is a subframe are described as an example. For example, a case where a minimum time interval from the start of transmission of one physical channel (e.g., NPDCCH, NPDSCH, NPUCCH, NPUSCH) to the start of transmission of a next physical channel is one subframe will be described, but in the following description, the subframe may be replaced by a slot, a mini-slot, or multiple slots.

Frame Structure and Physical Resource of NB-IoT

First, the NB-IoT frame structure may be configured to be different according to subcarrier spacing. Specifically, FIG. 29 shows an example of a frame structure when a subscriber spacing is 15 kHz, and FIG. 30 shows an example of a frame structure when a subscriber spacing is 3.75 kHz. However, the NB-IoT frame structure is not limited thereto, and NB-IoT for other subscriber spacings (e.g., 30 kHz) may be considered with different time/frequency units.

In addition, although the NB-IoT frame structure on the basis of the LTE system frame structure has been exemplified in the present specification, it is merely for the convenience of explanation and the present invention is not limited thereto. The method described in this disclosure may also be extendedly applied to NB-IoT based on a frame structure of a next-generation system (e.g., NR system).

Referring to FIG. 29, the NB-IoT frame structure for a 15 kHz subscriber spacing may be configured to be the same as the frame structure of the legacy system (e.g., LTE system) described above. For example, a 10 ms NB-IoT frame may include ten 1 ms NB-IoT subframes, and the 1 ms NB-IoT subframe may include two 0.5 ms NB-IoT slots. Further, each 0.5 ms NB-IoT may include 7 OFDM symbols.

Alternatively, referring to FIG. 30, the 10 ms NB-IoT frame may include five 2 ms NB-IoT subframes, the 2 ms NB-IoT subframe may include seven OFDM symbols and one guard period (GP). Also, the 2 ms NB-IoT subframe may be represented by an NB-IoT slot or an NB-IoT RU (resource unit).

Next, physical resources of the NB-IoT for each of downlink and uplink will be described.

First, the physical resources of the NB-IoT downlink may be configured by referring to physical resources of other wireless communication system (e.g., LTE system, NR system, etc.), except that a system bandwidth is limited to a certain number of RBs (e.g., one RB, i.e., 180 kHz). For example, when the NB-IoT downlink supports only the 15-kHz subscriber spacing as described above, the physical resources of the NB-IoT downlink may be configured as resource regions limiting a resource grid of the LTE system shown in FIG. 31 to one RB in the frequency domain.

Next, in the case of the NB-IoT uplink physical resource, the system bandwidth may be limited to one RB as in the case of downlink. For example, if the NB-IoT uplink supports 15 kHz and 3.75 kHz subscriber spacings as described above, a resource grid for the NB-IoT uplink may be expressed as shown in FIG. 31. In this case, the number of subcarriers NULsc and the slot period Tslot in the uplink band in FIG. 31 may be given as shown in Table 9 below.

TABLE 9

| Subcarrier spacing | NULsc | Tslot |
|---|---|---|
| $\Delta f$ = 3.75 kHz | 48 | 6144 · Ts |
| $\Delta f$ = 15 kHz | 12 | 15360 · Ts |

In NB-IoT, resource units (RUs) are used for mapping the PUSCH for NB-IoT (hereinafter referred to as NPUSCH) to resource elements. RU may include NULsymb*NULslot SC-FDMA symbols in the time domain and include NRUsc number of consecutive subcarriers in the frequency domain. For example, NRUsc and NULsymb may be given by Table 10 below for frame structure type 1, which is a frame structure for FDD, and may be given by Table 11 below for frame structure type 2, which is frame structure for TDD.

TABLE 10

| NPUSCH format | $\Delta f$ | NRUsc | NULslots | NULsymb |
|---|---|---|---|---|
| 1 | 3.75 kHz | 1 | 16 | 7 |
|   | 15 kHz | 1 | 16 |  |
|   |  | 3 | 8 |  |
|   |  | 6 | 4 |  |
|   |  | 12 | 2 |  |
| 2 | 3.75 kHz | 1 | 4 |  |
|   | 15 kHz | 1 | 4 |  |

TABLE 11

| NPUSCH format | $\Delta f$ | Supported uplink-downlink configurations | NRUsc | NULslots | NULsymb |
|---|---|---|---|---|---|
| 1 | 3.75 kHz | 1, 4 | 1 | 16 | 7 |
|   | 15 kHz | 1, 2, 3, 4, 5 | 1 | 16 |  |
|   |  |  | 3 | 8 |  |
|   |  |  | 6 | 4 |  |
|   |  |  | 12 | 2 |  |
| 2 | 3.75 kHz | 1, 4 | 1 | 4 |  |
|   | 15 kHz | 1, 2, 3, 4, 5 | 1 | 4 |  |

Physical Channel of NB-IoT

A BS and/or a UE supporting the NB-IoT may be configured to transmit/receive physical channels and/or physical signals configured separately from the legacy system. Hereinafter, specific contents related to physical channels and/or physical signals supported by the NB-IoT will be described.

An orthogonal frequency division multiple access (OFDMA) scheme may be applied to the NB-IoT downlink on the basis of a subscriber spacing of 15 kHz. Through this, co-existence with other systems (e.g., LTE system, NR system) may be efficiently supported by providing orthogonality between subcarriers. A downlink physical channel/signal of the NB-IoT system may be represented by adding 'N (Narrowband)' to distinguish it from the legacy system. For example, a downlink physical channel may be referred to as an NPBCH (narrowband physical broadcast channel), an NPDCCH (narrowband physical downlink control channel), or an NPDSCH (narrowband physical downlink shared channel), and a downlink physical signal may be referred to as an NPSS (narrowband primary synchronization signal), an NSSS (narrowband secondary synchronization signal), an NRS (narrowband reference signal), an NPRS (narrowband positioning reference signal), an NWUS (narrowband wake up signal), and the like. Generally, the downlink physical channels and physical signals of the NB-IoT may be configured to be transmitted on the basis of a time domain multiplexing scheme and/or a frequency domain multiplexing scheme. In the case of NPBCH, NPDCCH, NPDSCH, etc., which are the downlink channels of the NB-IoT system, repetition transmission may be performed for coverage enhancement. In addition, the NB-IoT uses a newly defined DCI format. For example, the DCI format for NB-IoT may be defined as DCI format N0, DCI format N1, DCI format N2, and the like.

In the NB-IoT uplink, a single carrier frequency division multiple access (SC-FDMA) scheme may be applied on the basis of a subscriber spacing of 15 kHz or 3.75 kHz. As mentioned in the downlink section, the physical channel of the NB-IoT system may be expressed by adding 'N (Narrowband)' to distinguish it from the existing system. For example, the uplink physical channel may be represented by a narrowband physical random access channel (NPRACH) or a narrowband physical uplink shared channel (NPUSCH), and the uplink physical signal may be represented by a narrowband demodulation reference signal (NDMRS), or the like. NPUSCH may be divided into NPUSCH format 1 and NPUSCH format 2. In one example, NPUSCH Format 1 may be used for uplink shared channel (UL-SCH) transmission (or transport), and NPUSCH Format 2 may be used for uplink control information transmission such as HARQ ACK signaling. In the case of NPRACH, which is an uplink channel of the NB-IoT system, repetition transmission may be performed for coverage enhancement. In this case, repetition transmission may be performed by applying frequency hopping.

Multi-Carrier Operation of NB-IoT

Next, a multi-carrier operation of the NB-IoT will be described. The multicarrier operation may refer to that multiple carriers set for different uses (i.e., different types) are used for transmitting/receiving channels and/or signals between the BS and/or ULE in the NB-Jot.

The NB-IoT may operate in a multi-carrier mode. Here, in the NB-IoT, a carrier wave in the N-Iot may be classified as an anchor type carrier (i.e., an anchor carrier, an anchor PRB) and a non-anchor type carrier a non-anchor type carrier (i.e., non-anchor carrier).

The anchor carrier may refer to a carrier that transmits NPSS, NSSS, NPBCH, and NPDSCH for a system information block (N-SIB) for initial access from a point of view of the BS. That is, in NB-IoT, the carrier for initial access may be referred to as an anchor carrier and the other(s) may be referred to as a non-anchor carrier. Here, only one anchor carrier wave may exist in the system, or there may be a plurality of anchor carrier waves.

Operation Mode of NB-IoT

Next, an operation mode of the NB-IoT will be described. In the NB-IoT system, three operation modes may be supported. FIG. 32 shows an example of operation modes supported in the NB-IoT system. Although the operation mode of the NB-IoT is described herein on the basis of an LTE band, this is for convenience of explanation and may be extendedly applied to other system bands (e.g. NR system band).

Specifically, FIG. 32(a) shows an example of an in-band system, FIG. 32 (b) shows an example of a guard-band system, and FIG. 32(c) Represents an example of a stand-alone system. In this case, the in-band system may be expressed as an in-band mode, the guard-band system may be expressed as a guard-band mode, and the stand-alone system may be expressed in a stand-alone mode.

The in-band system may refer to a system or mode that uses a specific RB in the (legacy) LTE band. The in-band system may be operated by allocating some resource blocks of the LTE system carrier.

A guard-band system may refer to a system or mode that uses NB-IoT in a space reserved for a guard-band of the legacy LTE band. The guard-band system may be operated by allocating a guard-band of an LTE carrier not used as a resource block in the LTE system. For example, the (legacy) LTE band may be configured to have a guard-band of at least 100 kHz at the end of each LTE band, and with two non-contiguous guard-bands for 200 kHz for NB-IoT may be used.

As described above, the in-band system and the guard-band system may be operated in a structure in which NB-IoT coexists in the (legacy) LTE band.

By contrast, the stand-alone system may refer to a system or mode that is configured independently of the legacy LTE band. The stand-alone system may be operated by separately allocating frequency bands (e.g., reassigned GSM carriers in the future) used in a GERAN (GSM EDGE radio access network).

The three operation modes described above may be operated independently of each other, or two or more operation modes may be operated in combination.

NB-IoT Signal Transmission/Reception Process

FIG. 33 is a diagram illustrating an example of physical channels that may be used for NB-IoT and a general signal transmission method using the same. In a wireless communication system, an NB-IoT UE may receive information from a BS through a downlink (DL) and the NB-IoT UE may transmit information to the BS through an uplink (UL). In other words, in the wireless communication system, the BS may transmit information to the NB-IoT UE through the downlink and the BS may receive information from the NB-IoT UE through the uplink.

The information transmitted/received by the BS and the NB-IoT UE includes data and various control information, and various physical channels may exist depending on the type/purpose of the information transmitted/received by the BS and NB-IoT UE. The signal transmission/reception method of the NB-IoT may be performed by the above-described wireless communication devices (e.g., BS and UE).

The NB-IoT UE, which is powered on again or enters a new cell, may perform an initial cell search operation such as adjusting synchronization with the BS, or the like (S11). To this end, the NB-IoT UE receives NPSS and NSSS from the BS, performs synchronization with the BS, and acquires cell identity information. Also, the NB-IoT UE may receive the NPBCH from the BS and acquire the in-cell broadcast information. In addition, the NB-IoT UE may receive a DL RS (downlink reference signal) in the initial cell search step to check a downlink channel state.

After completion of the initial cell search, the NB-IoT UE may receive the NPDCCH and the corresponding NPDSCH to acquire more specific system information (S12). In other words, the BS may transmit more specific system information by transmitting the NPDCCH and corresponding NPDSCH to the NB-IoT UE after completion of the initial cell search.

Thereafter, the NB-IoT UE may perform a random access procedure to complete connection to the BS (S13 to S16).

Specifically, the NB-IoT UE may transmit a preamble to the BS via the NPRACH (S13). As described above, the NPRACH may be configured to be repeatedly transmitted on the basis of frequency hopping or the like to enhance coverage or the like. In other words, the BS may (repeatedly) receive a preamble through the NPRACH from the NB-IoT UE.

Thereafter, the NB-IoT UE may receive a random access response (RAR) for the preamble from the BS through the NPDCCH and the corresponding NPDSCH (S14). In other words, the BS may transmit the RAR for the preamble to the NB-IoT UE through the NPDCCH and the corresponding NPDSCH.

Thereafter, the NB-IoT UE transmits the NPUSCH to the BS using scheduling information in the RAR (S15), and may perform a contention resolution procedure such as the NPDCCH and the corresponding NPDSCH (S16). In other words, the BS may receive the NPUSCH from the UE using the scheduling information in the NB-IoT RAR, and perform the contention resolution procedure.

The NB-IoT UE that has performed the above-described process may perform NPDCCH/NPDSCH reception (S17) and NPUSCH transmission (S18) as a general uplink/downlink signal transmission process. In other words, after performing the above-described processes, the BS may perform NPDCCH/NPDSCH transmission and NPUSCH reception as a general signal transmission/reception process to the NB-IoT UE.

In the case of NB-IoT, as mentioned above, NPBCH, NPDCCH, NPDSCH, and the like may be repeatedly transmitted for coverage improvement and the like. In the case of NB-IoT, UL-SCH (i.e., general uplink data) and uplink control information may be transmitted through the NPUSCH. Here, the UL-SCH and the uplink control information (UCI) may be configured to be transmitted through different NPUSCH formats (e.g., NPUSCH format 1, NPUSCH format 2, etc.).

Also, the UCI may include HARQ ACK/NACK (Hybrid Automatic Repeat and reQuest Acknowledgement/Negative-ACK), SR (Scheduling Request), CSI (Channel State Information), and the like. As described above, the UCI in the NB-IoT may generally be transmitted via the NPUSCH. Also, in response to a request/instruction from the network (e.g., BS), the UE may transmit the UCI via the NPUSCH in a periodic, aperiodic, or semi-persistent manner.

Hereinafter, the wireless communication system block diagram shown in FIG. 1 will be described in detail.

N. Wireless Communication Device

Referring to FIG. 1, a wireless communication system includes a first communication device 910 and/or a second communication device 920. 'A and/or B' may be interpreted to have the same meaning as 'includes at least one of A or B.' The first communication device may represent a BS and the second communication device may represent a UE (alternatively, the first communication device may represent a UE and the second communication device may represent a BS).

The first and second communication devices may include processors 911 and 921, memories 914 and 924, one or more Tx/Rx RF modules 915 and 925, Tx processors 912 and 922, Rx processors 913 and 923, and antennas 916 and 926, respectively. The Tx/Rx module is also called a transceiver. The processor implements the functions, procedures and/or methods discussed above. More specifically, in the DL (communication from the first communication device to the second communication device), a higher layer packet from the core network is provided to the processor 911. The processor implements the function of a layer 2 (i.e., L2) layer. In the DL, the processor multiplexes a logical channel and a transport channel, provides radio resource allocation to the second communication device 920, and is responsible for signaling to the second communication device. A transmission (TX) processor 912 implements various signal processing functions for the L1 layer (i.e., the physical layer). The signal processing function facilitates forward error correction (FEC) in the second communication device, and includes coding and interleaving. The encoded and interleaved signals are scrambled and modulated into complex-valued modulation symbols. For modulation, BPSK (Quadrature Phase Shift Keying), QPSK (Quadrature Phase Shift Keying), 16QAM (quadrature amplitude modulation), 64QAM, 246QAM, and the like may be used. The complex-valued modulation symbols (hereinafter referred to as modulation symbols) are divided into parallel streams, each stream being mapped to an OFDM subcarrier and multiplexed with a reference signal (RS) in the time and/or frequency domain, and combined together using IFFT (Inverse Fast Fourier Transform) to create a physical channel carrying a time domain OFDM symbol stream. The OFDM symbol stream is spatially precoded to produce multiple spatial streams. Each spatial stream may be provided to a different antenna 916 via a separate Tx/Rx module (or transceiver, 915). Each Tx/Rx module may upconvert each spatial stream into an RF carrier for transmission. In the second communication device, each Tx/Rx module (or transceiver, 925) receives a signal of the RF carrier via each antenna 926 of each Tx/Rx module. Each Tx/Rx module restores the RF carrier signal to a baseband signal and provides it to the reception (RX) processor 923. The RX processor implements various signal processing functions of the L1 (i.e., the physical layer). The RX processor may perform spatial processing on the information to recover any spatial stream directed to the second communication device. If multiple spatial streams are directed to the second communication device, they may be combined into a single OFDMA symbol stream by multiple RX processors. The RX processor transforms the OFDM symbol stream, which is a time domain signal, into a frequency domain signal using a fast Fourier transform (FFT). The frequency domain signal includes a separate OFDM symbol stream for each subcarrier of the OFDM signal. The modulation symbols and the reference signal on each subcarrier are recovered and demodulated by determining the most likely signal constellation points sent by the first communication device. These soft decisions may be based on channel estimate values. Soft decisions are decoded and deinterleaved to recover data and control signals originally transmitted by the first communication device on the physical channel. The corresponding data and control signals are provided to the processor 921.

The UL (communication from the second communication device to the first communication device) is processed in the first communication device 910 in a manner similar to that described in connection with a receiver function in the second communication device 920. Each Tx/Rx module 925 receives a signal via each antenna 926. Each Tx/Rx module provides an RF carrier and information to RX processor 923. The processor 921 may be related to the memory 924 that stores program code and data. The memory may be referred to as a computer-readable medium.

FIG. 34 is a diagram illustrating a method for processing a picture of automatic driving vehicle according to an embodiment of the present disclosure.

Referring to FIG. 34, a method for processing a picture of automatic driving vehicle according to an embodiment of the present disclosure is as follows.

While a vehicle on which a camera is mounted is driving, the vehicle may obtain (or capture) a first image from the camera (step, S2110). The vehicle is defined as a transportation means which is driving a road or a lane. The vehicle includes an automobile, a train and a motorcycle. The vehicle includes a vehicle provided with an internal combustion engine as a power source, a hybrid vehicle provided with an engine and an electric motor as a power source, an electric vehicle provided with an electric motor as a power source, and the like. The vehicle may be a privately-owned vehicle. On the other hand, the vehicle may be a shared vehicle. The vehicle may be an automatic driving vehicle.

The vehicle may include at least one camera. When the vehicle drives, the camera may capture a periphery of the vehicle including a front side in real time. The vehicle may receive a first image captured from the camera. The first image may be a picture capturing a front of the vehicle which is driving. In an automatic driving mode, the vehicle may receive the first image in real time and display it on a wind-shield glass. The automatic driving mode will be described below in detail.

The vehicle may detect a quantity of light which is a threshold brightness or higher from the first image (step, S2120). The vehicle may check a light source or a quantity of light in real time from the first image which is displayed. The vehicle may check whether a quantity of light which is a threshold brightness or higher is detected from the first image which is displayed in real time.

The vehicle may generate a prediction signal when a quantity of light which is a threshold brightness or higher is detected from the first image (step, S2130). That is, when a quantity of light which is a threshold brightness or higher is detected from the first image, the vehicle may generate a prediction signal that predicts an occurrence (sign) of White-Out from the first image. The vehicle may search a sign of White-Out from the first image by the prediction signal, a detection of a quantity of light which is a threshold brightness or higher may be predicted. For example, a sign of White-Out may be the Sun rising in front of the vehicle, a head light of a vehicle of other side which is driving in opposite direction in night driving, when entering a tunnel and when leaving a tunnel.

When the prediction signal is generated, the vehicle may store the first image (step, S2140). The vehicle may store the first image during a first period after the prediction signal is generated. The vehicle may store the first image temporally in a storage unit. The storage unit may be called a memory. The first period may be called a storage period.

The vehicle may detect a second image in which White-Out occurs on a specific time during the first period (step, S2150). For example, the second image is a picture in which White-Out occurs in the first image.

When the second image is detected, the vehicle may predict and correct the second image based on the first image stored in the storage period and a correction model (step, S2160). The image correcting the second image may be called a third image.

The correction model may be a result of processing and learning the second image with a high dynamic range (HDR). The correction of the second image will be described below in detail.

In the case that the second image is not detected during the first period, the vehicle may cancel the prediction correction (step, S2170). In the case that the second image is not detected after the prediction signal is generated, the vehicle may determine a probability that White-Out occurs is lowered significantly. Accordingly, the vehicle may not store the first image.

The first image to the third image described above may be referred to as a first frame to a third frame, respectively.

FIGS. 35 to 37 are diagrams for describing an order of correction in detail in the method for processing a picture of automatic driving vehicle according to an embodiment of the present disclosure.

Referring to FIG. 35 and FIG. 36, when a prediction signal is generated, the vehicle may store the first image during the first period (step, S2140).

The vehicle may perform Next learning or prediction for the first image before White-Out occurs on a specific time during the first period (step, S2151). The vehicle may store the first image in different image quality based on an area in which a sign of occurrence of White-Out in the first image. For example, the vehicle may store the area in which the sign of occurrence of White-Out is occurred in higher image quality than those of other areas. That is, the vehicle may store the area in which the sign of occurrence of White-Out is occurred and the peripheral area in high image quality and store the remaining areas in low image quality.

In the first image stored in real time after the prediction signal is generated, the vehicle stores the area including the sign of occurrence of White-Out in higher image quality than those of other areas, and accordingly, an image quality of correction may be improved, but also the whole file size for the first image may be decreased.

In addition, the vehicle may perform Next learning or prediction continuously and check an object which is required for safe driving of the vehicle in the first image. The object required for safe driving of the vehicle may include a lane, a traffic light disposed in front of the vehicle, another vehicle driving in front or rear of the vehicle, a direction of progress of a road (e.g., right or left bend), a person located in front of the vehicle, a position of an object, and the like. However, the object required for safe driving of the vehicle is not limited thereto but may be changed according to the stored first image. The vehicle may check a position of the object captured in the first image in real time and compute or detect a movement of the object in preparation of the case that White-Out occurs.

Later, the vehicle may detect the second image in which White-Out occurs in the first image (step, S2152).

In the case that the second image is not detected, the vehicle may suspend the first image or cancel storage (step, S2170). In addition, the vehicle may cancel or suspend the Next learning or prediction for the first image. In other words, in the case that the second image is not detected during the first period, the vehicle may cancel the prediction correction. In the case that the second image is not detected after the prediction signal is generated, the vehicle may determine that a probability that White-Out occurs to be lowered significantly. Accordingly, the vehicle may not store the first image.

In the case that the second image is detected, the vehicle may predict and correct the second image based on the first image stored in the storage period and a correction model (step, S2160). The correction model may be a result of processing and learning the second image with a high dynamic range (HDR).

The vehicle may learn the second image in which White-Out occurs (step, S2161) and correct it based on the high dynamic range (HDR) (step, S2162). The high dynamic range (HDR) may be used for representing a photograph or a picture more realistically or implement a vivid image. The high dynamic range may also be called High Dynamic Range Imaging (HDRI). The high dynamic range (HDR) applied to a photograph or an image may be referred to as the High Dynamic Range Imaging (HDRI) and the high dynamic range (HDR) applied to a picture may be referred to as High Dynamic Range Rendering.

According to the high dynamic range (HDR), after several sheets of pictures of which exposure levels are different are captured continually, a bright picture and a dark picture may be composed. Generally, when a picture is exposed on a dark portion, a bright portion becomes too bright, and when a picture is exposed on a bright portion, a dark portion becomes too dark. This is because a picture is captured in accordance with a predetermined exposure level while a brain interprets continuous visual information and an eye of human adapts in accordance of light condition. The HDR enables both a dark portion and a bright portion close to the natural color by composing several pictures. In this case, the technique of composting color values of the HDR may be referred to as Tone Mapping.

The biggest feature of the HDR is that a bright portion and a dark portion of a photograph or a picture become sharpen. This is because detailed portions are well represented since contrast is increased. According to a photograph or a picture using the HDR technique, a realistic and vivid output may be obtained through an elaborate representation.

When the vehicle corrects the second image based on the high dynamic range (HDR), the vehicle may extract a portion causing White-Out in the first image (step, S21621).

The vehicle may select a portion that requires a correction through the portion causing White-Out which is extracted (step, S21622). The vehicle may select a portion to correct in the portion causing White-Out which is extracted by providing a priority according to a preconfigured or learned range.

The vehicle may adjust a degree of correction according to the portion causing White-Out which is selected (step, S21623). That is, in the case that the selected portion causing White-Out includes an important object, the vehicle adjusts a correction minutely but the selected portion causing White-Out includes an unimportant object relatively, the vehicle adjusts a correction briefly.

FIGS. 38 to 44 are diagrams illustrating a correction of a picture displayed on a wind-shield glass of an automatic driving vehicle according to an embodiment of the present disclosure.

Referring to FIG. 38, it is shown that a method for the vehicle on which a camera is mounted to store the first image while driving and correct the second image in which White-Out occurs in the first image over time.

The vehicle on which a camera is mounted may capture the first image in real time while driving on a road. The first image captured in real time may be displayed on a wind-shield glass of the vehicle. Further, first image captured in real time may be represented in step t-4 as shown in FIG. 38 and displayed on a wind-shield glass as shown in FIG. 39.

Later, the vehicle may detect or find a sign of occurrence of White-Out in the captured first image or the first image displayed on the wind-shield glass. The vehicle may generate a prediction signal when the sign of occurrence of White-Out is generated. When the sign of occurrence of White-Out is detected or the prediction signal is generated, the vehicle may store the captured first image. The vehicle may store the first image temporarily in a memory.

The first image in which the sign of occurrence of White-Out is generated may be represented in step t-3 or Seed 1 as shown in FIG. 38 and displayed on the wind-shield glass as shown in FIG. 40. The sign of occurrence of White-Out may be the Sun in the upper left side of the first image which is displayed.

Later, the vehicle may display the first image on the wind-shield while storing the first image continuously. The vehicle may store the first image until the second image in which White-Out occurs in the first image.

The first image before White-Out occurs may be represented in steps t-2 and t-1 or Seed 2 and Seed 3 as shown in FIG. 38 and displayed on the wind-shield glass as shown in FIG. 41 and FIG. 42. In this case, the vehicle may store the area in which the sign of occurrence of White-Out is generated in the first image in higher image quality than those of other areas. In addition, the vehicle may check an object which is required for safe driving of the vehicle in the first image. In the case that the object required for safe driving of the vehicle is included in the area in which the sign of occurrence of White-Out is generated in the first image, the vehicle may increase the image quality of the area in which the sign of occurrence of White-Out is generated focusing on the object required for safe driving of the vehicle. As described above, the area in which the sign of occurrence of White-Out is generated, the object required for safe driving of the vehicle and the overlapped area therebetween, and it may be prevented that the image corrected based on the high dynamic range (HDR) is cracked.

Later, the vehicle may detect the second image in which White-Out occurs in the captured first image or the first image displayed on the wind-shield glass.

In the case that a space of securing a front sight of the vehicle in the captured first image or the displayed first image becomes smaller than a preconfigured range, the vehicle may determine that White-Out or White-Out phenomenon occurs. For example, in the case that a space of securing a front sight of the vehicle becomes smaller than 50% of the entire screen, the vehicle may determine that White-Out or White-Out phenomenon occurs. That is, in the case that a space of securing a front sight of the vehicle is not secured as much as a half of the entire screen, the vehicle may determine that there is an obstacle in safe driving.

As shown in FIG. 38, the second image in which White-Out occurs may be represented as step of t and may be displayed on the wind-shield glass, as shown in FIG. 43.

When the second image is detected, the vehicle may predict and correct the second image based on a plurality of Seeds stored in the first period and the correction model.

The correction model may be a result of processing and learning the second image with a high dynamic range (HDR). A plurality of Seeds may be capture images that store the first image during the first period or the storage period. A plurality of Seeds may be referred to as Seed 1 to Seed 3. Seed 1 to Seed 3 may be images of which exposures are different. Seed 1 to Seed 3 may be images captured sequentially over time.

The vehicle may composite Seed 1 to Seed 3 which are images before the second image is not generated and predict and correct the second image based on the composited Seed 1 to Seed 3 and the correction model, and accordingly, generate the third image in which White-Out is removed. The third image in which White-Out is removed is displayed on the wind-shield glass, eye strain of a driver may be relieved, a performance of recognizing an automatic driving image is improved significantly, and traffic accident risk owing to misrecognition may be reduced.

The second image may be corrected during a prediction correction period as shown in FIG. 38 and displayed on the wind-shield glass as shown in FIG. 44.

FIG. 45 is a diagram illustrating an image processing apparatus of an automatic driving vehicle according to an embodiment of the present disclosure.

Referring to FIG. 45, the image processing apparatus 2000 of an automatic driving vehicle according to an embodiment of the present disclosure may include a camera 2010, an image processing unit 2020, a control unit 2030 and a communication unit 2040.

The camera 2010 may be mounted on a vehicle. A plurality of cameras 2010 may be mounted. For example, a front camera may be disposed in a front of the vehicle and capture a front side of the vehicle, and a rear camera may be disposed in a rear of the vehicle and capture a rear side of the vehicle. And, at least one peripheral camera may be disposed on a side of the vehicle such as on a side mirror of the vehicle and capture a side of the vehicle and a periphery of the vehicle.

The image processing unit 2020 may be provided with the first image captured by the camera 2010 and store or predict and correct it under the control of the control unit 2030.

The image processing unit 2020 may include a processor 2021 and a memory 2022.

The processor 2021 may detect a sign of occurrence of White-Out in the first image. The processor 2021 may detect the second image in which White-Out occurs and predict and correct the second image by applying the high dynamic range (HDR) technique. The processor 2021 may operate the process of correction of the vehicle described in FIG. 34 to FIG. 44 under the control of the control unit 2030.

The memory 2022 may store the first image during the first period. The memory 2022 may store the correction model under the control of the control unit 2030. The memory 2022 may store the contents which is learned while an automatic driving vehicle drives a road in real time under the control of the control unit 2030 and provide the stored data to the processor 2021.

The control unit 2030 may be electrically connected to the camera 2010, the image processing unit 2020 and the communication unit 2040 and control these.

The control unit 2030 may control a vehicle such that the vehicle may drive a road safely in the case that the vehicle is in the automatic driving mode.

In the case that the vehicle is in the automatic driving mode, as described with reference to FIG. 34 to FIG. 44, the control unit 2030 may check the captured first image in real time. When a sign of occurrence of White-Out in the first image, the control unit 2030 may predict and correct the second image by predicting/learning it and display the third image in which White-Out is removed on a wind-shield glass of the vehicle.

In the case that the vehicle is in a self-driving mode that a driver drives the vehicle directly, the control unit 2030 may control the vehicle to check vehicles around the vehicle which is driving in real time and check a state of the driver which is driving in real time.

For example, in the case that the vehicle is in a self-driving mode, the control unit 2030 may check whether a driver is drowsy and control the vehicle to respond it properly.

In addition, even in the case that the vehicle is in a self-driving mode, when the sign of occurrence of White-Out is detected on the wind-shield glass of the vehicle, the control unit 2030 may predict and correct the second image by predicting/learning it and display the third image in which White-Out is removed on the wind-shield glass of the vehicle.

The communication unit 2040 may receive external data from an exterior and provide it to the driving vehicle under the control of the control unit 2030. Alternatively, the communication unit 2040 may provide a road peripheral image captured by the vehicle which is driving on the road under the control of the control unit 2030. For example, the communication unit 2040 may provide real time traffic information from a traffic broadcasting station to the vehicle which is driving. Furthermore, when an event is generated in the road peripheral image captured by the vehicle which is driving on the road, the communication unit 2040 may provide it to the traffic broadcasting station.

FIG. 46 is a diagram for describing an automatic driving vehicle to perform 5G communication according to an embodiment of the present disclosure.

Referring to FIG. 46, an automatic driving vehicle on which the image processing apparatus 2000 is mounted may be provided with various information from an exterior using 5G communication.

The automatic driving vehicle may be provided with first information to fourth information in real time using 5G communication and apply it in real time, and accordingly, perform automatic driving safely.

For example, the automatic driving vehicle which is driving on a road may be provided with real time traffic information from a traffic broadcasting station, provided with weather information from a weather center in real time, provided with map information from a portal site or a navigation company in real time and provided with real time road information from a vehicle of which destination is the same. For example, the vehicle may be provided with the weather information from a weather center and predict and learn a sign of occurrence of White-Out in advance by considering the time when the Sun rises and the location that the Sun moves.

The vehicle according to the present disclosure may be provided with weather information, map information, traffic information and driving information of a driving vehicle and predict an area or district in which White-Out may occur.

FIGS. 47 to 49 are diagrams for describing a prediction area in which White-Out may occur according to an embodiment of the present disclosure.

As shown in FIG. 47, the vehicle according to the present disclosure may learn an expected path of a vehicle driving toward a destination, weather information (position of the Sun), map information, traffic information and driving information the vehicle (driving direction) and predict that White-Out may occur when the vehicle driving toward a destination passes through A1 point WOA1 and A2 point WOA2 in a first area.

Accordingly, the vehicle may recommend the other path deviating the area in which White-Out may occur. In this case, the vehicle may detect real time traffic information and recommend the other path which is fast and safe.

A1 point WOA1 may include A11 area WOA11 and A12 area WOA12. A12 area WOA12 may be an area in which there is probability of occurring White-Out. A11 area WOA11 may be an area of which probability of occurring White-Out is very high.

When the vehicle enters A12 area WOA12, the vehicle may correct the image displayed on a wind-shield glass of the vehicle as described with reference to FIG. 34 to FIG. 44.

In addition, when the vehicle enters A11 area WOA11, the vehicle may correct the image displayed on a wind-shield glass of the vehicle, and simultaneously, detect a periphery of the driving vehicle more minutely using various sensors mounted on the vehicle. For example, the vehicle may sense a distance from a front vehicle, a distance from a rear vehicle and a vehicle driving in a side lane using an interval sensor of the vehicle and drive by increasing the distance from the vehicles gradually and simultaneously, reducing a speed of the vehicle.

That is, when the vehicle drives through A11 area WOA11 in A1 point WOA1, the vehicle may control the speed of vehicle while correcting an image such that a safe accident due to White-Out does not occur.

As shown in FIG. 48, A3 point WOA3 represents a change of an area of a prediction area for White-Out which may occur depending on an altitude of the Sun.

For example, as a position of the Sun is low, as represented in A35 area WOA35 of A3 point WOA3, an area of prediction area becomes wider, and as an altitude of the Sun is low, as represented in A31 area WOA31 of A3 point WOA3, an area of prediction area becomes narrower.

As shown in FIG. 49, A4 point WOA4 represents a prediction area for White-Out which may occur in the morning, and A5 point WOA5 represents a prediction area for White-Out which may occur in the afternoon. That is, since a position of the Sun changes as time goes by, a position of the prediction area of White-Out may also be changed.

FIG. 50 is a block diagram of an AI apparatus according to an embodiment of the present disclosure.

Referring to FIG. 50, an AI apparatus 20 may include an electronic device including an A1 module which may perform an AI processing or a server including the A1 module. In addition, the AI apparatus 20 may be included as at least an element of the vehicle 10 shown in FIG. 46 and provided to perform at least a part of AI processing.

The AI processing may include all operations related to driving of the vehicle 10 shown in FIG. 46. For example, the automatic driving vehicle may perform AI processing of sensing data or driver data and perform operations of processing/determination and generating a control signal. Furthermore, for example, the automatic driving vehicle may perform an automatic driving control by performing AI processing of data obtained through an interaction with another electronic device provided in the vehicle.

The AI apparatus 20 may include an AI processor 21, a memory 25 and/or a communication unit 27.

The AI apparatus 20 may be a computing apparatus which may perform a neural network learning and implemented with various electronic devices such as a server, a desktop, a PC, a notebook PC, a tablet PC.

The AI processor 21 may perform a neural network learning using the program stored in the memory 25. Particularly, the AI processor 21 may perform a neural network learning for recognizing vehicle related data. Here, the neural network for recognizing the vehicle related data may be designed to simulate a brain structure of a human on a computer and may include a plurality of network nodes having a priority which simulating a neuron of human neural network. A plurality of network nodes may exchange data according to each connection relation to simulate a synaptic activity of the neuron, which the neuron exchanges a signal through a synapse. Here, the neural network may include a deep learning model which is developed from the neural network model. In the deep learning model, a plurality of network nodes may exchange data according to a convolution connection relation with being located in different layers. An example of the neural network model may include various deep learning techniques such as deep neural networks (DNN), convolutional deep neural networks (CNN), Recurrent Boltzmann Machine (RNN), Restricted Boltzmann Machine (RBM), deep belief networks (DBN), Deep Q-Network, and may be applied to a field such as computer vision, voice recognition, natural language process and voice/signal processing.

Meanwhile, the processer that performs the functions described above may be a general-purpose processor (e.g., CPU) but an AI-dedicated processor (e.g., GPU) for an artificial intelligence learning.

The memory 25 may store various types of program and data required for an operation of the AI apparatus 20. The memory 25 may be implemented with non-volatile memory, volatile memory, flash memory, hard disk drive (HDD) or solid-state drive (SDD). The memory 25 may be accessed by the AI processor 21 and read/record/modification/deletion/update of data may be performed by the AI processor 21. In addition, the memory 25 may store a neurotic network model (e.g., deep learning model 26) which is generated through a learning algorithm for data classification/recognition according to an embodiment of the present disclosure.

Meanwhile, the AI processor 21 may include a data learning unit 22 that learns a neurotic network for the classification/recognition. The data learning unit 22 may learn a criterion on which learning data is used to determine the classification/recognition and how to classify and recognize data using the learning data. The data learning unit 22 may obtain learning data used for learning and apply the obtained learning data to the deep learning model, and accordingly, learn the deep learning model.

The data learning unit 22 may be manufactured in at least one hardware chip shape and mounted on the AI apparatus 20. For example, the data learning unit 22 may be manufactured in hardware chip shape dedicated for the artificial intelligence (AI) or manufactured as a part of a general-purpose processor (CPU) or a graphic processing processor (GPU) and mounted on the AI apparatus 20. Furthermore, the data learning unit 22 may be implemented with a software module. In the case that the data learning unit 22 is implemented with a software module (or program module including instruction), the software module may be stored in a non-transitory computer readable media. In this case, at least one software module may be provided by an Operating System (OS) or an application.

The data learning unit 22 may include a learning data acquisition unit 23 and a model learning unit 24.

The learning data acquisition unit 23 may acquire learning data which is required for the neurotic network model for classifying and recognizing data. For example, the learning data acquisition unit 23 may obtain vehicle data and/or sample data for being inputted in the neurotic network model as learning data.

The model learning unit 24 may learn to have a determination criterion how to classify predetermined data by the neurotic network model using the obtained learning data. In this case, the model learning unit 24 may learn the neurotic network model through a supervised learning that uses at least one determination criterion among learning data. Alternatively, the model learning unit 24 may learn the learning data without supervising and learn the neurotic network model through an unsupervised learning which discovers a determination criterion. In addition, the model learning unit 24 may learn the neurotic network model through a reinforcement learning using a feedback whether a result of an assessment of situation according to learning is correct. Furthermore, the model learning unit 24 may learn the neurotic network model using a learning algorithm including an error back-propagation or a gradient decent.

When the neurotic network model is learned, the model learning unit 24 may store the learned neurotic network model in a memory. The model learning unit 24 may store learned neurotic network model in the memory of a server connected to the AI apparatus 20 in wired or wireless manner.

The data learning unit 22 may further include a learning data pre-processing unit (not shown) or a learning data selection unit (not shown) for improving an analysis result of the learning model or saving a resource or time which is required for generating a recognition model.

The learning data pre-processing unit may pre-process obtained data such that the obtained data is used for learning for an assessment of situation. For example, the learning data pre-processing unit may process the obtained data in a preconfigured format such that the model learning unit 24 uses the learning data obtained for learning an image recognition.

In addition, the learning data selection unit may select the data required for learning between the learning data obtained in the learning data acquisition unit 23 or the learning data pre-processed in the pre-processing unit. The selected learning data may be provided to the model learning unit 24. For example, the learning data selection unit may detect a specific area in the image obtained through the camera and select only the data for the object included in the specific area as the learning data.

Furthermore, the data learning unit 22 may further include a model evaluation unit (not shown) for improving the analysis result of the learning model.

The model evaluation unit may input evaluation data in the neurotic network model, and in the case that the analysis result fails to satisfy a predetermined level, make the data learning unit 22 learn the neurotic network model again. In this case, the evaluation data may be predefined data for evaluating a recognition model. As an example, in the case that the number of evaluation data or the ratio in which the analysis result is not clear exceeds a preconfigured threshold value in the analysis result of the recognition model which is learned for the evaluation data, the model evaluation unit may evaluate that the analysis result fails to satisfy the predetermined level.

The communication unit 27 may the AI processing result by the AI processor 21 to an external electronic device.

Here, the external electronic device may be defined as an automatic driving vehicle. In addition, the AI apparatus 20 may be defined as another vehicle or 5G network that communicates with the automatic driving vehicle or an automatic driving module mounted vehicle. Meanwhile, the AI apparatus 20 may be implemented with being functionally embedded in the automatic driving module provided in a vehicle. In addition, 5G network may include a server or module that performs a control in relation to an automatic driving.

Meanwhile, the AI apparatus 20 shown in FIG. 50 is described by functionally dividing into the AI processor 21, the memory 25 and the communication unit 27, but the elements described above may be integrated in a module and called an A1 module.

FIG. 51 is a diagram for describing a system in which an automatic driving vehicle and an AI apparatus are linked according to an embodiment of the present disclosure.

Referring to FIG. 51, the automatic driving vehicle 10 may transmit data required for AI processing to the AI apparatus 20 through a communication unit, and the AI apparatus 20 including the deep learning model 26 may transmit the AI processing result using the deep learning model 26 to the automatic driving vehicle 10. The AI apparatus 20 may be referred to the content described in FIG. 50.

The automatic driving vehicle 10 may include a memory 140, a processor 170 and a power supply unit 190, and the processor 170 may further include an automatic driving module 260 and an AI processor 261. In addition, the automatic driving vehicle 10 may be connected to at least one electronic device provided in the vehicle in wired or wireless manner and may include an interface unit that may exchange data required for an automatic driving control. The at least one electronic device connected through the interface unit may include an object detection unit 210, a communication unit 220, a driving manipulation unit 230, a main ECU 240, a vehicle driving unit 250, a sensing unit 270 and a position data generation unit 280.

The interface unit may include at least one of a communication module, a terminal, a pin, a cable, a port, a circuit, a device and an apparatus.

The memory 140 is electrically connected to the processor 170. The memory 140 may store basic data for a unit, control data for operation control of a unit and input/output data. The memory 140 may store data processed in the processor 170. The memory 140 may include at least one of ROM, RAM, EPROM, flash memory, hard drive in hardware. The memory 140 may store various data for general operation of the automatic driving vehicle 10 such as a program for processing or control of the processor 170. The memory 140 may be integrally implemented with the processor 170. According to an embodiment, the memory 140 may be classified as a lower layer component of the processor 170.

The power supply unit 190 may supply power to the automatic driving vehicle 10. The power supply unit 190 may receive power from a power source (e.g., battery) included in the automatic driving vehicle 10 and supply the power to each unit of the automatic driving vehicle 10. The power supply unit 190 may be operated according to a control signal provided from the main ECU 240. The power supply unit 190 may include a switched-mode power supply (SMPS).

The processor 170 may be electrically connected to the memory 140, the interface unit 280 and the power supply unit 190 and exchange a signal. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions.

The processor 170 may be driven by the power supplied from the power supply unit 190. The processor 170 may receive data, process data, generate a signal and provide a signal in the state that power is supplied by the power supply unit 190.

The processor 170 may receive information from another electronic device in the automatic driving unit 10 through the interface unit. The processor 170 may provide a control signal to another electronic device in the automatic driving unit 10 through the interface unit.

The automatic driving unit 10 may include at least one printed circuit board (PCB). The memory 140, the interface unit, the power supply unit 190 and the processor 170 may be electrically connected on the printed circuit board.

Hereinafter, the other electronic device in a vehicle connected to the interface unit, the AI processor 261 and the automatic driving module 260 are described in more detail. Hereinafter, for the convenience of description, the automatic driving unit 10 is called a vehicle 10.

First, the object detection unit 210 may generate information for an object outside of the vehicle 10. The AI processor 261 may apply the neurotic network model to the data obtained through the object detection unit 210 and generate at least one of a presence of an object, position information of an object, distance information between a vehicle and an object and relative velocity information between a vehicle and an object.

The object detection unit 210 may include at least one sensor that may detect an object outside of the vehicle 10. For example, the sensor may include a camera, a radar, a LIDAR, an ultrasonic sensor and an infrared sensor. The object detection unit 210 may provide the data for an object generated based on a sensing signal generated in the sensor to at least one electronic device included in the vehicle.

Meanwhile, the vehicle 10 may transmit the data obtained through the at least one sensor to the AI apparatus 20 through the communication unit 220, and the AI apparatus 20 may apply the neurotic network model 26 to the forwarded data and transmit the generated A1 processing data to the vehicle 10. The vehicle 10 may recognize the information for the detected object based on the received AI processing data, and the automatic driving module 260 may perform an automatic driving control operation using the recognized information.

The communication unit 220 may exchange a signal with a device located outside of the vehicle 10. The communication unit 220 may exchange a signal with at least one of an infra (e.g., server, broadcasting station), another vehicle and a terminal. The communication unit 220 may include at least one of a transmission antenna, a reception antenna, a Radio Frequency (RF) circuit in which various communication protocols may be implemented and an RF device to perform a communication.

The neurotic network model is applied to the data obtained through the object detection unit 210, and at least one of a presence of an object, position information of an object, distance information between a vehicle and an object and relative velocity information between a vehicle and an object may be generated.

The driving manipulation unit 230 is a device for receiving a user input for driving. In a manual mode, the vehicle 10 may be driven based on a signal provided by the driving manipulation unit 230. The driving manipulation unit 230 may include a steering input device (e.g., steering wheel), an acceleration input device (e.g. acceleration pedal) and a brake input device (e.g., brake pedal).

Meanwhile, the AI processor 261 may generate an input signal of the driving manipulation unit 230 according to a signal for controlling a motion of the vehicle according to a driving plan which is generated through the automatic driving module 260.

Meanwhile, the vehicle 10 may transmit data required for controlling the driving manipulation unit 230 to the AI apparatus 20, and the AI apparatus 20 may apply the neurotic network model to the forwarded data and transmit the generated AI processing data to the vehicle 10. The vehicle 10 may use the input signal of the driving manipulation unit 230 in the motion control of the vehicle based on the received AI processing data.

The main ECU 240 may control the overall operation of the at least one electronic device provided in the vehicle 10.

The vehicle driving unit 250 is a device that electrically control various vehicle driving devices in the vehicle 10. The vehicle driving unit 250 may include a power train driving control device, a chassis driving control device, a door/window driving control device, a safety device driving control device, a lamp driving control device and an air conditioning driving control device. The power train driving control device may include a power source driving control device and a transmission driving control device. The chassis driving control device may include a steering driving control device, a brake driving control device and a suspension driving control device. Meanwhile, the safety device driving control device may include a safety belt driving control device for safety belt control.

The vehicle driving unit 250 includes at least one electronic control device (e.g., control Electronic Control Unit (ECU)).

The vehicle driving unit 250 may control the power train, the steering device and the brake device based on the signal received from the automatic driving module 260. The signal received from the automatic driving module 260 may be a driving control signal which is generated by applying the neurotic network model to vehicle related data. The driving control signal may be a signal received from the external AI apparatus 20 through the communication unit 220.

The sensing unit 270 may sense a state of the vehicle. The sensing unit 270 may include at least one of an inertial measurement unit (IMU) sensor, a collision sensor, a wheel sensor, a speed sensor, an inclination sensor, a weight detection sensor, a heading sensor, a position module, a vehicle forward or reverse driving sensor, a battery sensor, a fuel sensor, a tire sensor, a steering sensor, a temperature sensor, a humidity sensor, an ultrasonic sensor, an illuminance sensor and a pedal position sensor. Meanwhile, the inertial measurement unit (IMU) sensor may include at least one of an acceleration sensor, a gyro sensor and a magnetic sensor.

The AI processor 261 may apply the neurotic network model to the sensing data generated by at least one sensor and generate state data of the vehicle. The AI processing data generated by applying the neurotic network model may include vehicle positioning data, vehicle motion data, vehicle yaw data, vehicle roll data, vehicle pitch data, vehicle collision data, vehicle direction data, vehicle angle data, vehicle velocity data, vehicle acceleration data, vehicle inclination data, vehicle forward/reverse driving data, vehicle weight data, battery data, fuel data, tire air pressure data, vehicle internal temperature data, vehicle internal humidity data, steering wheel rotation angle data, vehicle external illuminance data, pressure data exerted on an acceleration pedal, pressure data exerted on a brake pedal, and the like.

The automatic driving module 260 may generate a driving control signal based on the state data of the vehicle which is AI-processed.

Meanwhile, the vehicle may transmit the sensing data obtained through the at least one sensor to the AI apparatus 20, and the AI apparatus 20 may apply the neurotic network model to the forwarded sensing data and transmit the generated AI processing data to the vehicle 20.

The position data generation unit 280 may generate position data of the vehicle 10. The position data generation unit 280 may include at least one of Global Positioning System (GPS) and Differential Global Positioning System (DGPS).

The AI processor 261 may apply the neurotic network model to the position data generated by the at least one position data generation device and generate more accurate position data of the vehicle.

According to an embodiment, the AI processor 261 may perform the deep learning operation based on at least one of the Inertial Measurement Unit (IMU) of the sensing unit 270 and the camera image of the object detection unit 210 and correct the position data based on the generated AI processing data.

Meanwhile, the vehicle 10 may transmit the position data obtained by the position data generation unit 280 to the AI apparatus 20, and the AI apparatus 20 may apply the neurotic network model 26 to the received position data, and accordingly, transmit the generated AI processing data to the vehicle 20.

The vehicle 10 may include an internal communication system 50. A plurality of electronic devices included in the vehicle 10 may exchange a signal by a medium of the internal communication system 50. The signal may include data. The internal communication system 50 may use at least one communication protocol (e.g., CAN, LIN, FlexRay, MOST and ethernet).

The automatic driving module 260 may generate a driving plan for generating a path for the automatic driving and driving the vehicle following the generated path based on the obtained data.

The automatic driving module 260 may implement at least one Advanced Driver Assistance System (ADAS) function. The ADAS may implement at least one of Adaptive Cruise Control (ACC), Autonomous Emergency Braking (AEB), Forward Collision Warning (FCW), Lane Keeping Assist (LKA), Lane Change Assist (LCA), Target Following Assist (TFA), Blind Spot Detection (BSD), High Beam Assist (HBA), Auto Parking System (APS), PD collision warning system, Traffic Sign Recognition (TSR), Traffic Sign Assist (TSA), Night Vision (NV), Driver Status Monitoring (DSM) and Traffic Jam Assist (TJA).

The AI processor 261 may apply information received from at least one sensor provided in the vehicle, traffic related information received from an external device and information received from another vehicle that communicates with the vehicle to the neurotic network model and a control signal which may perform at least one ADAS functions described above to the automatic driving module 260.

In addition, the vehicle may transmit at least one data for performing the ADAS functions to the AI apparatus 20 through the communication unit 220, and the AI apparatus 20 may apply the neurotic network model to the received data, and accordingly, the control signal which may perform the ADAS function to the vehicle 10.

The automatic driving module 260 may obtain state information of a driver and/or state information of the vehicle through the AI processor 261, and based on it, may perform the switching operation from the automatic driving mode to the manual driving mode or the switching operation from the manual driving mode to the automatic driving mode.

Meanwhile, the vehicle 10 may use the AI processing data for a passenger support to a driving control. For example, as described above, through at least one sensor provided in the vehicle, states of a driver or a passenger may be identified.

Alternatively, the vehicle 10 may recognize a voice signal of a driver or a passenger through the AI processor 261, perform a voice processing operation and perform a voice composition operation.

The present disclosure described above may be embodied as computer readable code on a computer readable recording medium. The computer readable recording medium includes any types of data storage devices that may store data which may be thereafter read by a computer system. Examples of the computer readable recording medium include Hard Disk Drive (HDD), Solid State Disk (SSD), Silicon Disk Drive (SDD), ROM, RAM, CD-ROM, magnetic tape, floppy disk, optical data storage device, and include carrier wave (e.g., transmission via the Internet). Accordingly, the description should not be limitedly interpreted but merely exemplary in all aspects. The scope of the present disclosure should be determined by reasonable interpretation of the claims enclosed, and all modifications within the equivalent scope of the present disclosure are included in the scope of the present disclosure.

What is claimed is:

1. A method for processing a picture of an automatic driving vehicle, the method comprising:
   obtaining a first image from a camera while a vehicle is moving, wherein the camera is mounted on the vehicle;
   based on a quantity of light being detected from the obtained first image matching or exceeding a brightness threshold, generating a prediction signal for predicting an occurrence of White-Out from the first image, wherein an area in which the occurrence of White-Out occurs and a remaining area are distinguished in the first image;
   storing the obtained first image during a first time period after the prediction signal is generated, wherein an image quality of the area in which the occurrence of White-Out occurs is stored as a higher image quality than the image quality of the remaining area; and
   based on a second image in which the White-Out occurs in the obtained first image being detected at a specific time during the first time period, predicting and correcting the second image based on the stored first image and a correction model by:
   extracting a portion that causes White-Out in the stored first image based on the second image being corrected with high dynamic range (HDR),
   selecting a portion in which correction is required through the extracted portion that causes White-Out, and
   adjusting a degree of correction according to the selected portion that causes White-Out,
   wherein the correction model is a result of training the second image by processing an HDR image,
   wherein a moving object is extracted from the first image,
   wherein a position and a motion of the extracted object are determined, and
   wherein an image quality of the area in which the White-Out occurs is stored as a higher image quality than an image quality of the remaining area based on the object being included in the area in which the White-Out occurs.

2. The method for processing a picture of an automatic driving vehicle of claim 1, wherein the portion in which correction is required is selected by providing a priority according to a range in which a portion to be corrected is configured in the portion that causes White-Out.

3. The method for processing a picture of an automatic driving vehicle of claim 1, based on the object being included in the selected portion that causes White-Out, the second image is predicted and corrected in greater detail than otherwise.

* * * * *